（12）United States Patent
Riland et al.

(10) Patent No.:     US 12,051,123 B2
(45) Date of Patent:        Jul. 30, 2024

(54) UTILITY RESOURCE ASSET MANAGEMENT SYSTEM

(71) Applicant: TELVENT USA LLC, Fort Collins, CO (US)

(72) Inventors: Chad Riland, Windsor, CO (US); Shylesh Muralidharan, Fort Collins, CO (US); Don Leick, Burnsville, MN (US); Robert Wagner, Burnsville, MN (US); Danny Petrecca, Fort Collins, CO (US); Steven Scott Higgins, Fort Collins, CO (US)

(73) Assignee: Telvent USA LLC, Fort Collins, CO (US)

( * ) Notice: Subject to any disclaimer, the term of this patent is extended or adjusted under 35 U.S.C. 154(b) by 77 days.

(21) Appl. No.: 17/240,957

(22) Filed: Apr. 26, 2021

(65) Prior Publication Data

US 2021/0248693 A1     Aug. 12, 2021

Related U.S. Application Data

(60) Division of application No. 15/217,384, filed on Jul. 22, 2016, now Pat. No. 11,017,485, which is a
(Continued)

(51) Int. Cl.
  *G06Q 50/06*        (2024.01)
  *G06Q 10/04*        (2023.01)
(Continued)

(52) U.S. Cl.
  CPC ............ *G06Q 50/06* (2013.01); *G06Q 10/04* (2013.01); *G06Q 10/06* (2013.01); *G06Q 10/0635* (2013.01); *G06Q 10/067* (2013.01)

(58) Field of Classification Search
  CPC ..................................... G06Q 50/06
  See application file for complete search history.

(56) References Cited

U.S. PATENT DOCUMENTS 7,725,293 B2 *   5/2010   Bonissone ......... G05B 23/0283
                                                         702/182
7,739,138 B2     6/2010   Chauhan et al.
(Continued)

FOREIGN PATENT DOCUMENTS

CA     2753542 A1 *  5/2010   .............. G01W 1/00
EP     2889711 B1     7/2020
(Continued)

OTHER PUBLICATIONS

Francis X. Diebold and Roberto S. Mariano, Comparing Predictive Accuracy, Department of Economics University of Pennsylvania, Journal of Business and Economic Statistics, 13, 253-265, 1995. (Year: 1995).*
(Continued)

*Primary Examiner* — Kurtis Gills
(74) *Attorney, Agent, or Firm* — Locke Lord LLP

(57) ABSTRACT

The UTILITY RESOURCE ASSET MANAGEMENT SYSTEM APPARATUSES, METHODS AND SYSTEMS ("URAMS") transform weather, terrain, and utility asset parameter data via URAMS components into damage predictions with confidence metrics, alerts, and asset allocation and response plans.

17 Claims, 54 Drawing Sheets
(49 of 54 Drawing Sheet(s) Filed in Color)

Related U.S. Application Data continuation-in-part of application No. PCT/US2015/012740, filed on Jan. 23, 2015.

(60) Provisional application No. 61/956,188, filed on Jan. 24, 2014.

(51) Int. Cl.
*G06Q 10/06* (2023.01)
*G06Q 10/0635* (2023.01)
*G06Q 10/067* (2023.01)

(56) References Cited

U.S. PATENT DOCUMENTS

| | | | |
|---|---|---|---|
| 8,209,124 B2 | 6/2012 | Dannevik et al. | |
| 8,280,633 B1* | 10/2012 | Eldering | G06Q 40/08 |
| | | | 702/3 |
| 8,471,406 B2 | 6/2013 | Patel et al. | |
| 9,274,251 B2* | 3/2016 | Pasken | G01W 1/10 |
| 10,048,168 B2* | 8/2018 | Armstrong | G01M 15/14 |
| 2003/0107490 A1 | 6/2003 | Sznaider | |
| 2005/0096856 A1 | 5/2005 | Lubkeman et al. | |
| 2007/0078695 A1 | 4/2007 | Zingelewicz et al. | |
| 2007/0239569 A1* | 10/2007 | Lucas | G06Q 10/087 |
| | | | 705/28 |
| 2007/0286089 A1 | 12/2007 | Nasle et al. | |
| 2007/0296575 A1 | 12/2007 | Holowick | |
| 2007/0296576 A1 | 12/2007 | Eisold et al. | |
| 2010/0292857 A1 | 11/2010 | Bose et al. | |
| 2011/0276527 A1* | 11/2011 | Pitcher | G06F 13/24 |
| | | | 703/2 |
| 2012/0059684 A1* | 3/2012 | Hampapur | G06Q 10/06 |
| | | | 705/7.28 |
| 2012/0265502 A1 | 10/2012 | Omitaomu | |
| 2012/0303278 A1* | 11/2012 | Dannevik | G01W 1/00 |
| | | | 702/3 |
| 2012/0330549 A1* | 12/2012 | Dannevik | G01W 1/10 |
| | | | 702/3 |
| 2013/0268196 A1 | 10/2013 | Dam | |
| 2013/0325542 A1* | 12/2013 | Tucker | G06Q 10/06313 |
| | | | 705/7.23 |
| 2014/0324351 A1* | 10/2014 | Dannevik | G08B 21/10 |
| | | | 702/3 |
| 2015/0095718 A1 | 4/2015 | Otsuka et al. | |
| 2015/0177063 A1* | 6/2015 | Lian | G06F 1/163 |
| | | | 250/372 |
| 2016/0307138 A1* | 10/2016 | Heng | G06N 5/04 |

FOREIGN PATENT DOCUMENTS

| | | | | |
|---|---|---|---|---|
| KR | 100756265 B1 | 9/2007 | | |
| WO | WO-2010056983 A1 * | 5/2010 | | G01W 1/00 |
| WO | 2013181463 A1 | 12/2013 | | |
| WO | WO-2013181463 A1 * | 12/2013 | | G01W 1/10 |

OTHER PUBLICATIONS

Clifford Mass, Nowcasting: The Next Revolution in Weather Prediction, Department of Atmospheric Sciences, University of Washington, Bulletin of the American Meteorological Society, Jul. 2011. (Year: 2011).*
International Search Report and Written Opinion for International Application No. PCT/US2015/012740 dated Apr. 29, 2015.
International Preliminary Report on Patentability and Written Opinion of International Searching Authority for International Patent Application No. PCT/US2015/012740, dated Aug. 4, 2016.

* cited by examiner

EXEMPLARY URAMS FEATURES
- Before:
  - High quality forecasts
  - Expert meterological consultation
  - Alerting (for smaller utilities)
- During/just before:
  - Real time lightning
  - Nowcasting tools
  - Current situational awareness
  - Integratable into GIS
  - GPS All-clear alerting
- After:
  - Post-storm inspection tools
  - Integratable into GIS
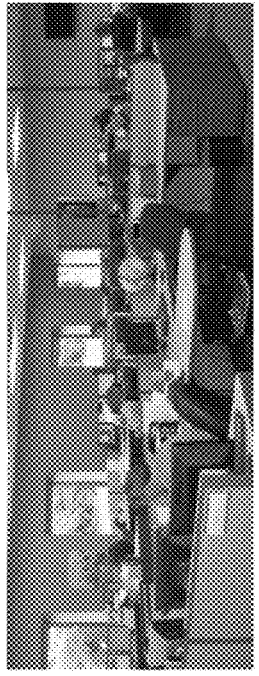
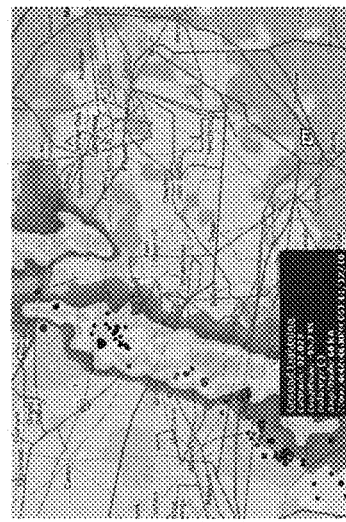
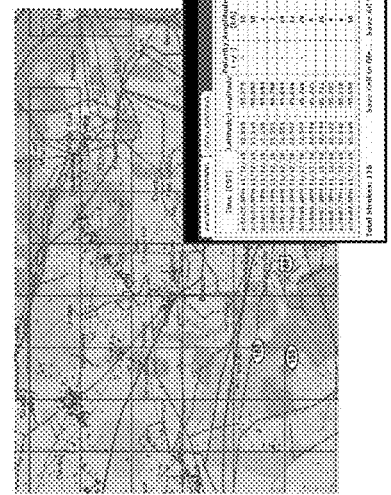
FIG. 2C

After Storm

- Reduced Restoration Time
  - Predictive Outage Optimization
  - Crew optimization
- Timely updates for public
  - Accurate estimated time of restoration (ETR)
  - Public outage web maps
- Damage Assessment
  - Spatial relationship of weather events to network assets
  - Lightning strikes
  - Outage cause analysis
- Feed back into future preparations $$SAIDI = \frac{\sum U_i N_i}{\sum N_i}$$

$$SAIFI = \frac{\sum N_i}{N_T}$$

$$CAIDI = \frac{\sum U_i N_i}{\sum \lambda_i N_i}$$

$$CAIFI = \frac{\sum N_i}{CN}$$

FIG. 7B

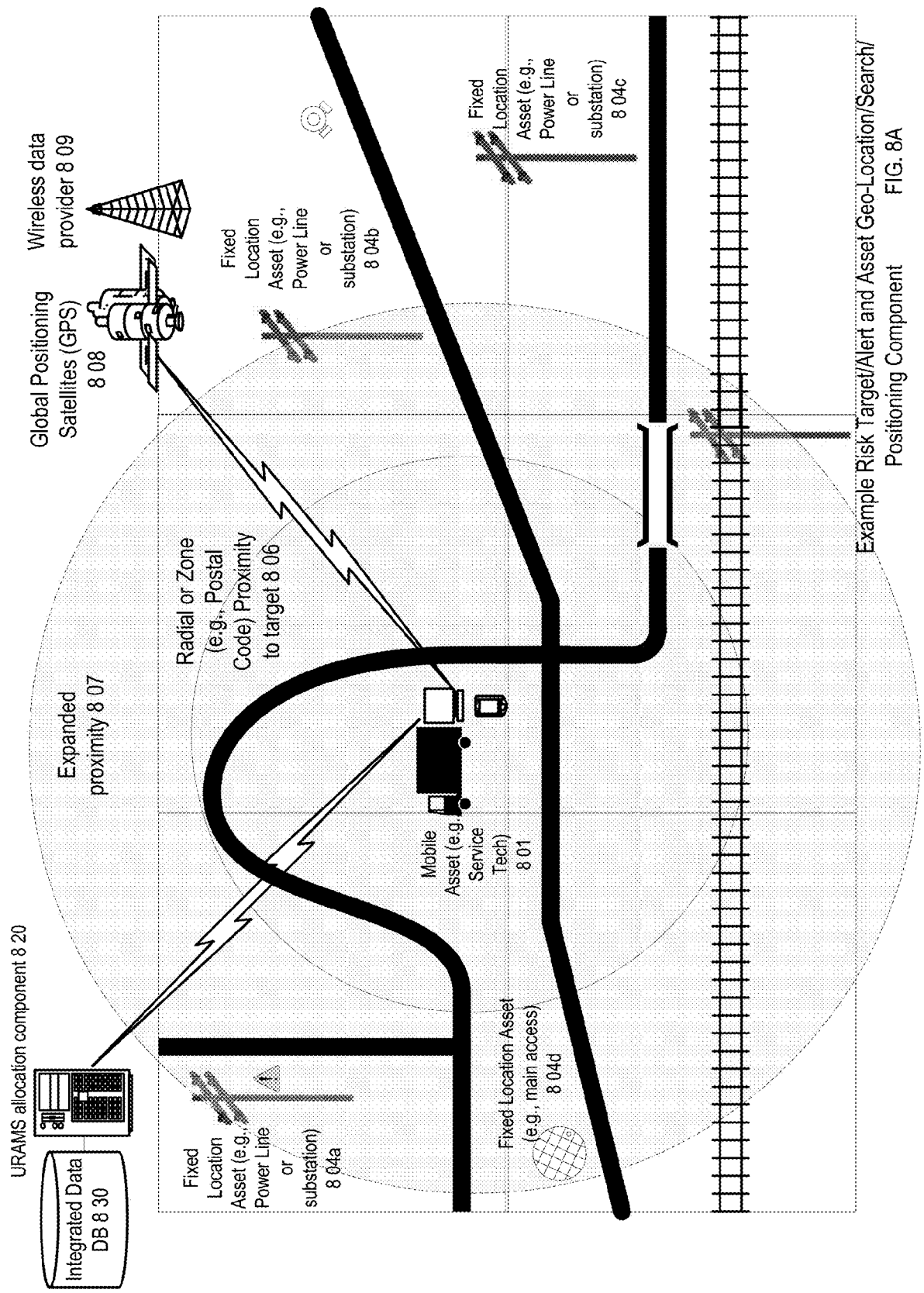

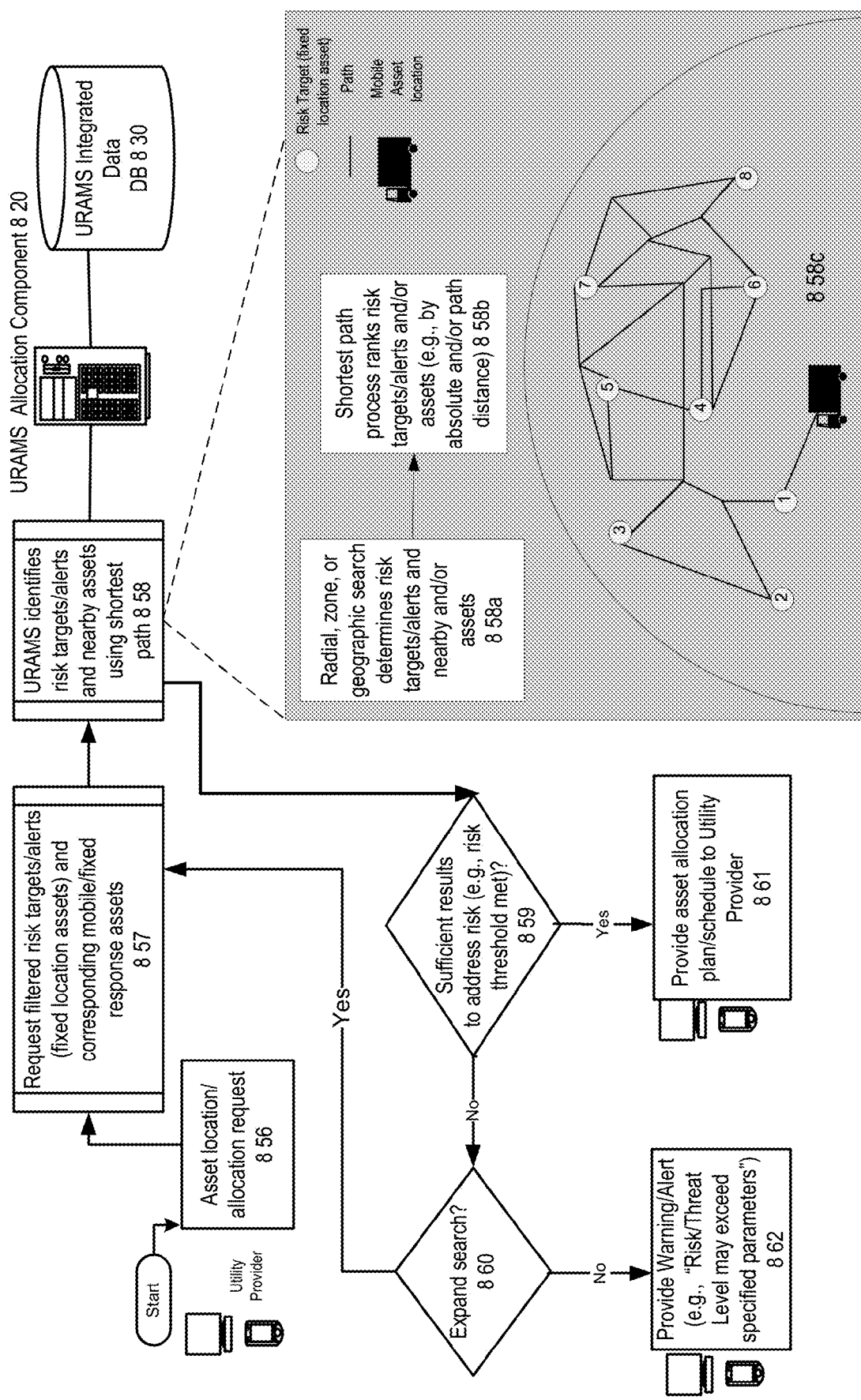

URAMS

- Geospatial Map and Feature services to support visualization and analytics
- Accurate Forecasts
- Real-time lightning and other value-added content
- Global

- Seamless integration to add value into other systems or websites that are impacted by weather
- Support analytics for research of both Spatial and Temporal correlations
- Align with industry standard OGC model for mapping and feature layers
- High reliability, fast response, 24/7/365
- Apply to mobile

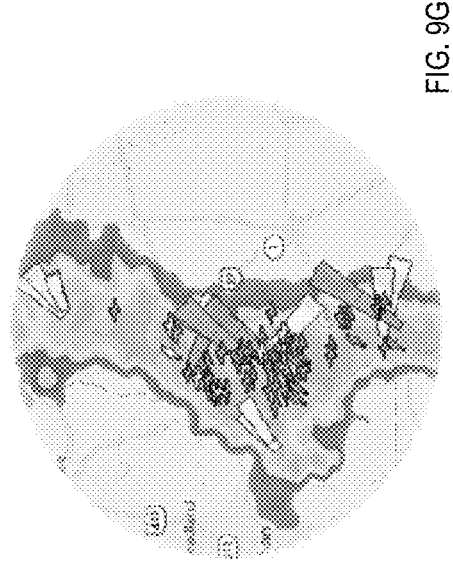

FIG. 9G

ASSET DAMAGE OVER 1 DAYS ▼

| Asset | Count | Current | Confidence |
|---|---|---|---|
| POWER TRANSFORMER | 164K OF 200K | CURRENT: 102K | HIGH |
| POLES | 610K OF 1MM | CURRENT: 480K | HIGH |
| SUBSTATIONS | 370 OF 1K | CURRENT: 129 | HIGH |
| LIGHTENING ARRESTORS | 6.1K OF 10K | CURRENT: 4K | MEDIUM |
| SURGE ARRESTORS | 370 OF 1K | CURRENT: 129 | MEDIUM |
| VOLTAGE REGULATORS | 1.8K OF 2K | CURRENT: 500 | MEDIUM |
| SWITCHED CAPACITOR | 1.8K OF 5K | CURRENT: 1.2K | MEDIUM |
| SWITCHES | 25K OF 50K | CURRENT: 17K | HIGH |
| FUSES | 7K OF 10K | CURRENT: 5K | MEDIUM |
| FEEDERS | 2.5K OF 5K | CURRENT: 1.8K | HIGH |
| FIXED CAPACITOR | 370 OF 1K | CURRENT: 1K | HIGH |
| STEP | 61 OF 100K | CURRENT: 35K | MEDIUM |

FIG. 16D

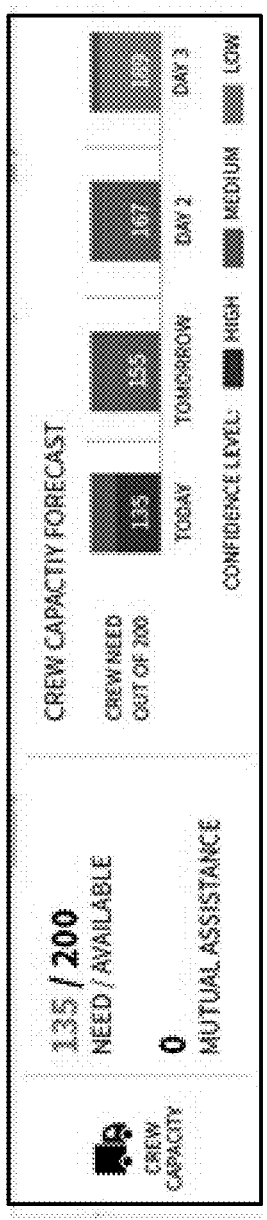 1608a
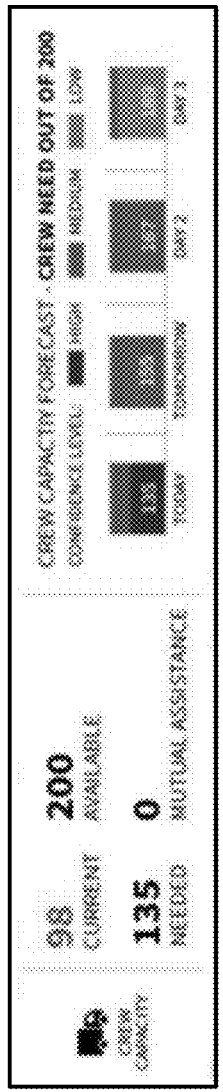 1608b
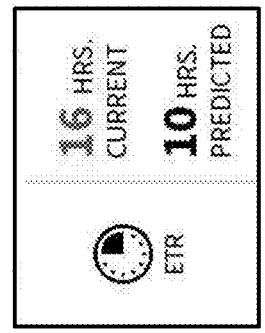 1609b
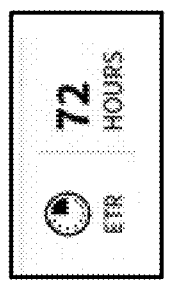 1609a
FIG. 16F

UTILITY RESOURCE ASSET MANAGEMENT SYSTEM

This application is a divisional of U.S. patent application Ser. No. 15/217,384, filed Jul. 22, 2016, and entitled "Utility Resource Asset Management System," which is a continuation-in-part of International Application No. PCT/US2015/012740, filed Jan. 23, 2015, and entitled "Utility Resource Asset Management System," which in turn claims priority to and benefit of U.S. Provisional Patent Application Ser. No. 61/956,188, filed Jan. 24, 2014, and entitled "Utility Resource Asset Management System"; the entire contents of the aforementioned applications are expressly incorporated herein by reference.

This application for letters patent document discloses and describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

BACKGROUND

A variety of weather monitoring systems, including ground-based and satellite-based observations, are used to provide weather reports and forecasts. Severe weather-related outages cost the economy billions of dollars, and causes problems for industry and residential customers.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying appendices and/or drawings illustrate various non-limiting, example, inventive aspects in accordance with the present disclosure:

FIGS. 2A-2C illustrate features of some embodiments of URAMS;

FIG. 7B provides an overview of some features and component according to some implementations of URAMS;

FIGS. 8A and 8B provide an example overviews for asset allocation, risk target/alert, and asset geo-location/search/positioning features according to some embodiments of URAMS;

FIGS. 9A-9H provide overviews of features, components, and interfaces according to some implementations of URAMS;

DETAILED DESCRIPTION

Utility Resource Asset Management System (URAMS)

Figure 1:
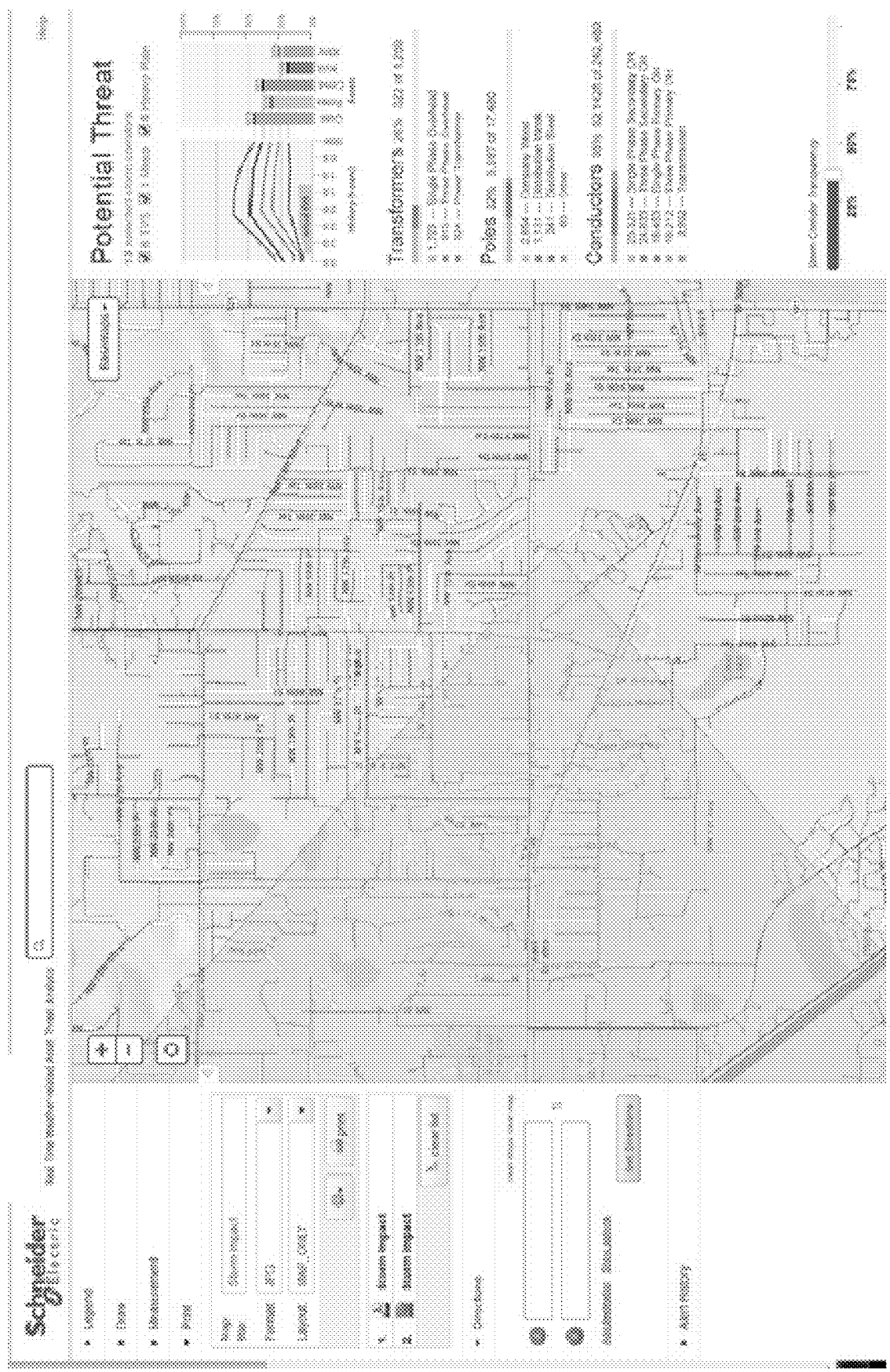
FIG. 1 provides an exemplary interface for an implementation of URAMS.

In some embodiments, the UTILITY RESOURCE ASSET MANAGEMENT SYSTEM ("URAMS") as disclosed herein transforms current (i.e., real-time and/or near real-time) and historical weather, terrain, fixed asset, and mobile asset data via URAMS components into dynamic response plans and/or optimized resource allocation output. Some implementations of URAMS provide Weather Threat Services and/or Analytics for Utilities, and although such implementations are provided herein, it is to be understood that URAMS may be applied across a variety of industries and not just for Utilities. URAMS provides unique planning and guidance data, that effectively allocates and dispatches resources, saves money on crew decisions, reducing risks and helping save lives by keeping crews safe, and assists utilities to restore power faster, improving customer satisfaction.

Utilities' outage management operations can be greatly affected by weather. Utilities may make decisions that have large financial consequences and can impact customer satisfaction. Utilities should be prepared with the right response, e.g., not too many or too few crews, and/or the like, to rapidly restore power. They may have many decisions to make before a storm regarding crews and assets, for example: do they holdover crews? do they place crews on call? if so, how many? do they need mutual assistance from other utilities? when should they call out the crews? how many? once crews are called, where should they position them? when can the crews safely begin work? Utilities may also need to make equipment decisions too, such as: what warehouse inventory will be needed and where?

Embodiments of URAMS can respond to some of the most common issues that utilities are trying to address in the face of severe weather, including: identifying which assets are at risk, predicting the extent of damage of the assets at risk, identifying customers with potential to be affected by the forecasted severe weather and/or asset damage, planning and managing workforce and inventory of material critical for restoration efforts, and supporting mutual assistance decisions with relevant information.

URAMS integrates weather data, utility asset data and other dependent variables to develop an application that can predict and visualize the threat of a severe weather event as it comes through a service territory of interest. Alerting and advanced predictive analytical capabilities are included to best assess the impact of the storm on the utilities assets within the path of the incoming severe weather. URAMS can utilize a variety of damage prediction models, and has options for varying levels of integration of a given model into the URAMS system, such that a particular utility or service can utilize a proprietary model in conjunction with URAMS.

URAMS can integrate the results of one or more predictive models to provide a comprehensive user experience with enhanced situational awareness for advanced storm damage assessment that will includes the impact of weather, the geographical location of the corresponding assets within a service area or territory, and other dependent variables using advanced statistical modelling and predictive analytics ultimately integrating various information, analytics and visualization. In some embodiments, URAMS can integrate this information into one interface, and can, for example, be presented through an online platform, such as the SCHNEIDER ELECTRIC WEATHERSENTRY ONLINE platform.

In some embodiments, URAMS allows utilities to make wise outage management response decisions based on a combination of experience, situational analysis, and objective information. URAMS may provide outage management data and service that provides objective information and supports subjective analysis, bringing added value above and beyond a weather forecast and tuned to the workflows of utilities. URAMS may provide a combination of highly accurate real-time weather data and the utility's assets from their GIS. In one implementation, weather data may be from SCHNEIDER ELECTRIC WEATHERSENTRY and/or the like. URAMS data may include predicted threat impact analytics pulling real time and historical data from WEATHERSENTRY (and/or the like) combined with real time and historical utility asset information.

Some embodiments of URAMS provide a unique approach to dynamically joining and integrating current real-time, predicted and historical weather data together with utility asset data and various geographic and other valuable context information sources. By dynamically integrating core information, URAMS generates and provides valuable decision-driving analytics.

URAMS may generate valuable targeted metrics above and beyond weather information provided to utilities and maps of their assets and territory geography. These metrics are generated from unique URAMS components and/or algorithms that may learn at least from actual asset impacts to a utility over time which will help tune the components and/or algorithm so that future threat metric predictions are more accurate over time.

URAMS can provide weather forecasting services (e.g., delivered via WeatherSentry Online® Platinum Utility Edition, an interactive Internet-based weather decision-support system) and deliver all required information within a full service weather decision support system.

URAMS can utilize existing damage models and/or execution processes and/or execution mechanisms (hardware, processes, technology, model algorithms, etc.), and the output, model grid, and/or model outputs can be integrated for a specific offering, before and/or after model execution. URAMS can provide model output data that enables effective visualizations and scenario management, and can include visualizations of model outputs including damage predictions, crew predictions, ETR (estimated time to restoration) predictions and confidence levels of predictions, alerting of damage with thresholds, archive reporting of historical storms, weather and predictions, as well as scenario management between damage, crews and ETR numbers.

URAMS can provide observations, forecasts and alerts of weather conditions for operations personnel who are tasked with making critical decisions regarding the safety of citizens and minimizing damage to property. In some embodiments, URAMS is password protected, browser-based application with no software to install, and can be easily accessed remotely from anywhere—from home as well as the office or in the field. URAMS can be configured with Internet capabilities, configurable email weather alerts, text message delivery, Smartphone, tablet and mobile access, and a variety of other features, to provide an accessible and expandable communications environment which provides up-to-the-minute weather information, forecasts, predictions, and alerts that are much more valuable and actionable than static weather information delivered only a few times per day.

URAMS can support the damage prediction and alerts, as well as providing the following functionalities: (1) Graphically enhanced real-time weather information, including radar (National, Regional, and Single-Site), satellite clouds, National Weather Service watches, warnings and advisories, Weather Station observations, current conditions from such sites as ASOS/AWOS, forecasts and other critical weather parameters in an easy-to-use interface, such as a GOOGLE MAPS interface. (2) Multi-layer weather displays completely customizable by toggling layers on and off. (3) Nationwide to street level zooming for accurate analysis of storm locations. (4) Reliable, accurate weather information updates every hour or fraction thereof, and in some embodiments, near-real-time, which can be especially useful in rapidly changing conditions. (5) Map click access to site specific local and regional weather forecasts, providing a variety of forecasts (e.g., hourly forecasts for 72 hours and daily forecasts for 15 days). (6) Detailed, accurate start and stop times of snow, ice and rain (e.g., Schneider Electric PrecipTimer®). (7) Load data forecasting (e.g., as detailed in U.S. Pat. No. 8,065,098, the entirety of which is herein incorporated by reference for all purposes). (8) Dynamic, looping snow, ice and wind forecast maps (e.g., for the next 72 hours, etc.). (9) Weather condition alerts based on user-defined weather threshold criteria, delivered as emails, text messages and audio alerts (e.g., as detailed in U.S. Pat. No. 8,610,566, the entirety of which is herein incorporated by reference for all purposes). (10) Local storm reports from official spotters, private weather monitors, crowdsourced information, etc., and including winter weather events and can be updated continuously as information is received. (11) Custom display settings for individual clients, including the ability to display maintenance district and region boundaries. (12) Weather station observations from public and/or private networks throughout an area, region, country, etc., complete with color-coded location symbols indicating Weather Station health.

In some embodiments, URAMS provides variable privacy and/or accuracy variables, such as sliding scale of privacy and accuracy, such that a utility can determine how much data to provide to the URAMS (e.g., for privacy and/or like purposes, in order to determine how much information must be provided for predictions accurate for the needs of the utility, and/or the like). Some utilities may be apprehensive to send detailed utility asset information to an application vendor due to security, privacy and other internal concerns (and/or rules/regulations). One unique characteristic of some URAMS embodiments is ability to work with generalized asset information from a utility to generate predicted threat impact metrics. URAMS may be hosted internally and/or externally (depending on the implementation), such that URAMS may be configured to accommodate the needs of the most security-concerned and privacy heightened utility that would like to take advantage of the value of URAMS while not hosting URAMS some or all components (such as analytics) inside their datacenter, as well as the needs of a utility which may have few privacy concerns and may wish to utilize the full breadth of the URAMS. According to some implementations, the more asset information and geographic data the utility provides, the higher the accuracy the information provided by URAMS to the utility. Depending on the implementation, URAMS analytics may work with varying detail levels of asset information provided, with resulting parameters/limits of certain capabilities and application to the utility with the core predictive threat asset metrics being provided by URAMS. For example, this may be visualized as a variable slider option where on one end is privacy and security and the other is full prediction accuracy and service capability, allowing a utility to ultimately choose where they want to be. Alternatively, a utility could implement URAMS on premises to address accuracy and privacy aspects.

URAMS may include one or more Situational Awareness Service and Application Optimizing Decision Making component(s), promoting situational awareness for key pieces of information all at once that is needed to make decisions related to weather impact on assets. Such aspects of the URAMS may be provided to utilities whose primary consumption is done through a targeted application enhancing situational awareness for decision makers. Aspects of the source data and threat analytics service can be consumed in various ways. The combination of the service and application optimally provides the information needed for utilities to make the decisions related to weather events, and depending on the embodiment, may include maps giving visual indication of current weather, predicted weather, predicted asset impact metrics and/or other base map information. It may provide focused threat impact predictions and/or aggregated threat impact predictions for the utility. Embodiments of URAMS combine critical information and analytics into a single interface to fundamentally optimize the decision loop and response time for the utility.

Without URAMS, utilities may have to make these decisions using basic weather maps and information that do not provide an optimal way to visually understand the possible impacts across a specific territory or broader region. Additionally, the traditional decision making capability of the utility would be heavily dependent on the most seasoned and experienced person making the decision. These experienced and seasoned workers are not always available and/or reliable long-term. The advanced analytics provided by URAMS and discussed herein provide threat prediction metrics and recommendations that assist a utility to have a consistent decision making "north star" when utility personnel and experience vary.

Psychological research has shown that objective information combined with other psychological factors such as emotion enhances decision making capability and accuracy. Weather data alone in aggregate form can be overwhelming and incite an emotional response in the decision maker. The information presented may also give a false sense of risk to utility assets. For example, looking at standard radar images tends to show rain intensity which doesn't typically have as high of a risk to impacting assets as high wind combined with rain and overgrown trees not trimmed. The combination of objective information from the service and other real-time weather information provided by URAMS enables the decision maker in a time of stress and uncertainty to achieve optimal decision making.

URAMS provides a number of unique features/components, including real-time modeling and improving/refining analytics by learning over time. URAMS may provide analytics as a service and paired with targeted situational awareness applications focusing decisions making.

URAMS may also facilitate the aggregation/combination of critical information into one application to enable quick decision making and/or provide response plans. Utility decision makers may frequently need to look at multiple information sources and applications to generate a decision. Providing the same context for heterogeneous weather and asset information may simplify the decision making loop and reduce errors which may be increased when larger numbers of information sources are not directly tied together.

In some embodiments, URAMS may start with predictive weather data and utility asset data. The predictive weather data may be across many different time horizons, e.g., in order to provide the needed threat predictions for the various workflows that a utility does. Each workflow may have a different time horizon need for predictions. Also, utility assets may be sectionalized (geographically simplified) to produce a single polygon or line for a section of the utility's assets. This single polygon or line may represent the assets in that geographic and network section.

The analytics component of URAMS may, in some embodiments, start by geographically intersecting various predictive weather data sets (lightning, storm corridor, wind, etc.) in each forward looking time horizon with the group of simplified polygon or line assets to produce individual threat metrics for each section of the utility. For example, geographic data showing tall overhead lines at 90 degrees to the wind direction where the wind is over 50 mph has a higher risk metric applied to it than 20 mph winds where the wind direction is parallel to the overhead lines.

The URAMS may then iterate over other information sources to increase or decrease the individual weather source threat risk for a given section. For example, some other information sources that optionally (depending on the implementation) may be iterated over are 3D spatial (z dimension) of assets (example—wind and lightning risks vary depending on how high an asset is), soil saturation, geographic vegetation information, vegetation management practices since the geographic vegetation information time slice, information obtained from the utility in using the service related to actual asset impacts, and/or the like. The URAMS may also take into account historical threat metrics and/or historical asset losses in order to further refine the calculated threat risk.

These various iterations may then be combined into one single threat metric for that particular section of the utilities assets for that specific time horizon. These granular threat metrics can then be presented in various ways and aggregated to enhance decision making capability.

The presentation of the information by URAMS through an application may be important to fully enable the decision maker. One screen shot of an exemplary implementation of URAMS is provided in FIG. 1, showing some example information related to the analytics for a utility risk profile.

URAMS implementations may utilize a variety of components to generate threat metrics, including statistical components and/or models, artificial intelligence (AI) and/or like machine learning components and/or algorithms, and/or advanced statistical components and/or models to predict threat impact, and provide objective threat analytics based on real-time combination of information to aide decision makers.

Figure 2A:
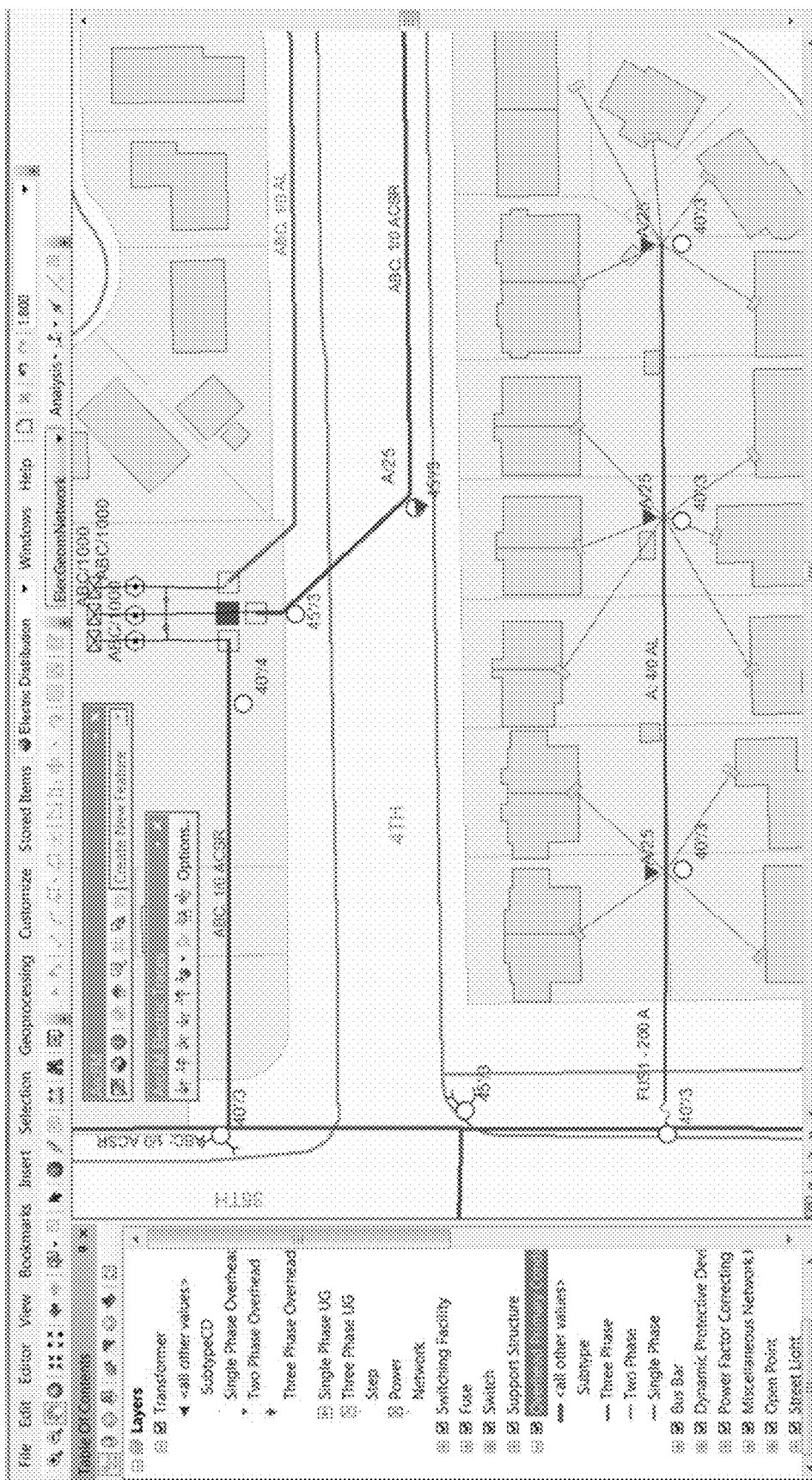
Figure 2B:
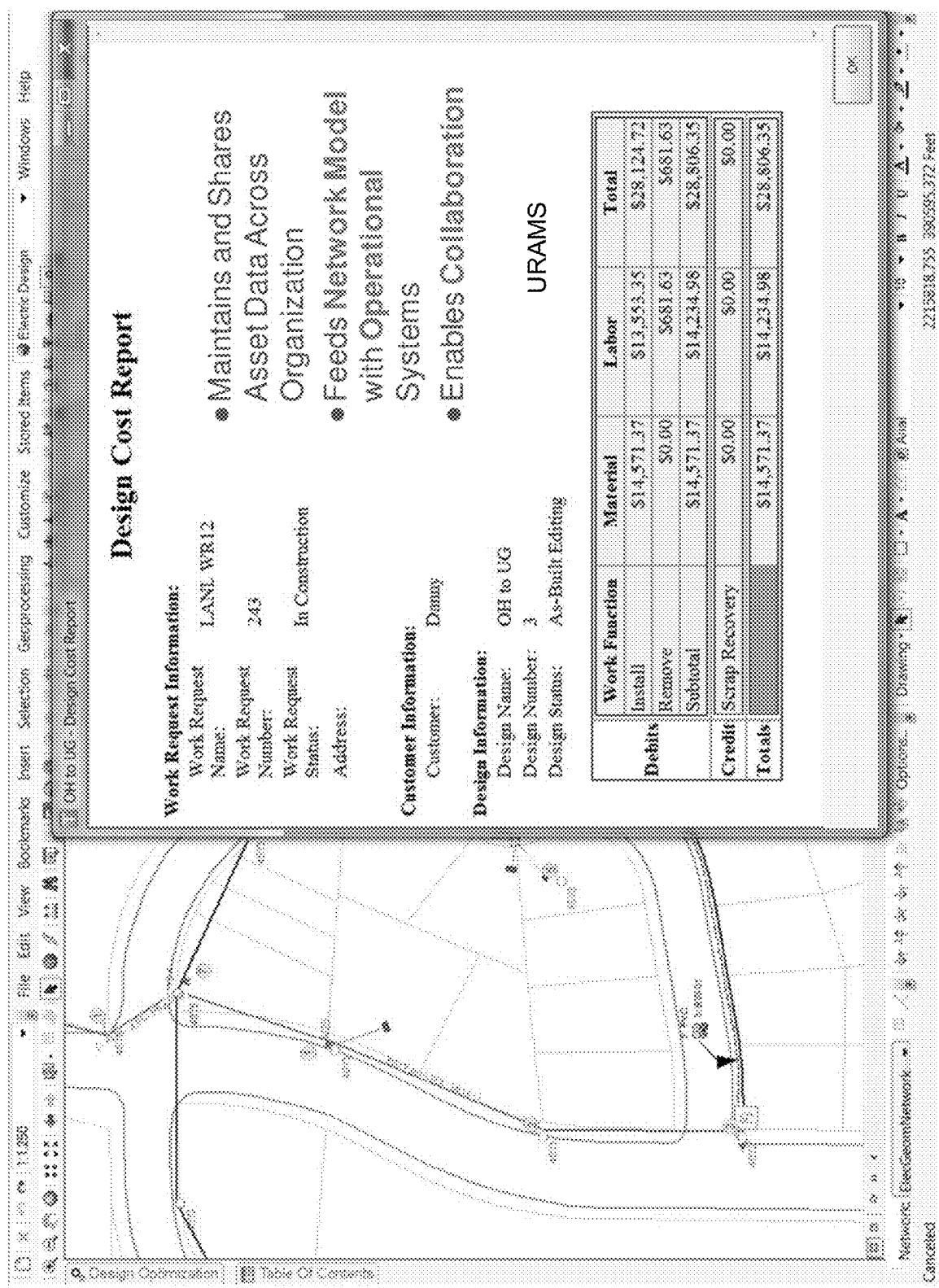

FIGS. 2A-2C show additional aspects of some embodiments of URAMS. Adequately preparing for a natural disaster is just as important as the response to it, and URAMS provides utilities with information regarding where and when damaging weather conditions will impact their territory and thus enables and/or executes a faster response to service interruptions than would otherwise be possible. URAMS provides reliable, precise weather data—including, in some embodiments, real-time lightning detection and/or like weather (severe or otherwise) events, and customizable alerts—to help utilities prepare and restore power more quickly after a disaster. To help pre-position crews, URAMS predictions may show a color-coded threat level to the service territory for a specified period, e.g., the next 60 minutes, and storm tracking displays the storm's estimated arrival times to a utility's assets in its path.

Figure 3:
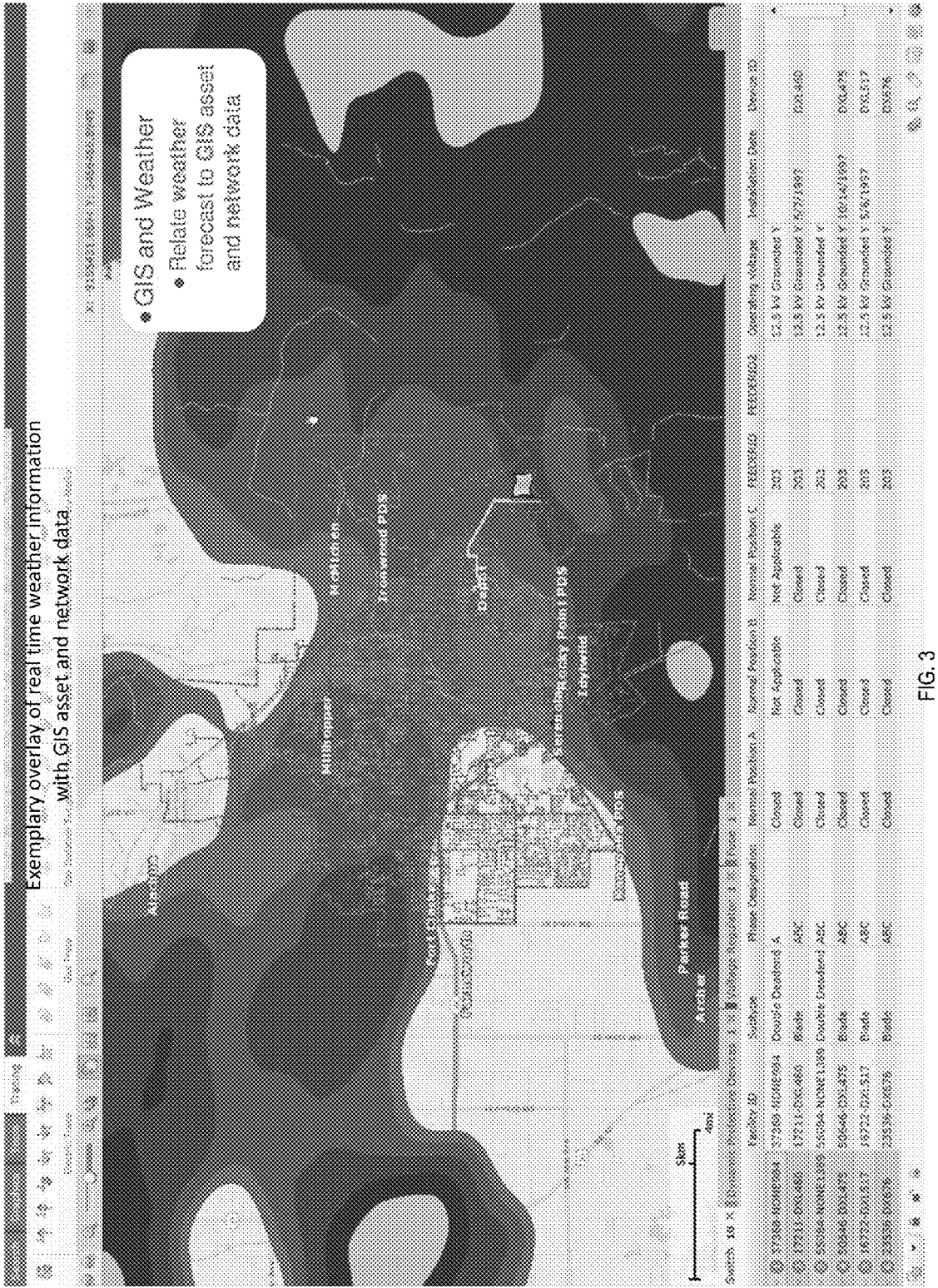
FIG. 3 illustrates real-time weather information overlay with GIS asset and network data according to an embodiment of URAMS.
Figure 4:
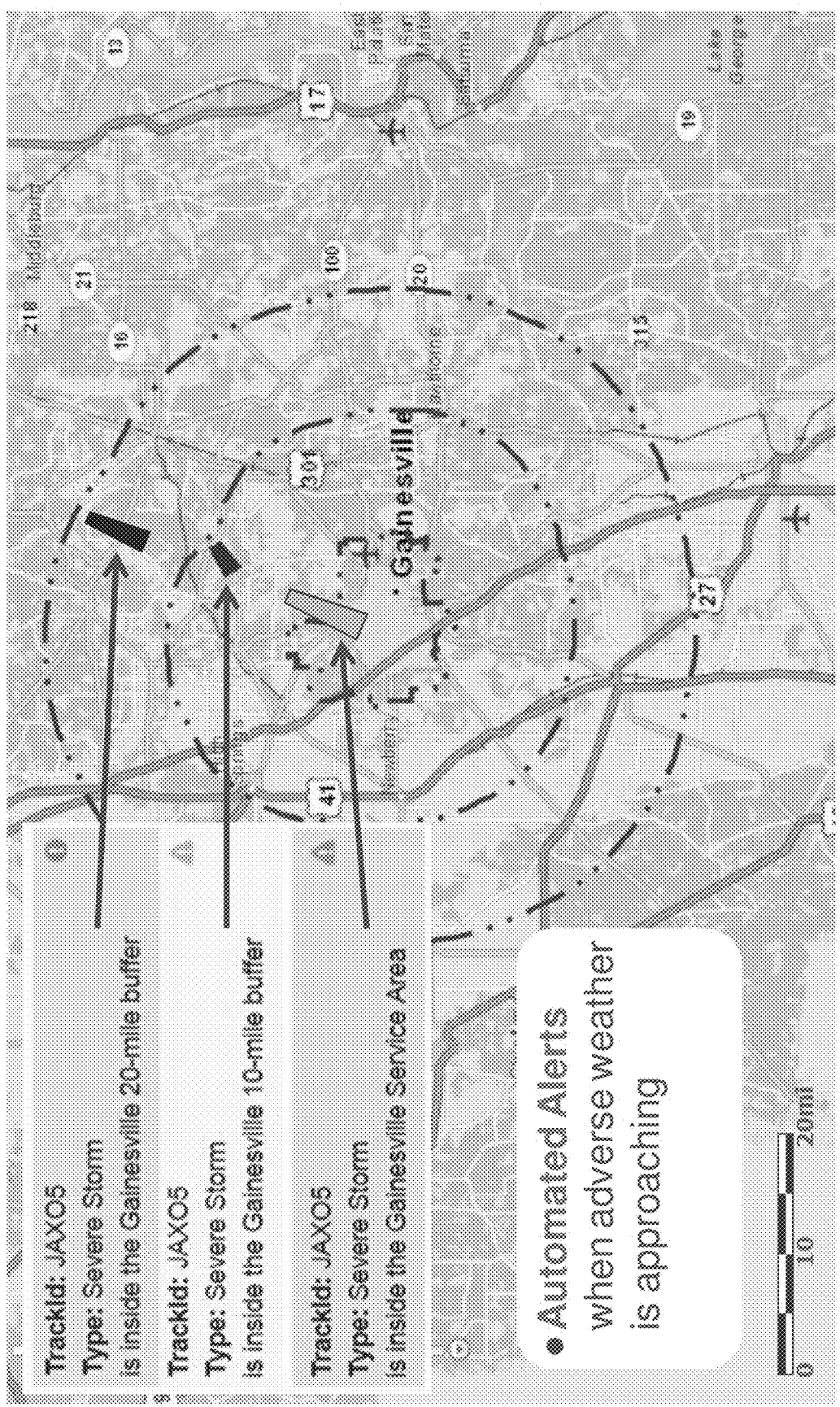
FIG. 4 illustrates an exemplary URAMS implementation showing advance automated alerts features.

FIG. 3 show real time weather information overlay with GIS asset and network data for one URAMS embodiment. FIG. 4 shows an exemplary URAMS implementation illustrating advance automated alerts for storms approaching a pre-determined geofence around a service territory, with colored polygons, e.g., storm corridors—approaching a city.

Figure 5:
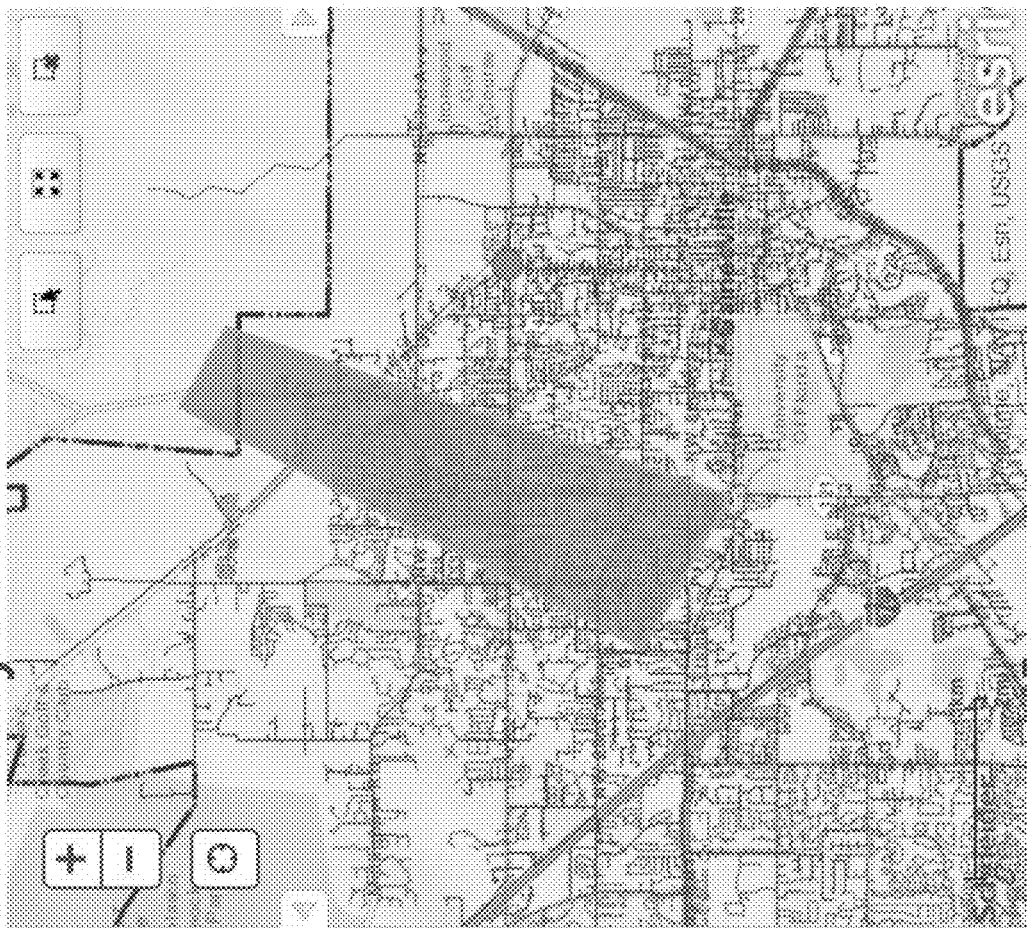
FIG. 5 illustrates a URAMS feature relating weather to utility network infrastructure and risk assessment.

FIG. 5 illustrates an exemplary URAMS implementation for relating weather to utility network infrastructure and assessing risk. Such an implementation may be valuable for crew management and determining the answers to questions such as: Do I have enough crews? Where should I put them? If I have a large service area will they get there in time to help? Crew drive time? It is safe for them? Hold over, OT, call outs? Do I need outside help? Do I have the right crews and replacement equipment on hand? In some implementations URAMS may be able to provide answers to questions that utilities and/or crew management may have within a comprehensive interface which may illustrate the status of assets, the need for particular volumes of crews, and/or the like.

Exemplary advanced analytics that may be utilized by URAMS to determine threats and/or responses include vegetation management, soil type and condition, asset history, weather and outage history, geospatial relationships, angles of intersection, geomorphology, and/or the like. In some implementations, the URAMS may also use historic asset risks and/or losses in order to further refine models, and/or the like.

Figure 6A:
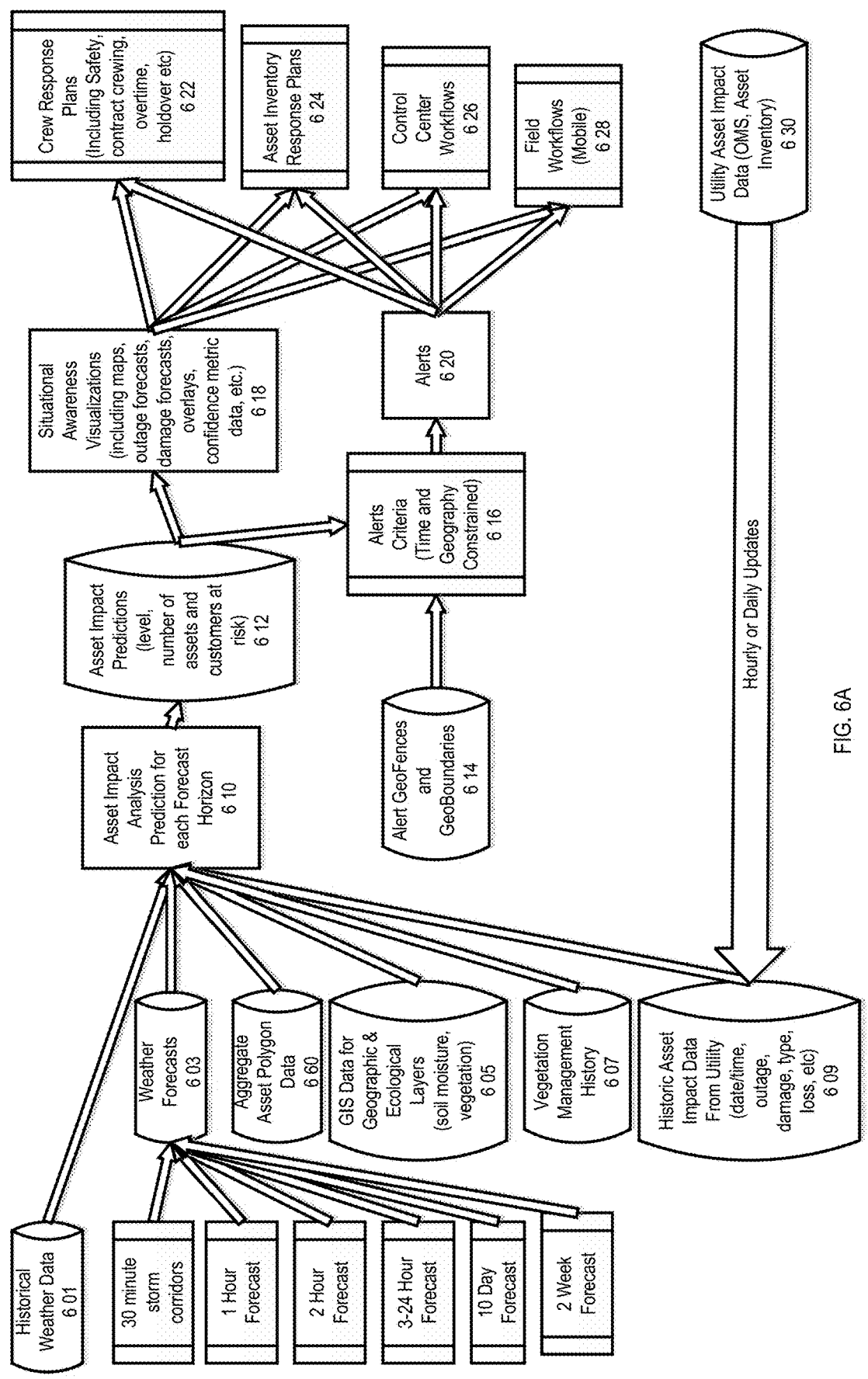
FIG. 6A shows an exemplary logic flow for risk analysis and asset allocation to determine threats and/or responses according to some embodiments of URAMS.

FIG. 6A provides an exemplary logic flow for some embodiments of URAMS. Utilizing historical weather data 601, Weather Forecasts 603 (including but not limited to 30, 60, 90, 120 minute forecasts; 3-24 hour forecasts; 2-10 day forecasts; 1-4 week forecasts; and/or nowcast), GIS data for geographic and ecological layers 605 (soil moisture, vegetation, etc.), vegetation management history 607, historic asset impact data 609, and/or aggregate asset polygon data 660 (discussed in FIG. 6B). In some embodiments, GIS data 605 can be real-time or near real time, e.g., as determined by satellite imaging or on-site sensors. For example, satellite or drone imaging may identify tree coverage, vegetation affected by drought, etc.

The URAMS can then conduct an asset impact analysis for each forecast horizon 610 to determine asset impact predictions 612 (including, by way of non-limiting example, level/magnitude, number of assets, asset characteristics, customers at risk, and/or the like). Asset impact predictions can then be utilized to provide situation awareness visualizations 618 (e.g., as shown in the display interfaces provided in the figures). Asset impact predictions can also be processed based on geographic constraints 614 (geofences/geoboundaries) and/or other constrains/criteria 616 (e.g., time) to generate alerts 620 and/or action plans/mobile asset positioning. Alerts 620 and/or visualizations can be utilized to provide crew response plans 622, asset inventory response plans 624, control center flows 626, and/or field workflows or plans 628. Utility Asset Impact data 63o can be input in to the historic asset impact data 609. Such data can then be utilized by URAMS to refine predictions and models, and to test and optimize response plans. Similarly, by refining the predictions and plans through such feedback, real-time or near-real time improvements can be realized. Moreover, by utilizing such real-time or near real-time information, the URAMS can dynamically reassess a situation to identify issues that have not been addressed, issues already addressed (e.g., repaired), and further identify and/or predict new issues and thereby provide updated, dynamic response plans and issue directions accordingly. Additional details regarding such implementations are provided in the discussion of FIGS. 8A and 8B.

Figure 6B:
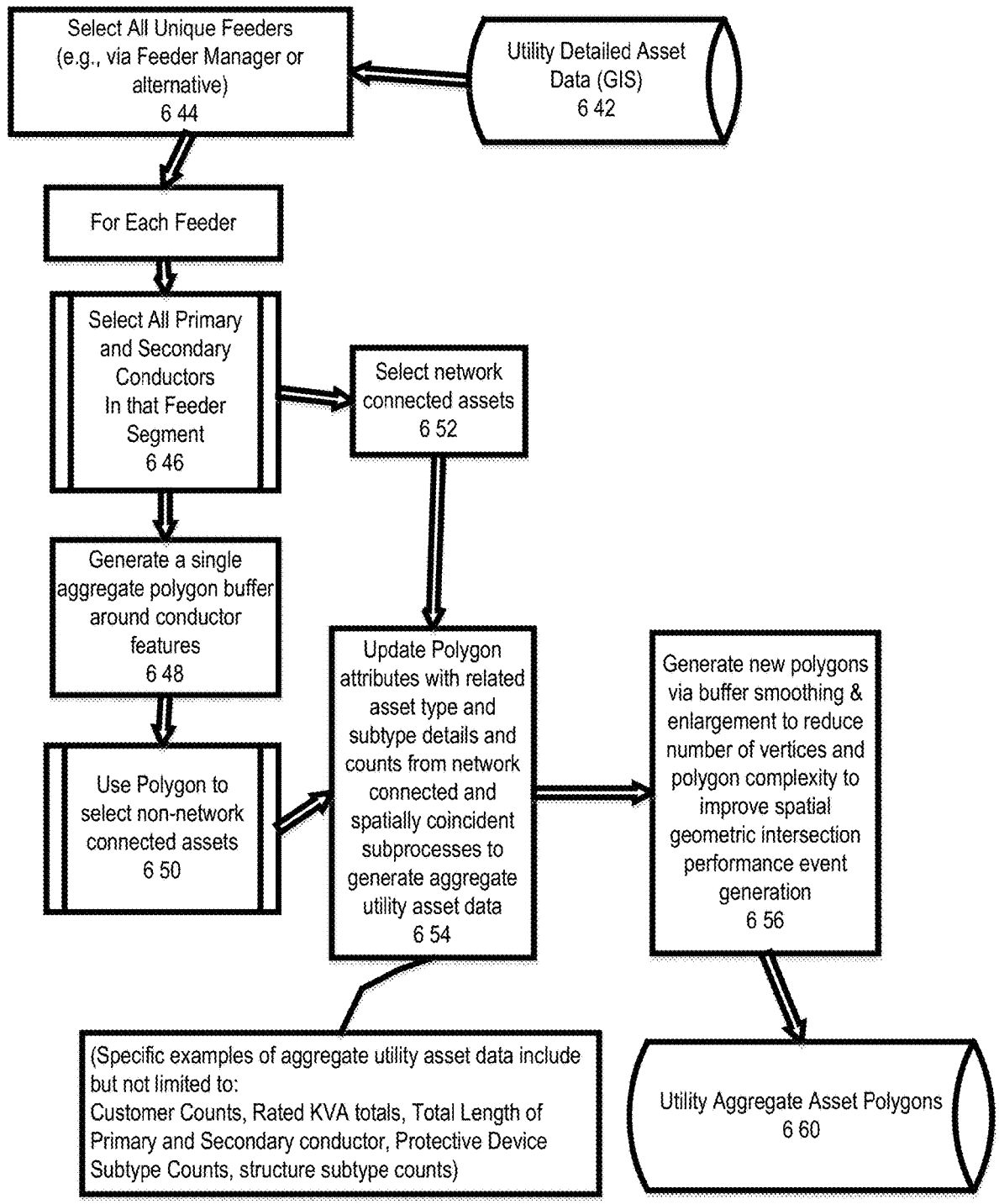
FIG. 6B shows an example flow for an asset polygon determination component according to an embodiment of URAMS.

FIG. 6B provides a flow for utility aggregate asset polygon 660 generation according to one embodiment of URAMS. In this embodiment, URAMS utilizes utility detailed asset data 642 and selects unique feeders 644 (e.g., via ARCFM feeder manager or the like). Then, for each feeder, all primary and secondary conductors in that feeder segment can be selected 646. Network connected assets can be selected 652, for example, based on a forward star tracing algorithm starting at a circuit breaker and going downstream. A single aggregate polygon buffer of a specified amount (e.g., 10 feet) can be generated for conductor features 648, and used to select non-network connected assets 650 (e.g., poles). Then, aggregate utility asset data can be generated 654 based on network connected asset data 652 and non-network connected asset data 650. The network connected asset data 652 and non-network connected asset data 650 can be utilized to update polygon attributes with related asset type and subtype details, and/or counts from network connected and spatially co-incident subprocesses. New polygons can then be generated 656, for example, via buffer smoothing and enlargement to reduce the number of vertices and polygon complexity so as to improve spatial geometric intersection performance even generation, and thereby provide utility aggregate asset polygons 660.

By way of illustration, example Aggregate Asset Schema for a simple electric transmission model and/or damage model is provided below:
OBJECTID_12_13 (type: esriFieldTypeOID, alias: OBJECTID_12_13)
Shape (type: esriFieldTypeGeometry, alias: Shape)
LNSEG_ID (type: esriFieldTypeString, alias: LNSEG_ID, length: 6)
BUFF_DIST (type: esriFieldTypeDouble, alias: BUFF_DIST)
Count_Poles (type: esriFieldTypeInteger, alias: Count_Poles)
Count_Subs (type: esriFieldT eInteger, alias: Count_Subs)
Count_Switches (type: esriFieldTypeInteger, alias: Count_Switches)
Shape_Length (type: esriFieldTypeDouble, alias: Shape_Length)
Shape_Area (type: esriFieldTypeDouble, alias: Shape_Area)

Figure 7A:
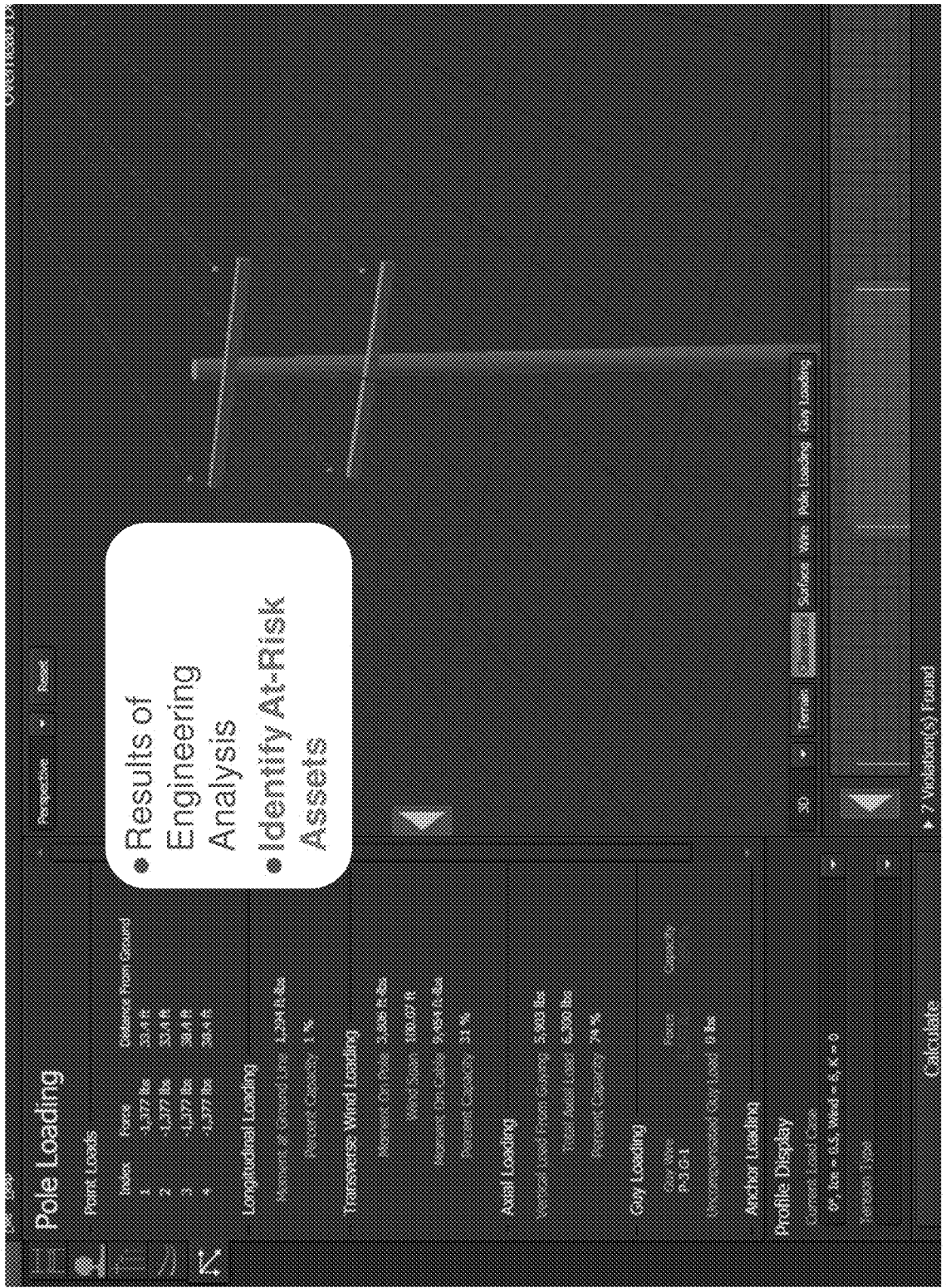
FIG. 7A provides an exemplary at risk asset determination interface for one embodiment of URAMS.

FIG. 7A provides an exemplary at risk asset determination interface. URAMS may provide event alerts and network and asset analytics, such as Miles and Minutes Count, Predictive Outage Optimization, Crew Management, Placement, Hold over and call out, Mutual assistance, Safety, Service Adjustment, Risk from damaged assets (explosions, safety, etc.), Isolate affected customers, Protect network equipment, and/or the like.

During a storm or natural disaster, URAMS may provide improved response, support OMS, DMS, SCADA, etc., Track and Manage Real Time Weather Information (Lightning, Crew safety, etc.), Initiation of Restoration Activities, Lightning, sustained winds, All-clear alerting, Improved Situational Awareness, Internal Common Operating Picture (COP), Prepare public for long-term outages, and/or the like. As shown in FIG. 7B, after a storm or disaster, URAMS may provide Reduced Restoration Time with Predictive Outage Optimization and/or Crew optimization, Timely updates for public with Accurate estimated time of restoration (ETR) and/or Public outage web maps, Damage Assessment including Spatial relationship of weather events to network assets, Lightning strikes, and/or Outage cause analysis, and Feed back into future preparations. FIGS. 9A-9H provide overviews of some features, components, interfaces and aspects of example implementations of URAMS embodiments.

Figure 7C:
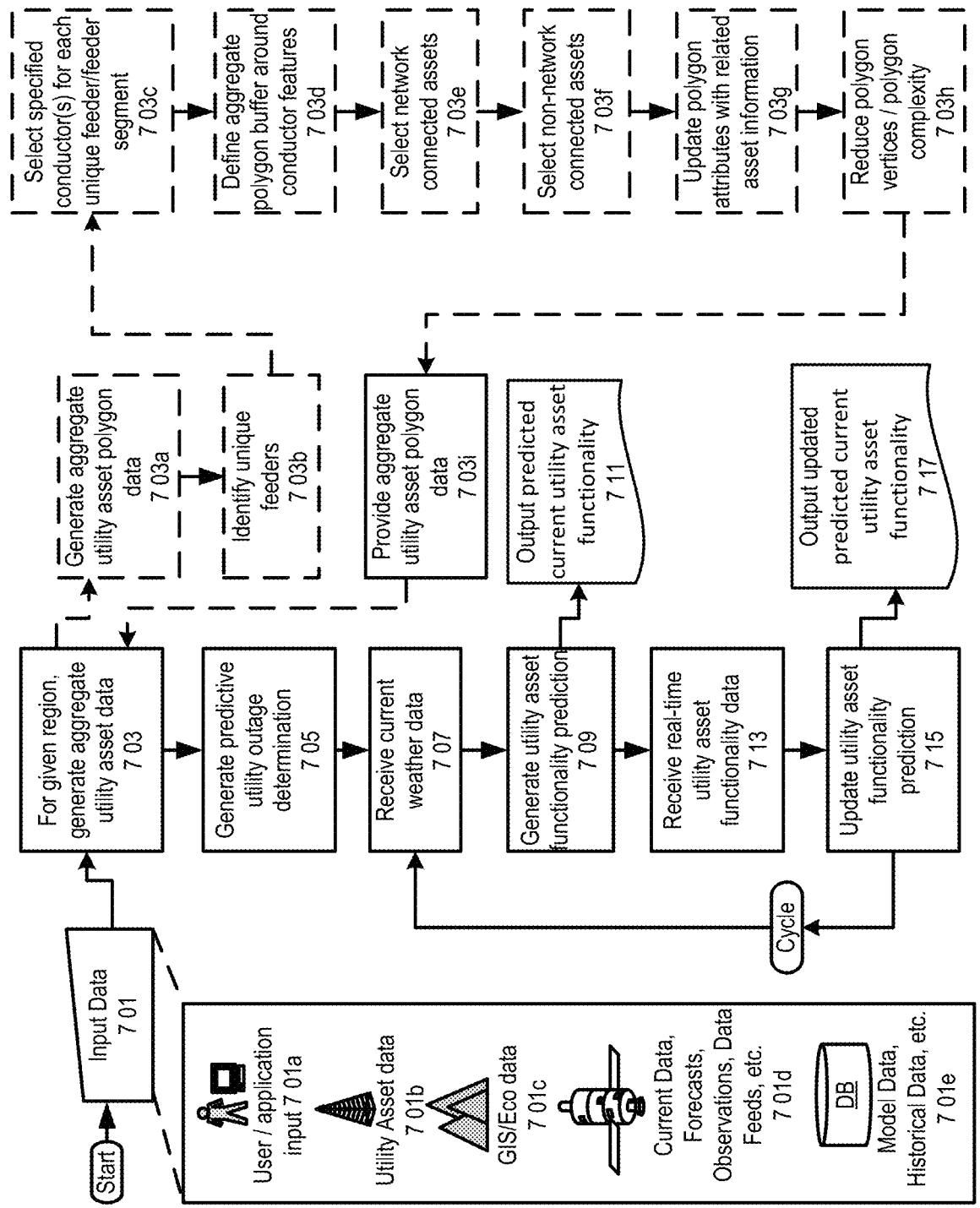
FIGS. 7C and 7D provide exemplary logic flows for some embodiments.
Figure 7D:
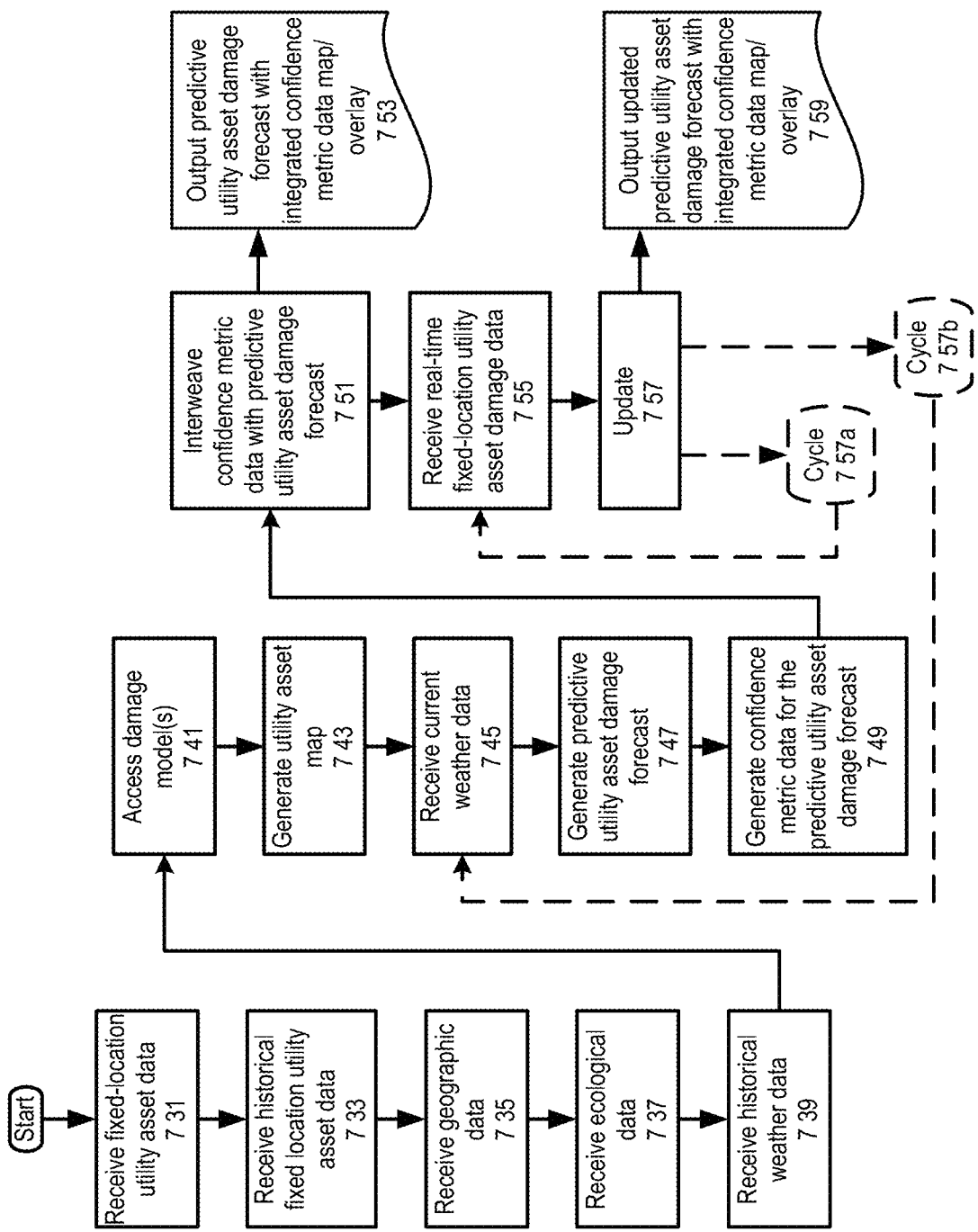
Figure 9A:
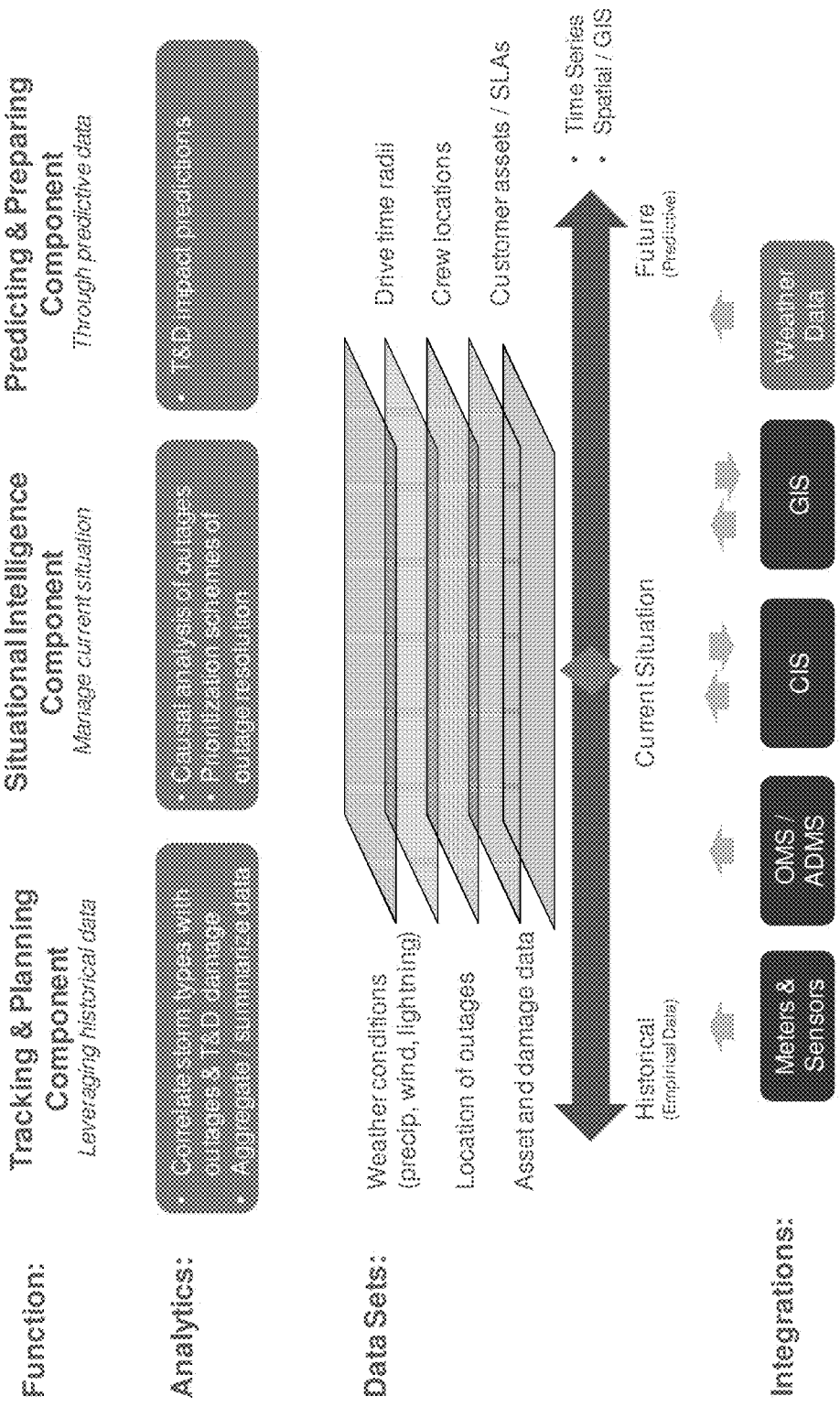
Figure 9B:
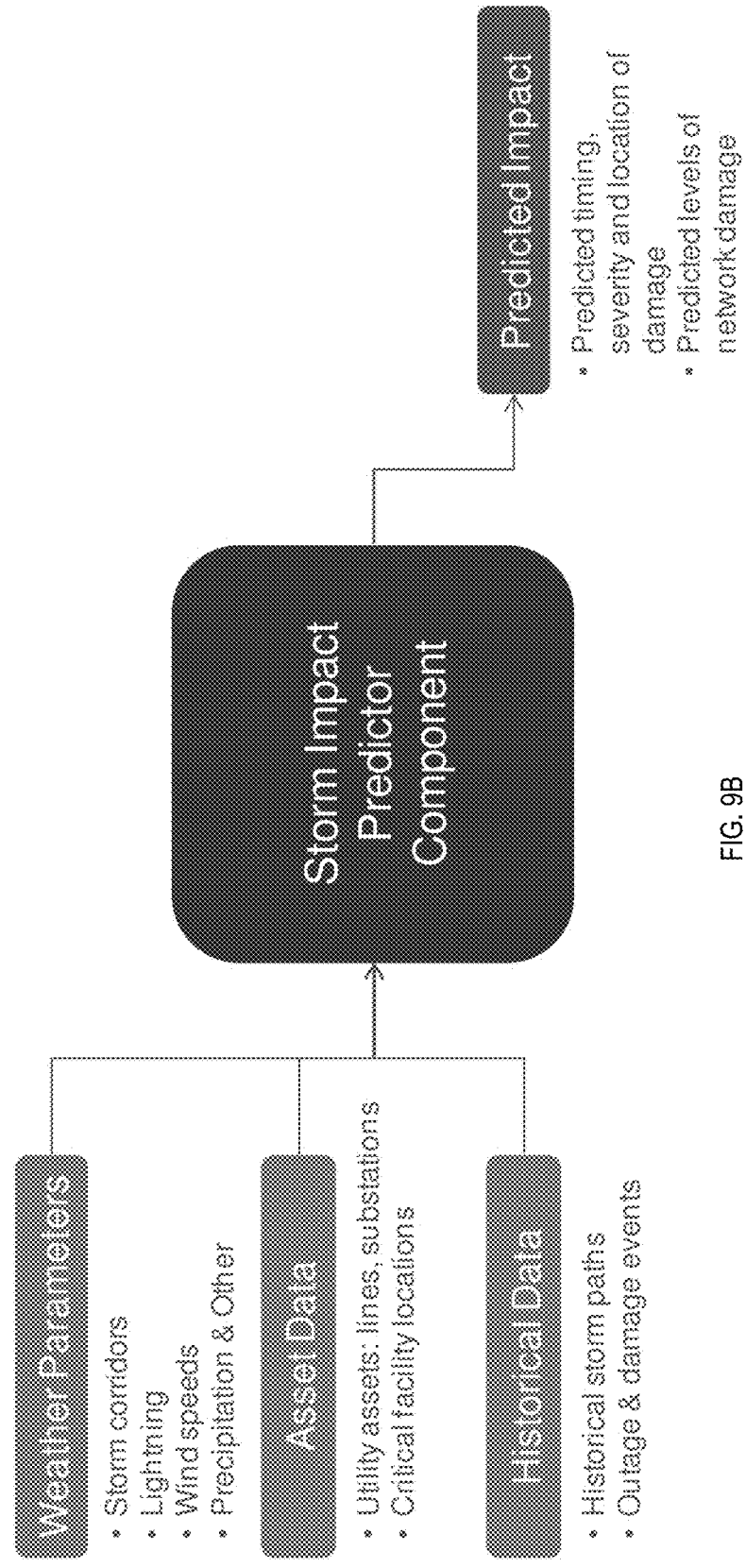
Figure 9C:
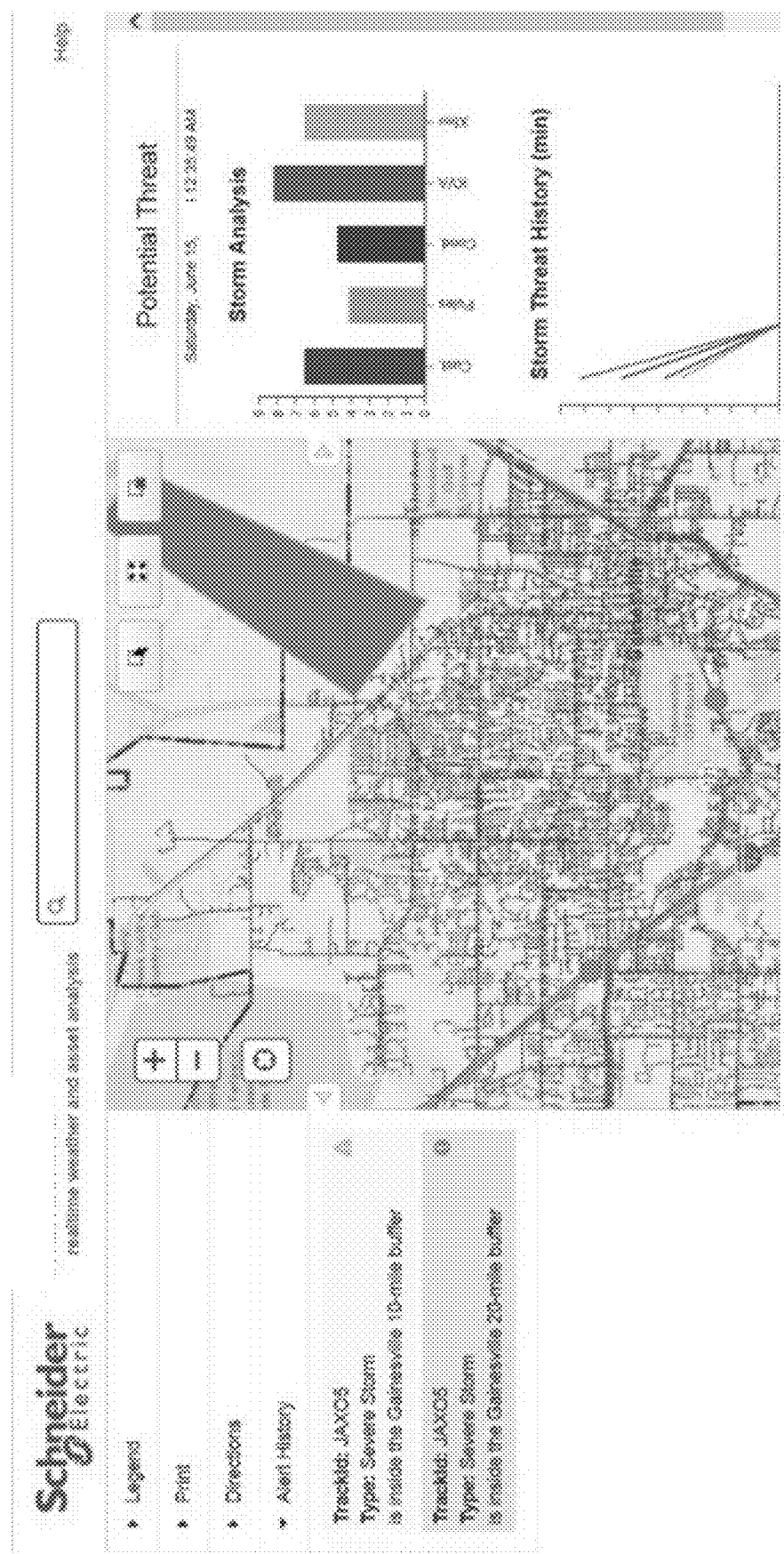
Figure 9D:
Figure 9E:
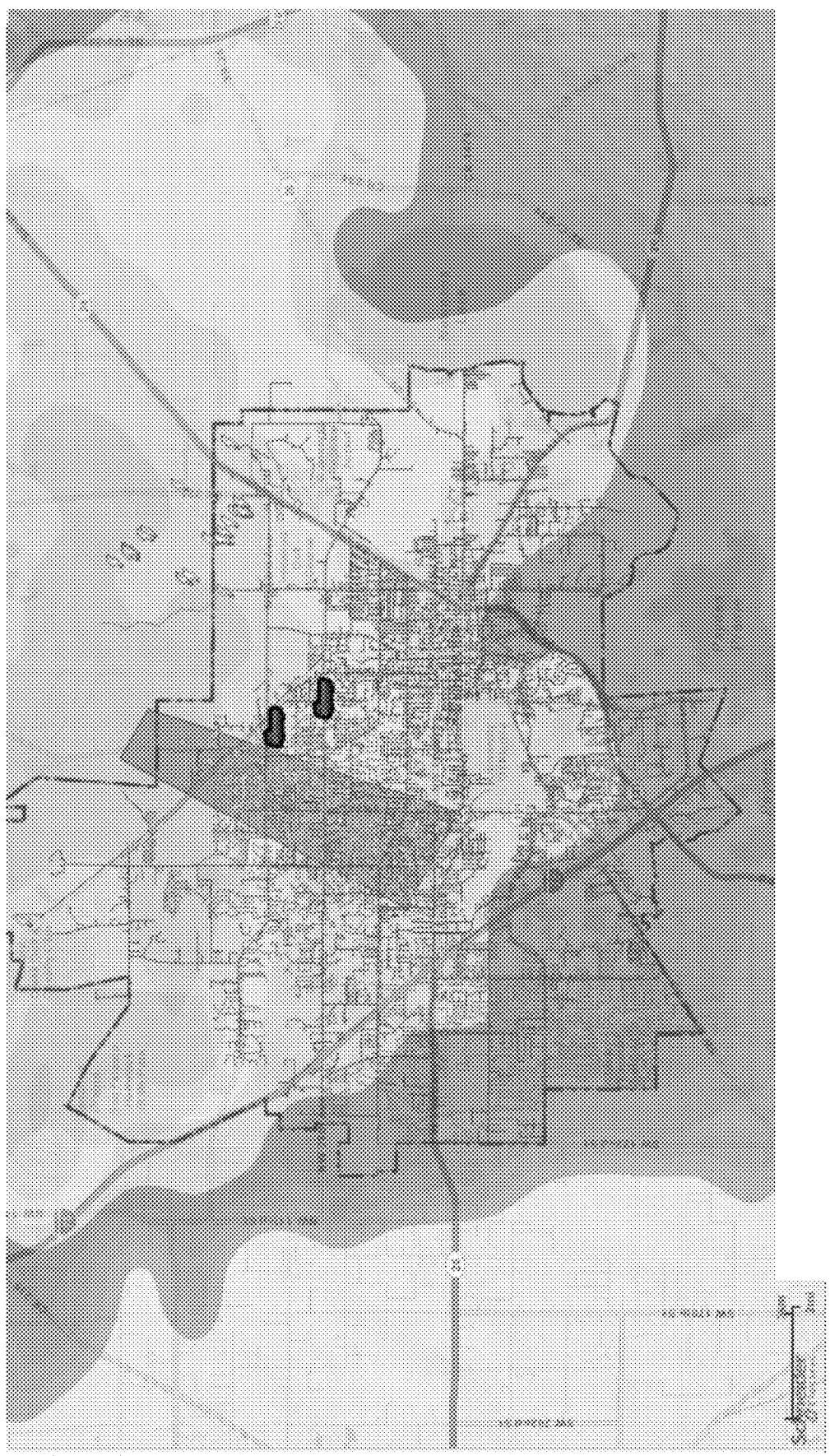
Figure 9F:
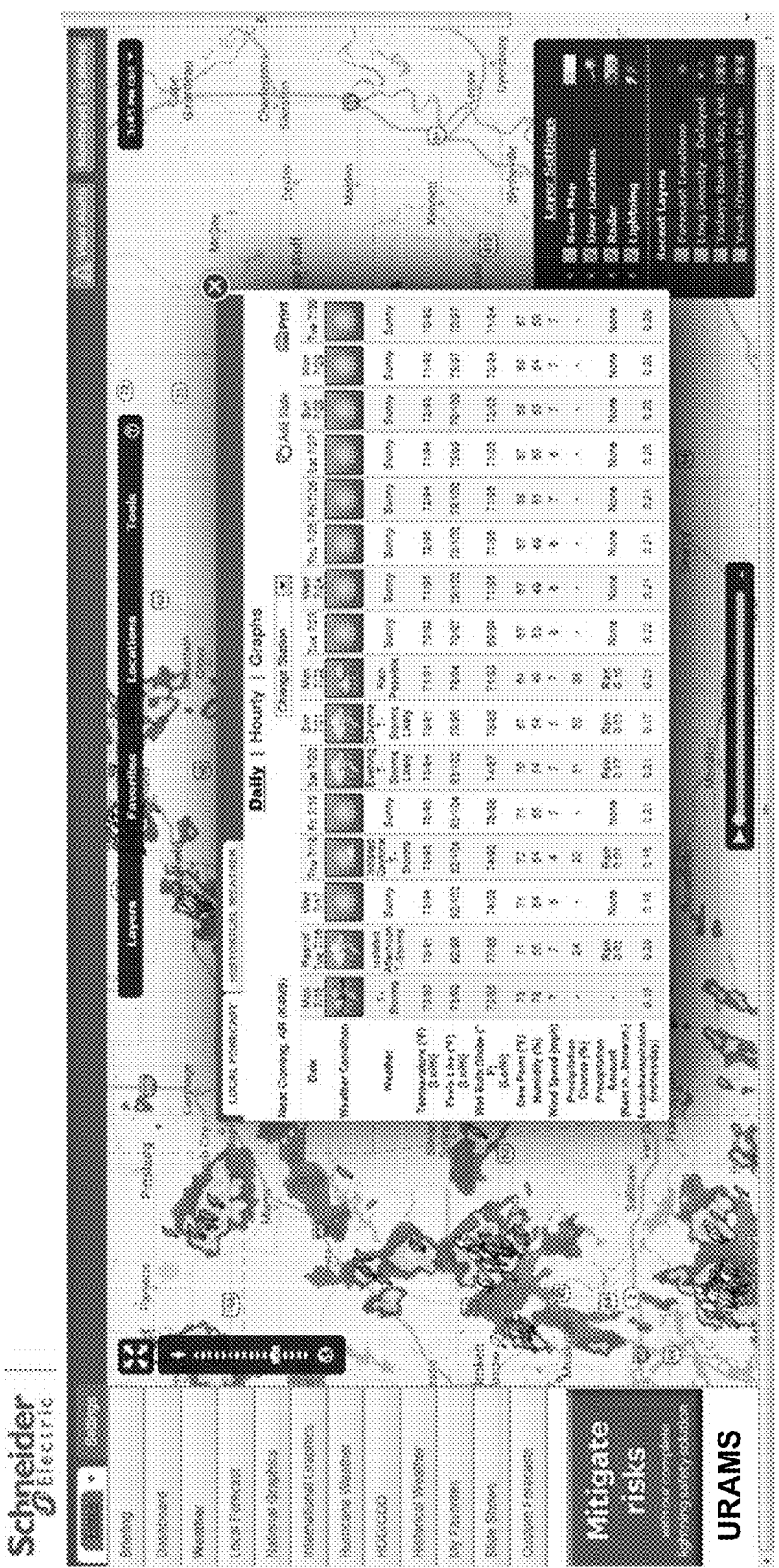
Figure 9H:
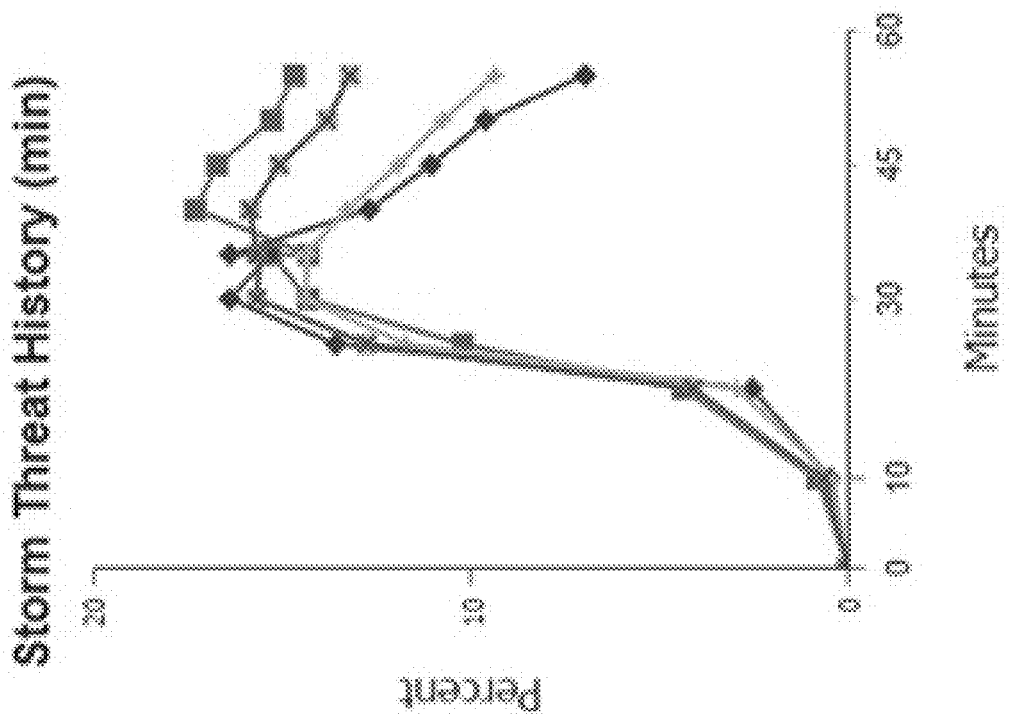

FIG. 7C provides a flow diagram illustrating features of some embodiments according to the disclosure. As shown, a URAMS implementation can receive a variety of input data 701, particular for a given region or area, including user/application input 701a, utility asset data 701b (e.g., fixed-location utility asset data, including, by way of non-limiting example: asset type, asset number, asset geo-location, asset status, and/or asset attributes), geographic (e.g., GIS, etc.) and ecological data (e.g., soil moisture information, vegetation information, vegetation management practices, etc.) 701c; historical data 701e (e.g., historical weather/storm data, storm type, storm attributes, historic natural disaster data, hurricane data, tornado data, earthquake data, flood data, historical damage data, historical fixed-location utility asset functionality data (e.g., utility asset losses and/or malfunctions), etc.). For the given region or area, aggregate utility asset data is generated 703. In some embodiments, the aggregate utility asset data generation can include aggregate utility asset polygon data generation, such as is discussed in FIG. 6B. In some embodiments, generating aggregate utility asset data 703 comprises generating aggregate utility asset polygon data 703a, the generation of the aggregate utility asset polygon data including: identifying unique feeders 703b, and for each feeder, selecting specified conductors in a specified feeder segment 703c, determining an aggregate polygon buffer around conductor features 703d, selecting network connected assets 703e, selecting non-network connected assets based on the polygon buffer 703f, updating polygon attributes with related asset information from the network connected assets and non-network connected assets to generate utility asset polygon data 703g, and reducing the number of vertices and polygon complexity 703h to provide aggregate utility asset polygon data 703i.

In some embodiments, a predictive utility outage determination or utility outage model is generated 705, and in some implementations, a predictive utility outage determination 705 is generated based on one or more of the fixed-location utility asset data 701b, the geographic and ecological data 701c, the historical weather data and historical fixed-location utility asset functionality data 701e, and, in particular embodiments, the aggregate utility asset polygon data 703i. In some embodiments, the predictive utility outage determination is generated via machine learning algorithm(s), including machine learning algorithms with online learning to train the utility outage model using one or more of the fixed-location utility asset data, the geographic and ecological data, the historical weather data, and/or historical fixed-location utility asset functionality data as inputs.

The current weather data 701d for the region/area can be received 707 and a future utility asset functionality prediction result (e.g., fixed-location utility asset functionality prediction result) determined 709 or generated using one or more predictive outage models 701e and based on the current weather data as input to the model in order to generate a prediction output. In some embodiments, the current weather data comprises data regarding current storms and/or natural disasters. The data regarding current storms and/or natural disasters can include at least one of intensity, current wind speeds, lightning strikes, turbulence, current rainfall, current temperature, current pressure, and/or current humidity. The predicted current utility asset functionality result can be output 711 to a user via an electronic interface.

Real-time fixed-location utility asset functionality data can be received 713 (e.g., during a storm, when there are asset failures or damage, the real-time data and/or damage reports can be integrated), and the predictive utility outage determination or predictive utility outage model can be dynamically updated based on the real-time data and real-time fixed-location utility asset functionality data, and the utility asset functionality prediction (and/or utility outage model) can be updated 715 (e.g., predicting a second current utility asset functionality result with the dynamically-altered predictive fixed-location utility outage determination), and output 717 (e.g., the second current utility asset functionality result output to a user via an electronic interface).

In some embodiments, an implementation of the URAMS can receive mobile utility asset data (e.g., responder information, asset part information, crew information, location information, etc.) for a given region and determines mobile asset allocation parameters based on at least one utility asset functionality result, and in that way, provide an optimized response plan, which takes the various asset locations and risk/threat parameters into account. The mobile utility asset data can include mobile asset type, asset number, asset current location, asset status, and/or the like.

Some embodiments of the URAMS can provide a predictive utility asset damage and response interface by receiving fixed-location utility asset data for a given area 731, receiving historical fixed-location utility asset damage data associated with the fixed-location utility asset data 733, receiving geographic data 735 and/or ecological data 737 for the given area, receiving historical weather data 739 for the given area, and accessing/retrieving at least one damage model 741.

A utility asset map based can be defined or generated 743, such as generated or defined based on the fixed-location utility asset data, the geographic data, and the ecological data. In some embodiments, the utility asset map can include mobile utility assets that can be utilized for responding to damage, and can include, for example, a mobile asset identifier, mobile asset location (current GPS location), etc. Similarly, the map can include paths that a mobile asset can follow (e.g., roads) and can include such information in making determinations (i.e., recognizing that the shortest distance for mobile asset to traverse can be dependent on the paths the mobile asset can take). The current weather data for the area can be received 745. The current weather data can include real-time and/or near real-time weather information and observations (e.g., readings from weather stations, satellites, XML weather service observation feeds, etc.), and can additionally or alternatively include current weather forecast data (from a forecast feed or other source, and/or generated by URAMS). A predictive utility asset damage forecast can be generated 747 using at least the at least one damage model and, in some embodiments, based on the utility asset map (and/or map data), the historical fixed-location utility asset damage data, the historical weather data, and/or the current weather data. A confidence metric and/or confidence metric data can be determined for the utility asset damage forecast 749. In some embodiments, determining confidence metric data for the utility asset damage forecast is based on iterative processing of the at least one damage model. In some embodiments, determining confidence metric data is based on Monte Carlo simulation and/or analysis. In some embodiments, the confidence level or metric is independent of the underlying statistical model or models used to generate the prediction.

It is to be understood that, in some embodiments, the maps discussed herein are broken down into gridpoints and/or sub-areas/sub-regions for analysis, processing and/or predictions, and thus provide dynamically scalable maps and data with adjustable granularity of detail and analysis. In such embodiments, each gridpoint or area can be iteratively analyzed/processed, and can have a corresponding prediction, damage, and/or threat assigned, with a corresponding confidence metric The confidence metric data can be integrated or interwoven 751 with the predictive utility asset damage forecast to define or provide an initial predictive utility asset damage forecast with integrated confidence metric data, which can, in some embodiments, be output as a dynamically scalable utility asset map and/or map overlay 753 for presentation to at least one user via an electronic interface. In some embodiments, the forecast is an overlay of the map, and the confidence metric data is interwoven in the display and/or overlay.

In some embodiments, real-time fixed-location utility asset damage data for the area is received 755 and the initial utility asset damage forecast with integrated confidence metric data, the utility asset damage forecast, and/or the confidence metric data is updated 757 based on the real-time fixed-location utility asset damage data, and an updated dynamically scalable utility asset map and/or map overlay can be output and/or displayed 759. In some embodiments, the process can cycle 757a to update based on new damage data, resolved damage problems (e.g., a damage issue is resolved), mobile asset location/availability (e.g., scheduled or required downtime, breakdown, etc.). In some embodiments, the process can cycle 757b to get updated weather data and generate new forecasts. In some embodiments, when the forecast or confidence metric changes more than a specified amount, an alert can be generated (e.g., if a particular damage prediction for a sub-area goes from a low probability to a high probability, or other threshold is reached, the color can change or flash to alert a user, and in some embodiments, mobile resource allocation plans can be updated based on the change, such as directing a crew in one area to move closer to the newly-high probability damage area).

In some embodiments, defining and/or generating a utility asset map can include generating aggregate utility asset polygon data. The generation of the aggregate utility asset polygon data can comprise, in some embodiments: identifying unique feeders, and for each feeder, selecting specified conductors in a specified feeder segment, determining an aggregate polygon buffer around conductor features, selecting network connected assets, selecting non-network connected assets based on the polygon buffer, updating polygon attributes with related asset information from the network connected assets and non-network connected assets to generate utility asset polygon data, and reducing the number of vertices and polygon complexity to provide aggregate utility asset polygon data.

In some embodiments, simulation scenario data can be received, the simulation scenario data including a plurality of scenario parameter values, and the initial utility asset damage forecast with integrated confidence metric data can be updated based on the plurality of scenario parameter values.

An updated dynamically scalable utility asset map and/or map overlay based on the plurality of scenario parameter values can be output and/or displayed. The updated dynamically scalable utility asset map/map overlay can illustrate differences in the predictive utility asset damage forecast and confidence metric data as variables changes over time.

In some embodiments, an updated dynamically scalable utility asset map and/or map overlay based on the plurality of scenario parameter values can be output/displayed, and can illustrates differences between the initial predictive utility asset damage forecast with integrated confidence metric data and the updated dynamically scalable utility asset map overlay based on the plurality of scenario parameter values. A proposed mobile asset plan, such as a proposed utility crew deployment plan, can be generated, based on a variety of parameters, including based on man-hour estimates for storm response effort based on differences between the initial predictive utility asset damage forecast with integrated confidence metric data and the updated dynamically scalable utility asset map/map overlay. In some embodiments, a current mobile asset plan, such as a current utility crew deployment plan, is accessed, and an updated proposed utility crew deployment plan generated based on the plurality of scenario parameter values. In some embodiments, key archival comparison metrics associated with data is accessed and used to generate the dynamically scalable utility asset map/map overlay, and the key archival comparison metrics can be used to identify at least one historically similar damage event crew deployment and return to service characteristics from a historical performance database. Based on that, a performance score for the current event as compared to the historical event can be determined.

In some embodiments of the URAMS, online and mobile applications may be created for Utility Providers for use in determining nearby assets (fixed and/or mobile) that can be used and/or positioned to respond to risks at other fixed assets (i.e., locations of supplies and work crews that can respond to a damaged transformer or downed lines). In some embodiments, providers may make information about service assets visible to external sources, such as government agencies, disaster response groups, other utility companies, etc. In some embodiments, an external source may be the URAMS itself, which may provide the information to account holders. In FIG. 8A, a URAMS interface may allow a provider 801 to search for nearby (service) assets and/or risk target assets. In this example, the URAMS may communicate with URAMS components to determine assets in the proximity to other assets (e.g., service assets and risk assets). In some embodiments, the proximity may be determined via GPS 808 or through wireless provider towers 809, e.g., particularly if a mobile asset is utilizing a mobile component of the URAMS (such as on mobile phone or dispatch device installed in a service truck). In some embodiments, through either an online or mobile URAMS application, the provider may be able to specify the search parameters, or it may be done automatically based on data provided by the provider. By way of non-limiting example, the provider may opt for a radial, polygonal or zone (e.g., postal code) search 806 out of the location of the fixed asset, mobile asset, risk/target, URAMS application, or from some other location. In some embodiments, the provider may specify a geographic region to search which may use city, county, state, or other specified boundaries with which to define the searchable region. In this example, once a search region has been specified by the URAMS application, a URAMS location/allocation Component 820 may use its integrated data 830 to determine fixed location assets/risk targets 804a, 804b, and 804c and/or fixed location (service) assets 804d (e.g., main access or supply storage) and the associated risks, supplies, etc. for each. In one example, the URAMS may issue a database query to determine available resources at a particular service asset (e.g., the number of replacement transformers, replacement poles, bales of wire, etc.) within a specific geographic region. In the exemplary pseudocode example below, a procedure uses point/circle intersection to simulate the location of an asset within a radial search 806. In some embodiments, by way of non-limiting example, searches may be done as point in polygon intersections, the URAMS may pre-order assets by location to allow for faster querying, the URAMS may store postal and/or geographic region information in addition to location coordinates with assets in the integrated data structure, and/or the like.

```
CREATE PROCEDURE radial_intersect(IN rad DECIMAL)
BEGIN
DECLARE location_x DECIMAL;
DECLARE location_y DECIMAL;
DECLARE radius DECIMAL;
Radius=rad;
SELECT Latitude, Longitude
INTO location_x, location_y FROM Mobile Asset
WHERE MobileAsset_id="MA123";
SELECT Asset_id
FROM Facilities
WHERE External_Visibility="true" and EXISTS (power
    (Latitude−location_x, 2)+power(Longitude−location_y, 2)<power(radius, 2);
END
```

If the proximity search 806 does not return sufficient results to address risks, an expanded search 807 would add assets 804a, 804b.

In FIG. 8B, the URAMS may further improve proximity searches by introducing a shortest path ordering to the results 858. The URAMS could determine not just nearby assets, but take into account access to these assets along common travel paths. Some assets may be equidistant from a mobile asset, but one may be more accessible to the mobile asset than another by common travel paths, including but not limited to roads, access paths, and/or the like. In this example, the URAMS may rank assets first by absolute distance 858a and then by shortest path access 858b. Alternatively or additionally, assets may have a higher risk or resource rating and therefore be have a corresponding increased weighting assigned when calculating paths and/or allocation (i.e., where to station mobile assets in preparation for hurricane or snow storm). Additionally, in some embodiments, if paths are not available real time, such as due to bridge damage, downed power poles, etc., the URAMS can factor this information in to the determinations and path outputs.

In both examples, search results may be subject to a minimum risk threshold to assure risks are adequately addressed by providers 859. If the provider or URAMS expands the search parameters 860, the search can be repeated with a larger region, in which the URAMS may or may not include shortest path enhancements. Shortest path enhancements may be available as a setting in the URAMS application or may be automatic to the URAMS search or allocation component. If the provider elects not to expand the search results, the URAMS may display in either its online or mobile interface that there is an unmet risk based on specified parameters 862. If there are sufficient assets to address anticipated risks, the URAMS may display the search results and/or an asset allocation plan/response plan (e.g., a path or schema like 858e) in either its online or mobile interface 861.

Embodiments of URAMS dynamically combine weather information and utility GIS to better prepare before the storm, allowing savings of miles and minutes with crew management and network assets. During the storm, URAMS optimizes response and all clear for safety, and after the storm reduces restoration time and costs, all the while ensuring crew and public safety and keeping the public informed.

Figure 10:
FIG. 10 provides an exemplary main dashboard according to some embodiments of URAMS.

In some embodiments, URAMS provides a unique approach to data presentation. In some embodiments, URAMS utilizes the dc3 and de Javascript libraries to present dynamic data to the users. Dc is a Javascript charting library allowing efficient exploration of large, multi-dimensional datasets. D3 is also a Javascript library which allows for manipulating documents based on data. URAMS may use those libraries in a unique way to allow users a better view of the situation they need to analyze at any given moment. The details below illustrate an elegant and unique use of these libraries focused toward electric grid event root cause analysis decision making. URAMS allows users to analyze various events on the network based on weather events. In some embodiments, URAMS has a main dashboard which shows the current situation (weather alerts and affected assets). It may also allow users to also create reports to gain a better understanding of the situation (both current and, more importantly, historical). In some implementations, both the main dashboard and a Scada report use Dc libraries to combine various pieces of data into a coherent view which users can utilize for analysis and conclusion on various network events. This combination of various data views is a very unique and innovative way of using Dc. An example implementation of a main dashboard for one embodiment is shown in FIG. 10. Here, the left hand side of the dashboard displays the notifications of various weather related events (in this case lightning). Users can also, among other things, create reports there.

Figure 11:
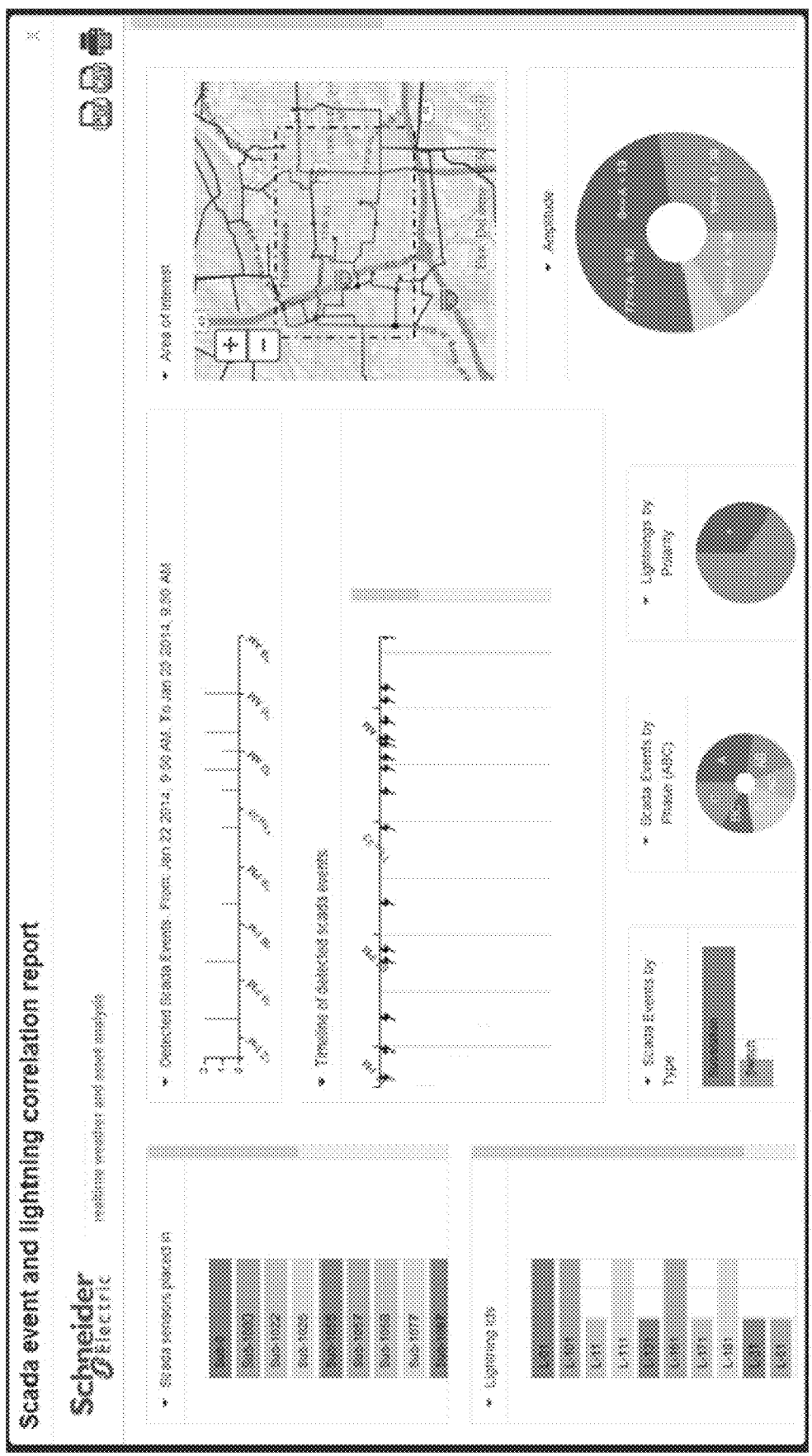
FIGS. 11-15B provide exemplary SCADA Events and Lightning Correlation reports and interfaces according to some embodiments of URAMS.
Figure 12:
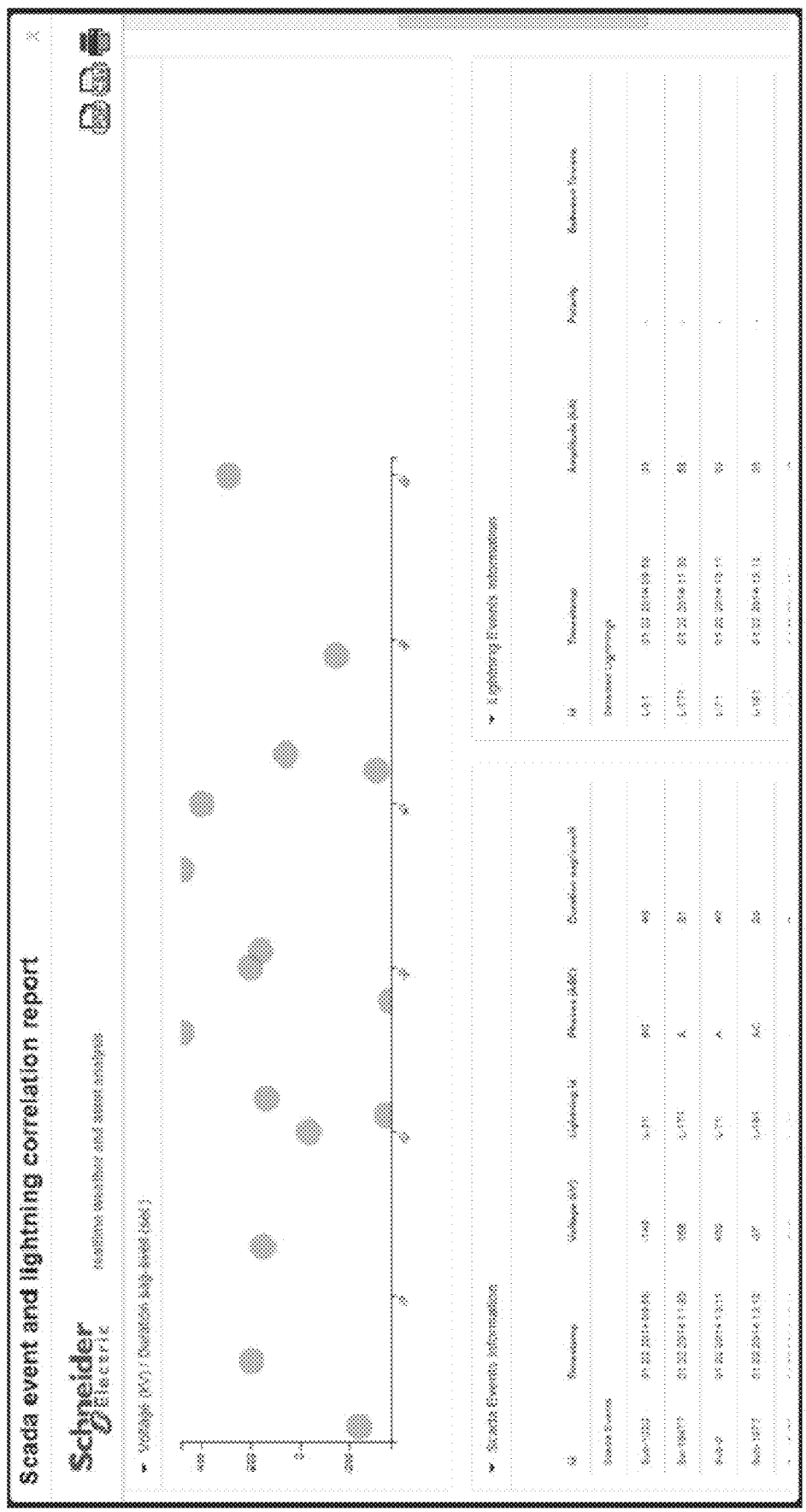

FIGS. 11 and 12 provide an example SCADA Events and Lightning Correlation report for one embodiment of URAMS. As shown, the report has three distinct areas where users can start their analysis: On the very right hand side, users can see the list of both SCADA events and lightning IDs. The middle of the report displays various charts which allow users to gain a better understanding of the situation. This includes the tabular view of the data. And then there is the map which shows the area being analyzed and the location of SCADA sensors. All of this data may be manipulated to gain a better insight into any events (or set of events). One particular data display shown is the 'Timeline of Detected SCADA Events'. This is a very unique use of D3 to show the events as they occurred along the analyzed timeframe.

Figure 13:
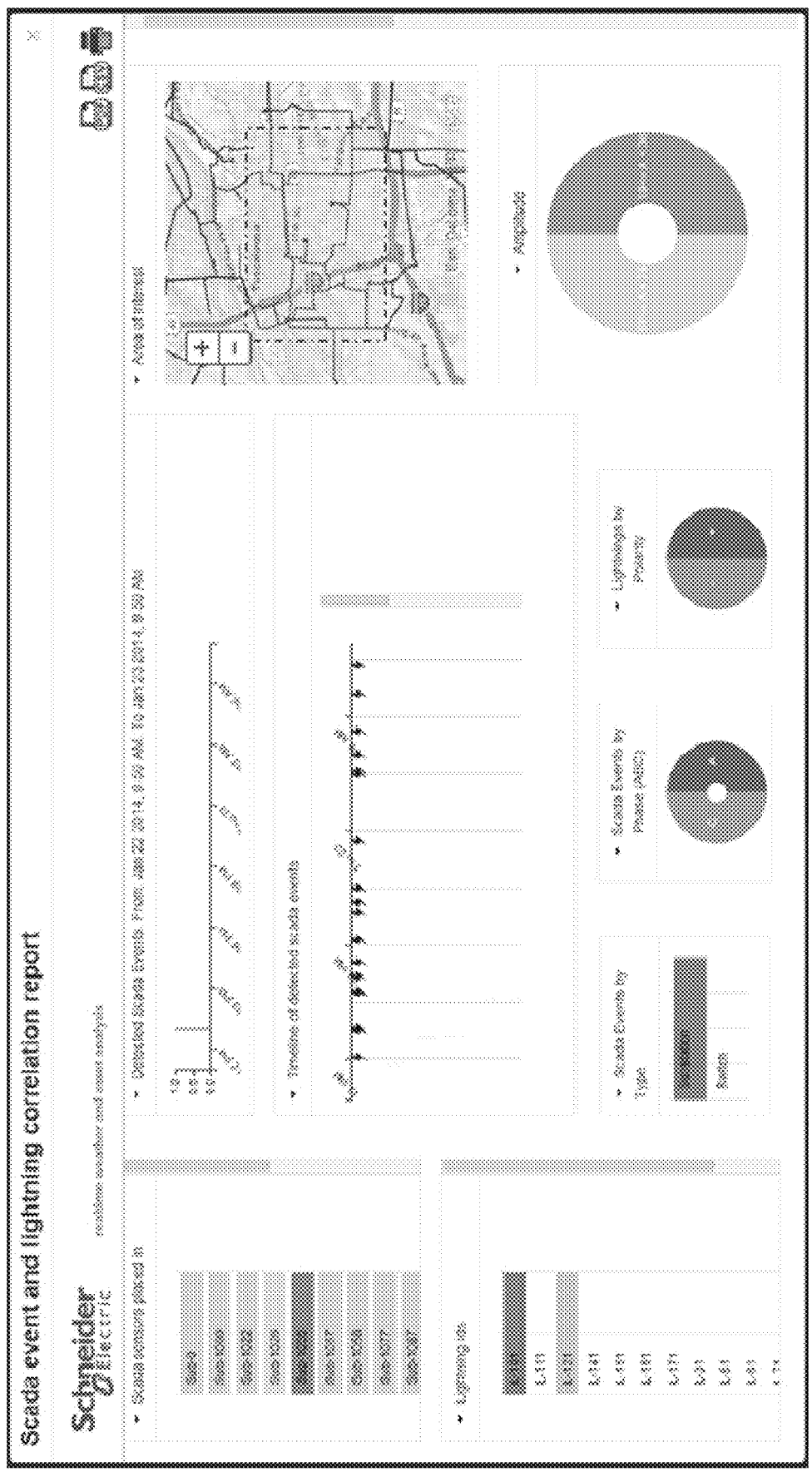
Figure 14:
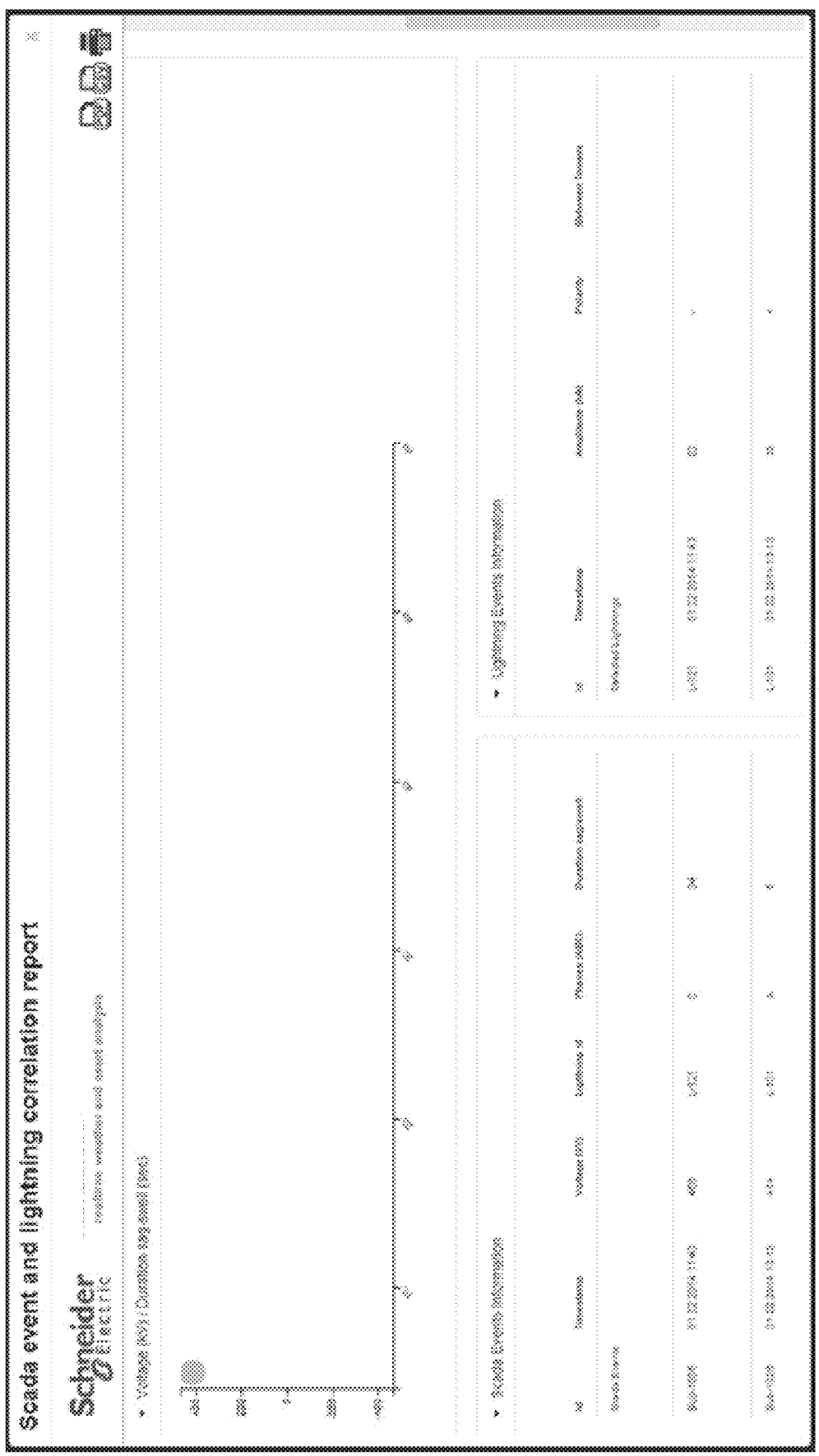
Figure 15A:
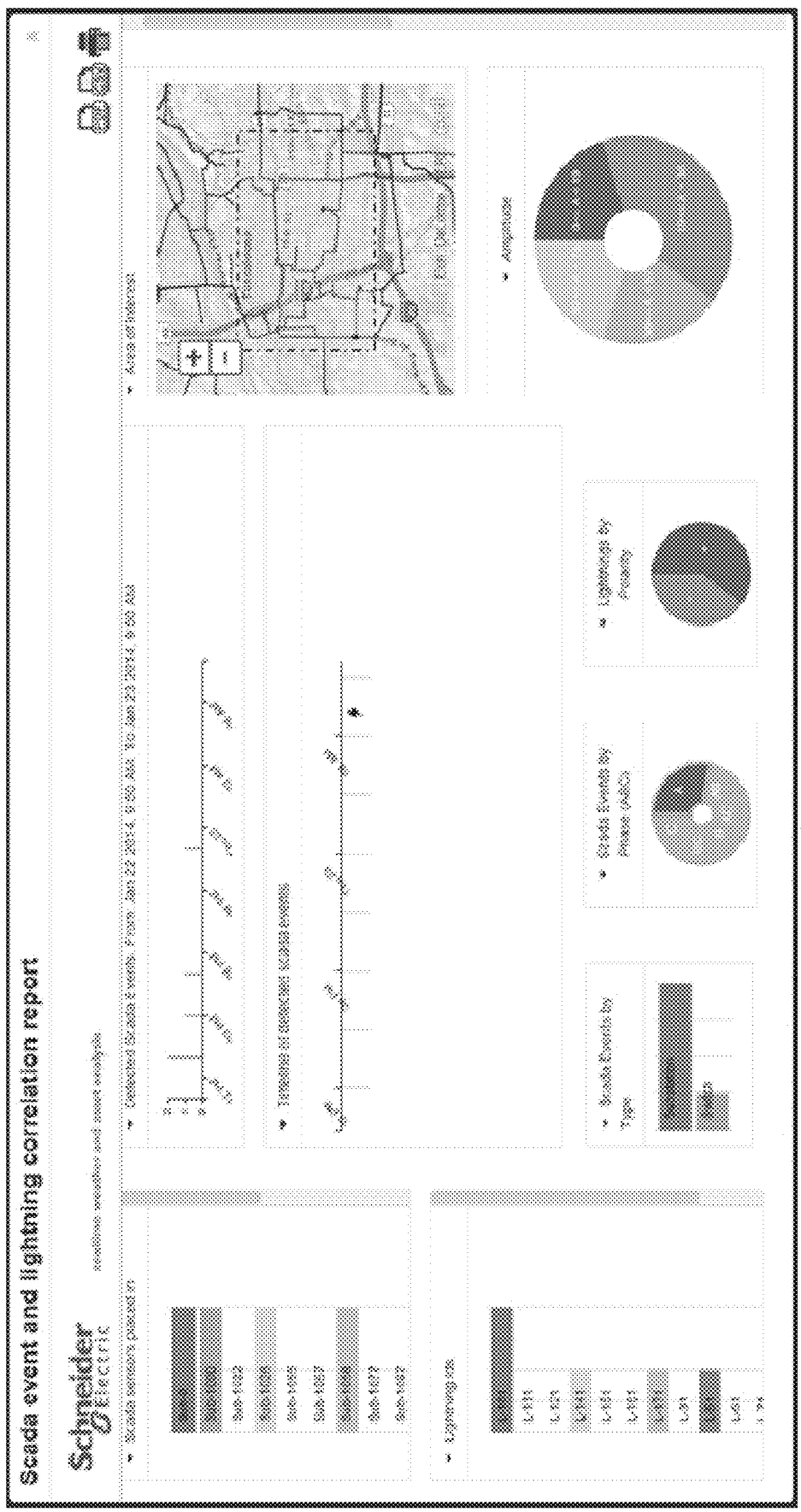
Figure 15B:
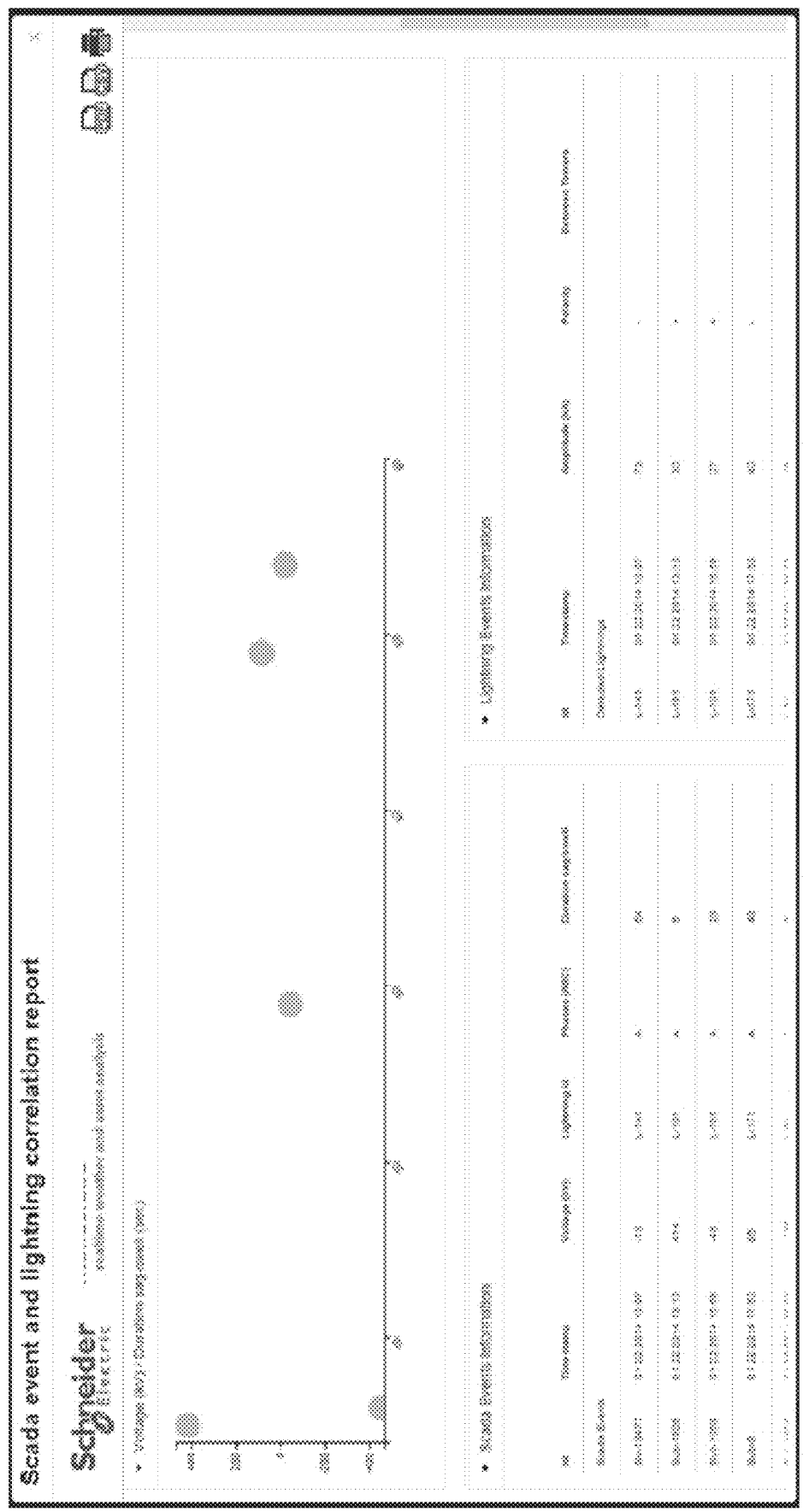

Embodiments of the URAMS may provide for Analysis Scenarios. For example, one scenario could be that a user selects a SCADA sensor to see which events are tied to it. Note that data display changes to just show the events/occurrences relevant to that SCADA sensor. An example report is shown in FIGS. 13 and 14. As can be seen, in this implementation, only the information relevant to the selected SCADA sensors is displayed in the report. User may, in some embodiments, also manipulate other charts to analyze data. For example, if a user wants to see SCADA events related to A phase, all she needs to do is to select A phase from the 'SCADA Events by Phase' chart. An example report for such a scenario is shown in FIGS. 15A and 15B, where again, only information relevant to A phase is presented to the user.

Embodiments of the URAMS provide unique components, tools, features and/or applications that add a weather feature to the analysis. By overlaying weather and/or like data, users can gain a better insight into a relationship between events in the network and weather situation at any given time. This enhances users' ability to be more proactive in preventing future problems by looking for patterns in the past. URAMS may focus decision making around grid events, the time they happened and the weather/storm activities and other interesting events to drive root cause analysis decision making for users. Time based correlation and visualization and advanced heterogeneous event filtering are some innovative and unique components of URAMS.

In some embodiments, URAMS provides a processor-implemented method for utility threat assessment, prediction/modeling and resource allocation, comprising: receiving fixed-location utility asset data for a given region (related to assets such as electricity poles, sub-stations, and so forth, in a geographic location), wherein the fixed-location utility asset data comprises asset type, asset number, asset geo-location, asset status (e.g., active/inactive), asset attributes (pole height, size, and/or the like); receiving geographic and ecological data (from, for example, weather data feeds, satellite data, sensor data, weather stations, local reports, real-time sensors, and so forth) for the given region, wherein the geographic data comprises geolocation data used to form a polygonal shape on a map representing the geographical location (and/or other data) and is stored in a database, wherein the ecological data comprises soil moisture information, vegetation information, vegetation management practices, (and/or other eco data such) and is stored in a database; receiving historical weather (e.g., from a weather feed, historical database, and/or the like) for the given region, wherein the historical weather data comprises at least one of: historical storm data including storm type (rain storms, snow storms, etc.) and storm attributes (wind speed, precipitation, lightning strikes, intensity, etc.); and historic natural disaster data including hurricane data, tornado data, earthquake data, flood data, etc.; receiving historical fixed-location utility asset functionality data (from, by way of non-limiting example, a utility's database, a geographic record, governmental and/or municipal database, and/or the like) for the given region, wherein the historical fixed-location utility asset functionality data comprises data about utility asset losses and malfunctions; generating a predictive utility outage model (and/or damage model) based on the fixed-location utility asset data, the geographic and ecological data, the historical weather and historical fixed-location utility asset functionality data (via/using, by way of non-limiting example, machine learning hardware, components and/or algorithm with online learning to train the utility outage model and/or damage model using the fixed-location utility asset data, the geographic and ecological data, and the historical weather and historical fixed-location utility asset functionality data as inputs which provide prediction outputs), wherein in some embodiments, the model is represented as a vector field of values/a matrix of values/a function which may, in some implementation, be updated via components and is used to calculate a prediction of fixed location utility outages or damage; receiving current weather data (from satellite data, weather feed, etc.) for the region, wherein the current weather data comprises data about current storms or natural disasters, including, for example, at least one of intensity, current wind speeds, lightning strikes, turbulence, current rainfall, current temperature, current pressure, current humidity, and/or the like; determining a future fixed-location utility asset functionality or damage prediction result using the predictive outage/damage model based on the current weather data as input to the model in order to generate a prediction output; outputting the predicted current utility asset functionality/damage result to a user via an electronic interface; receiving real-time fixed-location utility asset functionality/damage data for the region, wherein the real-time fixed-location utility asset functionality data includes parameter data and/or the like and indicates changes to fixed-location utility assets in the region (in some embodiments, including status changes, damage amount, activity, etc.); dynamically altering the predictive utility outage model (and/or damage model) based on the real-time fixed-location utility asset functionality data via retraining the predictive/modeling component; predicting a second current utility asset functionality result with the dynamically-altered predictive fixed-location utility outage/damage model via using the current fixed-location utility asset functionality data as input to the altered model in order to calculate new prediction outputs; and outputting the second current utility asset functionality result to the user via an electronic interface.

In some implementations of the URAMS, the above method may further comprise: receiving mobile utility asset data for a given region (related to mobile and/or portable assets such as spare parts, parts warehouses, service trucks, service teams, and or the like), wherein the mobile utility asset data comprises, by way of non-limiting example, at least one of mobile asset type, asset number, asset current location, asset status (e.g., active/inactive, tasked, reserved), asset attributes (size, age, quality, etc.); determining mobile asset allocation parameters based on at least one utility asset functionality result.

In some embodiments of the URAMS, a file or feed (e.g., a CSV file) output from the URAMS may be provided as input to a geometric vector data generator, which may provide additional data output options. In some embodiments of the URAMS, the geometric vector data generator may output geometric vector data files to a file server which may provide the data output to an alert server which may provide the output a communications networks to such partners, utilities, third parties, software applications, end users and/or the like as described. In some embodiments of the URAMS, the geometric vector data generator may output geometric vector data files, such as shapefiles, for storage in GIS database(s). In some embodiments of the URAMS, Web Mapping Services (WMS) and/or Web Feature Services (WFS) may obtain the geometric vector data files from GIS database(s) and provide geographic service integrators with URAMS output data through various communication networks as described. In some embodiments of the URAMS, file server(s) and/or WMS may incorporate the URAMS output data into a URAMS integrated server with application, data, and/or network components. A URAMS integrated server may employ such output data from URAMS algorithmic components in proprietary software tools, web services, mobile applications and/or the like. In one embodiment of the URAMS, a URAMS integrated server may employ URAMS algorithmic component output for use in response planning and utility asset planning tools.

In some embodiments, the URAMS can utilize URAMS weather stations. For some implementations, a URAMS weather station includes three main components: the weather sensor, the data hub and the forecasting/display system.

A URAMS weather sensor can be configured in a number of ways, though in some embodiments, the URAMS weather sensor can include a LUFFT WS700 All-In-One weather sensor. The URAMS weather sensor can integrate all of the following measurements into a single, intelligent package: air Temperature & Relative Humidity; Precipitation Intensity, Type and Quantity; Air Pressure; Wind Speed & Direction; and/or Solar Power.

By using an "all in one" design, some embodiments of the URAMS weather sensor simplifies the mounting of the sensor, the wiring back to the data hub, and reduces the overall cost of the weather station. Communications with the data hub can be digital, enabling them to be installed at great distances from one another, without affecting the measurements. In some embodiments, the URAMS weather sensor is solid state, providing a virtually maintenance-free weather observation measurement capability, a major advantage over the common weather station solutions including tipping bucket and cup and vane wind sensors. Ultrasonic sensor technology can be used to take wind measurements, which measures the Doppler Effect on pulses of ultrasonic sound energy. Precipitation can be measured, e.g., by a 24 GHz microwave Doppler radar which measures the drop speed of an individual drop of rain/snow. This method for precipitation detection is configured to work in all seasons and is not affected by build up of dirt and grime which plagues optical sensors. The radome can be heated, so freezing rain will not interfere with operations. Precipitation quantity and intensity are calculated from the correlation between drop size and speed. The difference in drop speed determines the type of precipitation (rain/snow), and the size determines the intensity. Relative humidity can be measured by a capacitive sensor element, and a precision NTC (negative temperature coefficient) measuring element can be used to measure air temperature. Solar power can be measured with a silicon pyranometer, mounted horizontally.

In some embodiments, a URAMS data hub, such as a WEATHER SENTRY data hub, is the device responsible for communicating with the weather sensor(s), and sending the measurements to the URAMS and/or a URAMS Remote Services Platform. The data hub can include a datalogger, such as the SCHNEIDER ELECTRIC ComX'210 datalogger.

In some embodiments, the URAMS collects and processes a variety of information, including information that goes into the models. In some embodiments, a geographic model grid can be used as a baseline and reference for model input and output data and for use in generating geospatial aggregations of model inputs and outputs. The data format of this model grid can be configured depending on the implementation and/or application, and a grid can be 1×1 meter, 10×10 meter, 100×100 meter, 1×1 kilometer, 2×2 kilometer, 3×3 kilometer, 1×1 mile, 2×2 mile, 3×3 mile, etc. resolution grid.

Details of utility assets, location and attributes can be collected and/or retrieved by the URAMS. In some embodiments, a common data model of utility assets can be used so that new utilities can deliver asset information in a standard format. This format (or another format) can be used in reporting and visualization and also for archive functionality. Information at the utility assets can be broken down into the asset types and subtypes (e.g., as listed below, by way of non-limiting example) with geospatial location details for each asset (point, polyline, etc.), and this information can be updated periodically (e.g., daily, weekly, monthly, quarterly) so that it is current: (1) Transformer with Subtype breakdown: Single Phase Overhead, Single Phase Underground, Two Phase Overhead, Two Phase Open Delta, Two Phase Open Wye, Three Phase Overhead, Three Phase Underground, Step, Power Transformer, etc.; (2) Switch with subtype breakdown: OH Pole Switch, OH Pole Disconnect, UG Load Break, UG Non-Load Break, OH Remote, UG Remote; (3) Fuse with subtypes Overhead, Underground, Interrupter; (4) Voltage Regulator; (5) Capacitor with subtype—Fixed Capacitor Bank, Switched Capacitor Bank; (6) Primary Overhead Line; (7) Primary Underground Line; (8) Secondary Overhead Line; (9) Secondary Underground Line; (10) Lightning Arrestors; (11) Surge Arrestors; (12) Pole—subtype wood, steel; (13) Dynamic Protective Devices with subtypes Circuit Breaker, Recloser, Sectionalizer.

Example weather parameters for the URAMS model(s) are listed below, by way of non-limiting example: Wind speed; Wind direction; Wind gust; Rainfall amounts; Rainfall duration; Temperature; Humidity; Barometric pressure; Snow (moisture content factor as well); Ice; and/or the like. These weather parameters can be used for URAMS weather forecasts, executing the model(s), and/or for use in Archive Reporting of conditions at the time of model execution. Weather forecasts can be collected and converted to a format for use in reporting and visualization.

The results of a model run can be provided after a model is executed/processed with weather forecast and other input data. In some implementations, the results describe the number of assets expected to be damaged in a grid and information related to the uncertainty of that prediction. The prediction can, in some implementations, focus on the number of protective assets damaged (Recloser, Sectionalizer, Transformer, Fuse, etc.) at a grid and not specifically what exact asset type will be damaged.

In some embodiments, in order to provide visualizations for comparison of predictions to actuals, the actual damage, crew needs and ETR from a storm are integrated into the URAMS. As with other Integration information, the format of the data can be set and conversions made as necessary.

Some utilities may not be able to provide model grid granularity of actuals as they likely collect this information for a higher level geographic aggregation. In such implementations, Damage actuals can come in the form of a number of damaged protective devices for a specific geographic roll-up area or AOR (area of responsibility). The crews actual numbers (number of crews) deployed can be delivered by a specific geographic roll-up area or AOR. ETR actuals can, in some implementations, be in units of hours by a specific geographic roll-up area or AOR. The specific nature or type of geographic aggregation and association of the actuals information can be part of the integration structure and information.

In some embodiments, there is visualization of asset data in the maps portion of the UI for the utility asset lines and/or devices themselves. The rendering of these features is configured to not significantly slow down the map and still be very responsive for navigation, hover and overall UX.

Weather forecast data can be provided and/or overlaid and available in the map along with the utility assets.

Embodiments of URAMS provide for the ability for a utility to show prediction information for a pre-defined geographic rollup. Non-limiting examples include: Entire Service Territory, AOR Boundaries (Area of Responsibility), Zip Code, and/or Detailed Model Grid. A set of pre-determined geographic rollups can be determined and defined by the utility, or may be dynamically determined and generated, and can be customizable per the utility (e.g., different utilities may have different AOR regions).

Figure 16A:
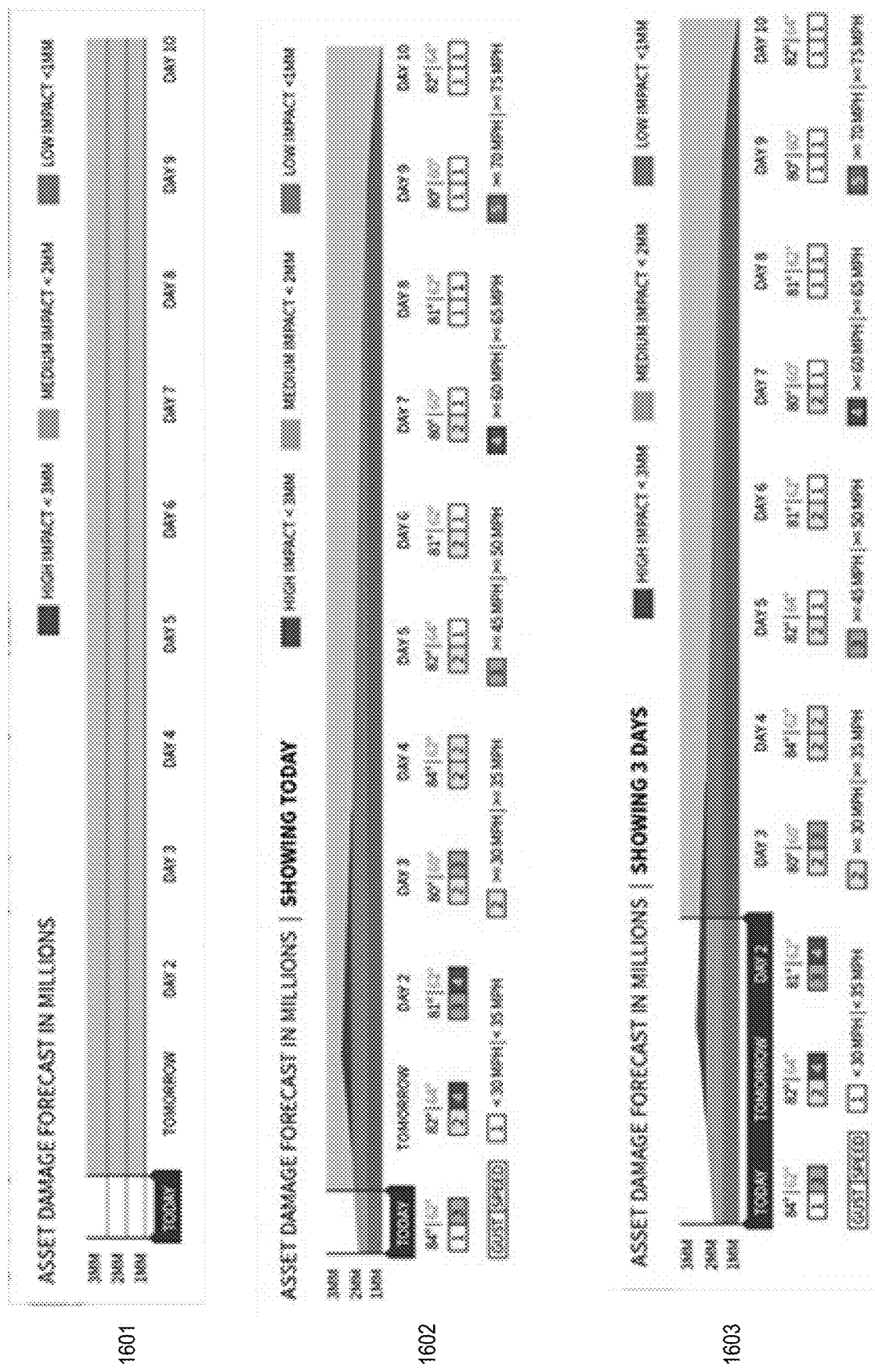
FIGS. 16A-16W provide exemplary interfaces, tools, and features for some implementations of URAMS embodiments.

Some embodiments of URAMS include tools/interfaces for selecting the time horizon that the prediction forecast is focused on. A time horizon selection tool is shown in FIG. 16A, with no selection 1601, one day selected 1602, and multiple days selected 1603. In some embodiments, the interface can include a watermark of total damage prediction as additional information to the user. In some embodiments, the time horizon can provide predictions for key weather variables that are responsible for the damage for each day that was used in model input.

Figure 16B:
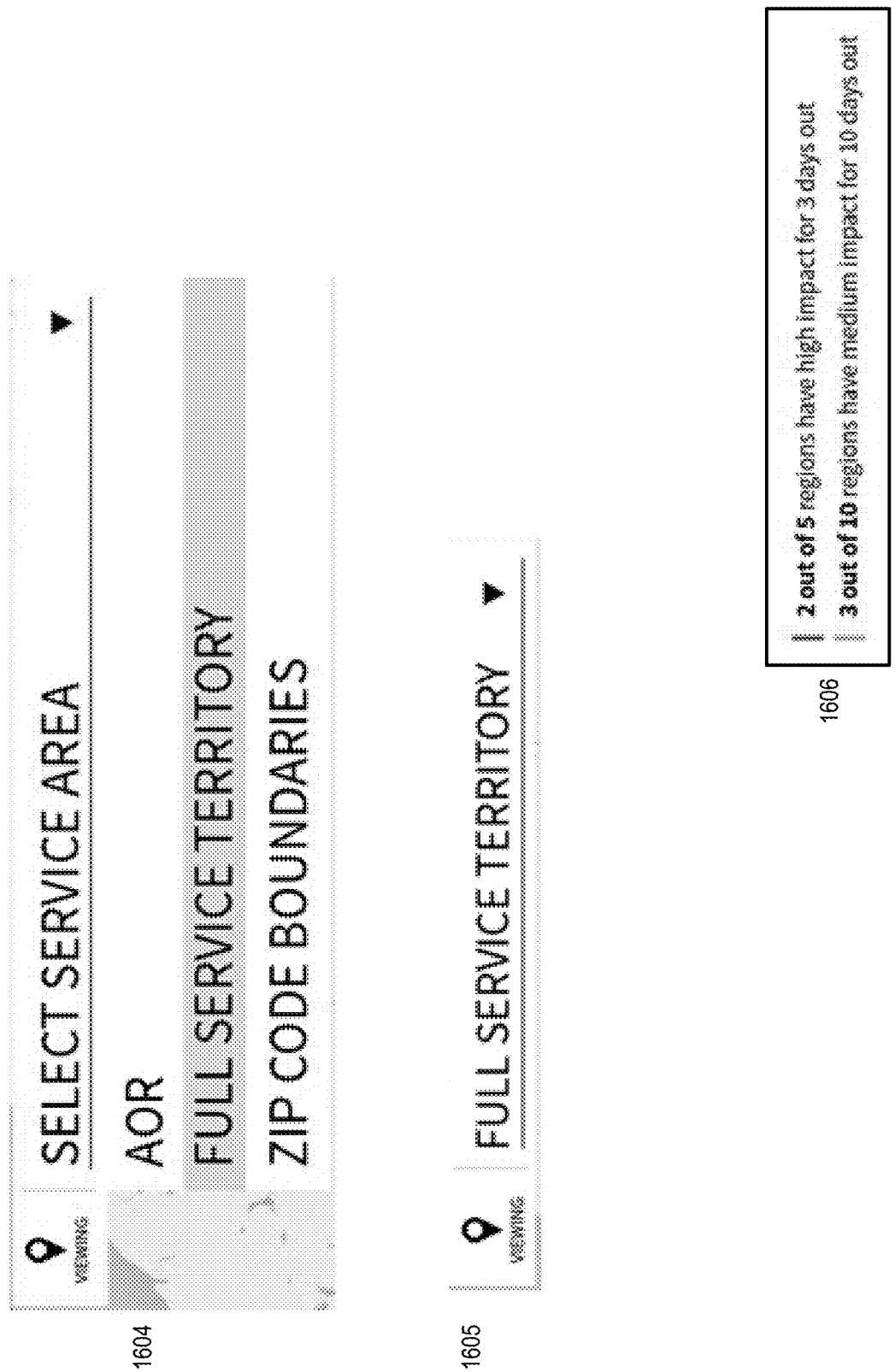

FIG. 16B shows an exemplary preset geographic rollup dropdown interface 1604 that can be used to select how the data is aggregated and displayed, and that interface when full service territory is selected 1605. Also shown is an exemplary Basic Impact View 1606, showing general impact predictions which can be navigated to show additional details of the impact.

Figure 16C:
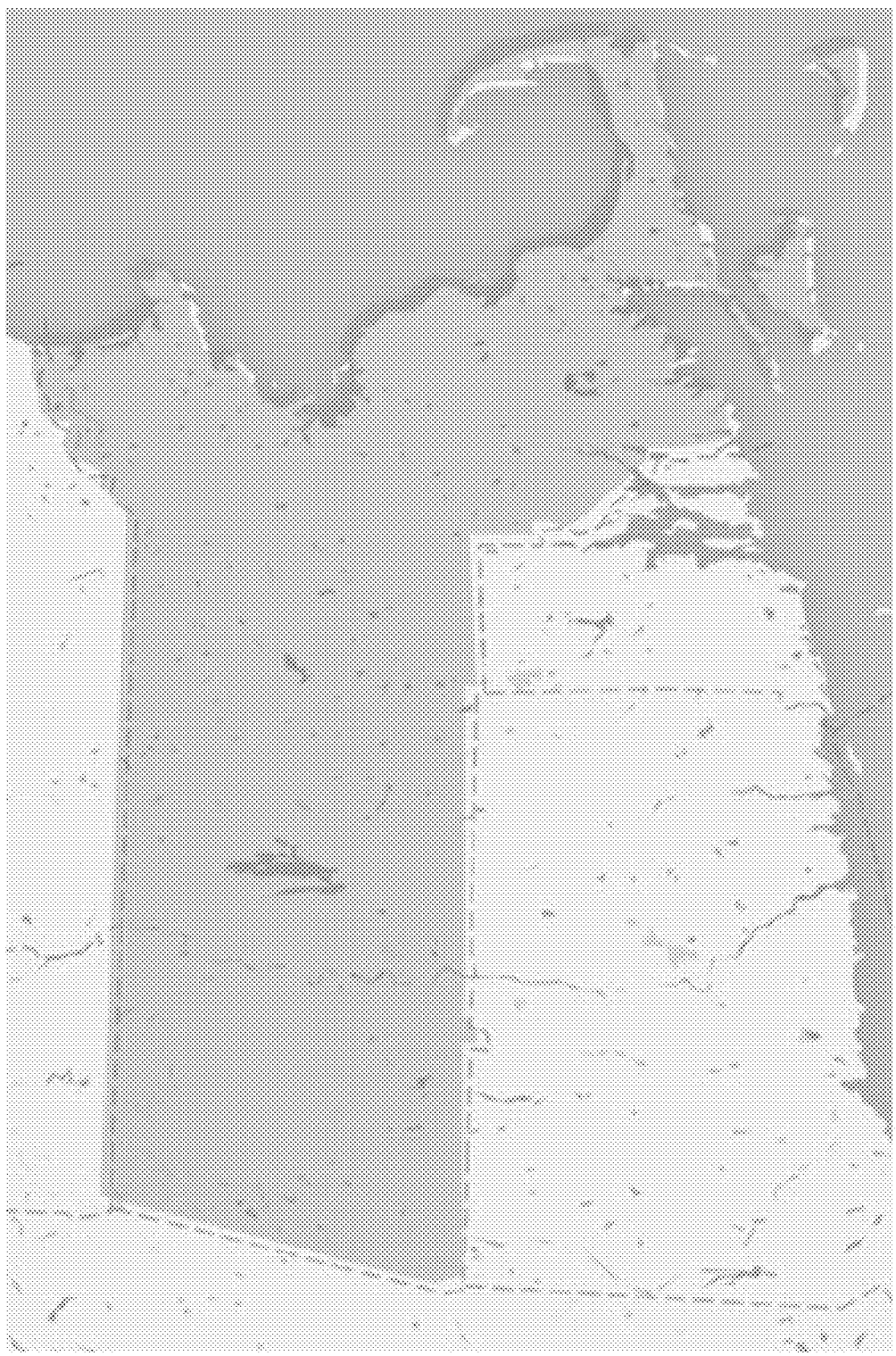

FIG. 16C shows an exemplary geographic map view of the geographic rollup territory according to some embodiments. The geographic map view/interface can provide data about the damage for the areas shown, and users can select one or more areas in the map and the interface/view changes accordingly to show the totals for the selected areas.

Figure 16E:
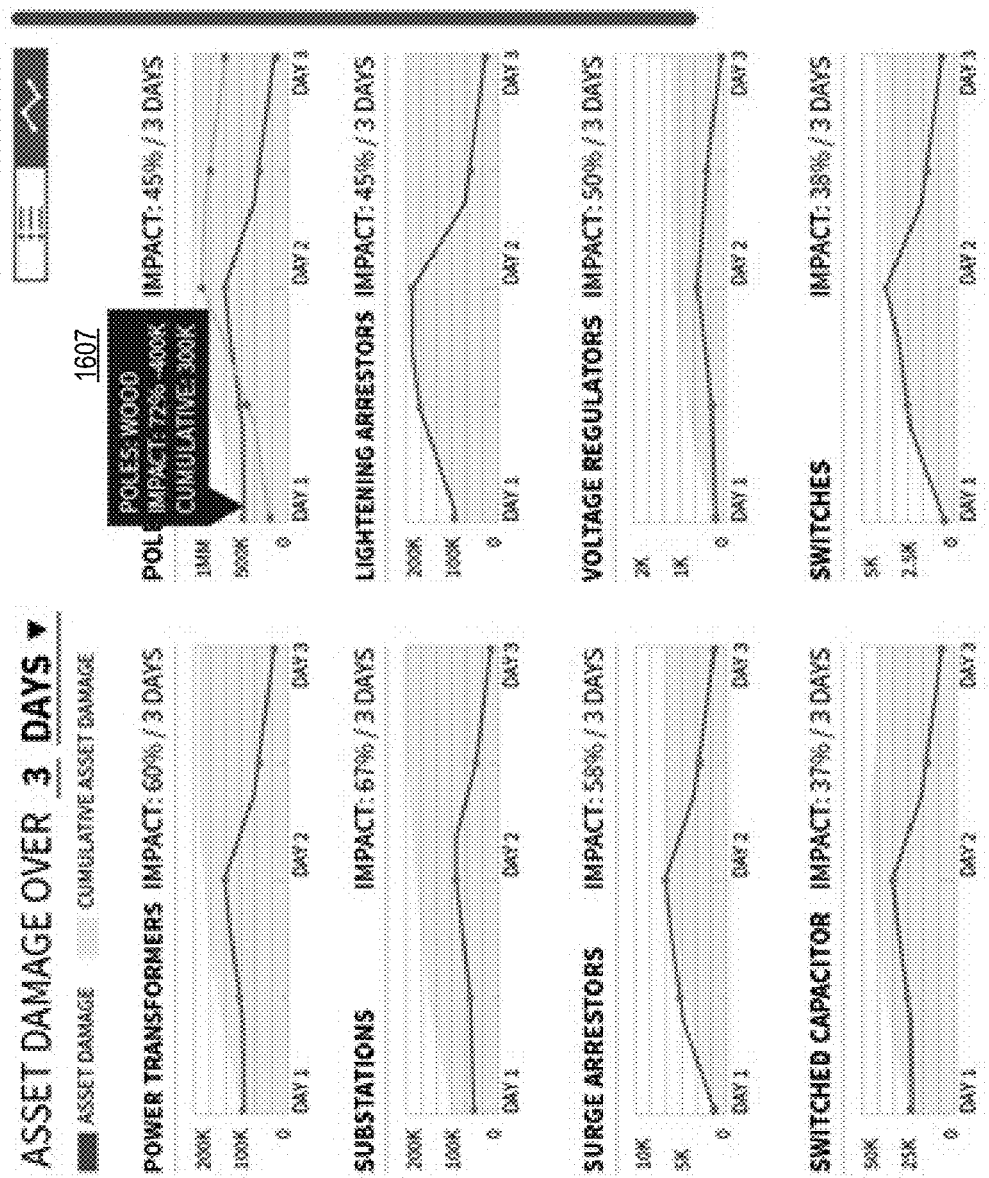

Embodiments of URAMS provide visualizations of the amount of damage predicted, and such visualizations can include displaying actual numbers (i.e., a number view, as shown in FIG. 16D), and can include percentages of total and a confidence level or metric. Additionally, current known damage can be shown, and can be shown next to predictions of damage (either current and/or earlier predictions). Current known damage can include information related to currently known damage received from the utility or one or more damage assessment processes. Data can also be shown as graphs (i.e., a graph view, as shown in FIG. 16E), with the interface configured to allow navigating between numbers and graphs. The display can also be configured with hover popups or the like (e.g., 1607 in FIG. 16E) so that additional data not previously displayed can be shown for the number and/or graph views.

In some embodiments, the interface can be configured to show coarse information, and avoid too much granularity for assets. In some embodiments, only numbers for protective assets damaged is provided, e.g., instead of Power Transformer or Poles there will only be one item titled Protective Assets with numbers from the model output shown.

In some embodiments, the URAMS is configured to allow a user to visualize the changes between model runs and the resulting predictions. The changes alone can be important for proper response, and can allow a user to react accordingly and in a more responsive manner. In some embodiments, a user can select between 2 different timeframes and a geographical rollup selection and the visualizations will change to not only show the later damage prediction but also highlight the changes from the previous model run output for the same date and time. Implementations can include timeline watermark enhancement highlighting change (increase or decrease), Asset Damage view enhancement highlighting change to damage in addition to the latest forecast to damage for the selected geographic rollup and time, and/or other model output visualizations such as Crew or ETR as discussed in detail below.

The URAMS can be configured to provide a visualization that shows the difference between what the model(s) predicted and what damage actually happened, and can be configured with a Model Prediction Comparison to Actual mode. Actual Damage information is obtained as discussed above. In some implementations, this mode can be initiated from the navigation screen. A model execution date/time may be needed, or a model run otherwise selected, to initiate this mode. The user can then navigate over time and location, as has been discussed, and/or can include one or more of the following: a Damage widget/interface/tool configured to show damage prediction and actual and a percent difference (over or under); a Mobile Asset/Crew widget/interface/tool configured to show mobile asset/crew prediction and mobile asset/crew actuals and a percent difference (over or under); an ETR widget/interface/tool configured to show ETR prediction and ETR actuals and a percent difference (over or under).

In some embodiments, the URAMS is configured to facilitate responding to executive or regulatory inquiries and/or to allow a user or staff to perform retrospective analysis on storm response, and as such, can be configured with an archive functionality component. The archive functionality component provides the ability to recall/retrieve weather forecasts and model predictions at a point in time for viewing later. Depending on the implementation, an archive component can be configured with a variety of subcomponents/tools/functions. In some implementations, a search tool or function can be configured to discover predictions or weather events that have certain specified criteria, for example, damage to an area of a certain amount or greater between two different days and times. The archive component can include the ability to search the weather history archive in addition to the model predictions, and once a set of events are returned that match the search criteria, the details can be viewed and/or a report generated. In some embodiments, based on the selection of a past date/time the predictions and weather forecasts for that day/time are shown, similar to model execution visualization for a weather forecast, but showing historic model and forecast data, not current model data, with an indicator that the information is historic in nature and not for any current model predictions. In some implementations, the user can then print, save, and/or send the visualizations or export to a database or a document. In some embodiments, archived data can be stored (e.g., offsite and/or in the cloud, and/or via a backup service), and in some embodiments, data can expire, depending on storage available and/or regulatory requirements (e.g., data older than 5 years is removed from the archive or an "archive" tag is removed so the data is not protected).

Some embodiments of the URAMS are configured to provide mobile asset/crew predictions/calculators and/or ETR predictions/calculators. Such predictions/calculators help utilities understand predictions on mobile asset and crew needs (e.g., for crews: crew types, numbers and locations needed across a given territory). URAMS can provide these features using inputs including utility experience and input of damage prediction and an output of crew prediction. Some implementations can utilize statistical models and/or algorithms that turn asset damage into mobile asset/crew-needed numbers. These predictions can be visualized similar to the predictions for asset damage and can include a corresponding confidence level, such as shown in 1608a and 1608b of FIG. 16F. The visualization can include crews currently assigned, and information on crew availability, shifts, etc., if such information is available (e.g., from the utility, a mobile app that crews use, etc.). The analyses/algorithms can also be verified, validated, and/or tested against historical storm data if emergency/outage crew dispatching and damage history data are available.

Embodiments of the URAMS can be configured to monitor upcoming events and associated variables and provide updates, allowing for responses to the upcoming event as time goes by and more accurate forecasts unfold, hour to hour and day to day. The URAMS can provide select, focused data, visualizing only the changes to the forecasts and predictions from a previous forecast and prediction, explicitly computing and visualizing the changes to weather forecasts, damage predictions, crew needs predictions, and/or ETR predictions and alerting/notifying the user over various user selected forecast timeframes. In some implementations, the URAMS can compute, for each time horizon that is forecast, the differences between the new forecast and the old forecast (e.g., actual number and percent change) and show that to the user (or show it if a specified threshold or error is reached). This computation can be done on the fly and/or stored to improve performance of rendering. The result of this novel calculation is that users will not have to use the traditional "stare and compare" approach. Speed of identification for areas where previous decisions need to be changed is also enhanced.

In some embodiments, URAMS provides Estimated Time to Restoration (ETR) data that can, for example, reflect a prediction of how long before one, multiple, and/or all customers in an area, region, or territory are restored power. Similar to the model and analysis for crew needs, an ETR tool can utilize utility data to determine the predicted ETR with inputs of Damage and Crew Needs predictions. Factors such as drive time, storm type, traffic, etc. can be integrated into such predictions. Visualizing the predictions along with their confidence levels for ETR can be provided, such as shown in 1609a and 1609b of FIG. 16F, and can also show a confidence level or metric, along with showing ETR for various time points or periods (e.g., today, current and over three days).

Some embodiments of the URAMS can be configured to provide Asset Impact, Crew Needs and ETR Calculators and Scenario Management Tools that allow a utility to try various crews and configuration to see how they impact predicted ETR. In some implementations, this can be provided as a separate scenario tool to avoid cluttering the interface. For example, a separate tool could be configured to allow for text only visualization of damage, crews and ETR based on a specific geographic rollup and/or could be defaulted with currently predicted information from the main display. In some embodiments, ETR is based on asset damage and crews assigned. The asset damage can be characterized in the determination, such that the more complex the nature of damage, the longer it will take to restore. Generally, the more crews assigned the less time overall it will take to restore the damage, though this may vary and depend on the equipment available to crew, expertise of the crew, etc. Generally, is ETR=f(asset damage, crews assigned), though many more variables can be utilized, for example, the nature of the storm type can affect transportation and accessing the damaged areas and therefore alters the ETR. Storm type and transportation ease index can be a factor into the final generated analysis/algorithm/equation that links input damage and crews to a resulting ETR (e.g., ETR=f(asset damage, crews assigned, storm type, transportation difficulty index)). Some embodiments utilize 3, 4, or 5 or more characteristics in combination with subjective utility experience to generate an area specific algorithm for predicting ETR, providing an improved prediction of ETR both in accuracy and in granularity to areas of a territory.

The URAMS can also be configured to provide alerts and alerting functionality, including alerting for model predictions of a certain severity for a certain geographic area so a user can respond effectively and in a timely fashion. In some embodiments, alert criteria is based on damage predictions and for a specific geographic rollup, and different damage alerts thresholds can be set for different geographic regions. Other criteria for the alerts can include confidence level of the damage prediction. The channel(s) of delivery of alerts can include general display alerts, mobile app alerts, e-mail, text message, etc. The alert can be specified for a certain time or time frame (e.g., set for a certain number of days ahead). Alerts can be configured to be set for an alert channel (e-mail, text message, etc.) and an alert can be delivered if the alert criteria is met and nuisance alert settings (e.g., avoiding duplicate alerts) have not been exceeded for the user. The criteria for setup can include the damage prediction, the time/days ahead, the confidence levels and/or the geographic regions the alert is enabled for.

As discussed above, embodiments of the URAMS can support Mutual Assistance decisions, facilitate crew pre-positioning to optimize response and restoration efforts, facilitate crew scheduling decisions around shifts (hold over, on call, etc.), improve ETR and provide estimates useful for communication to utility end-users and overseeing authorities such as PUCs (Public Utility Commissions), provide improved Situational Awareness, and allow for more informed discussions with community first responder organizations and leaders. URAMS can also facilitate post-storm forensics, providing evidence of situation at-time-of-decision for executive and regulatory agencies, and facilitate internal training for emergency response scenarios.

Figure 16G:
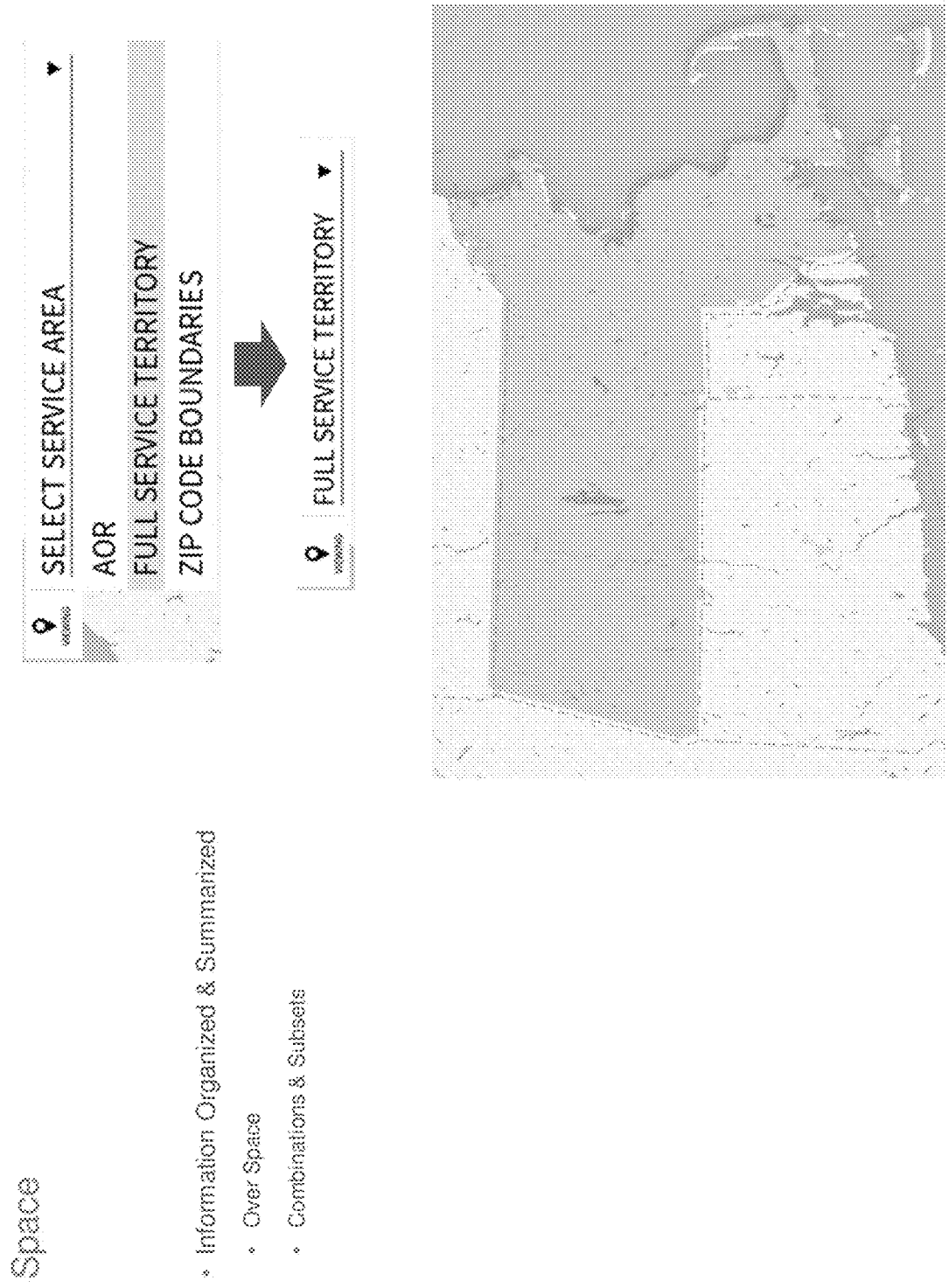
Figure 16H:
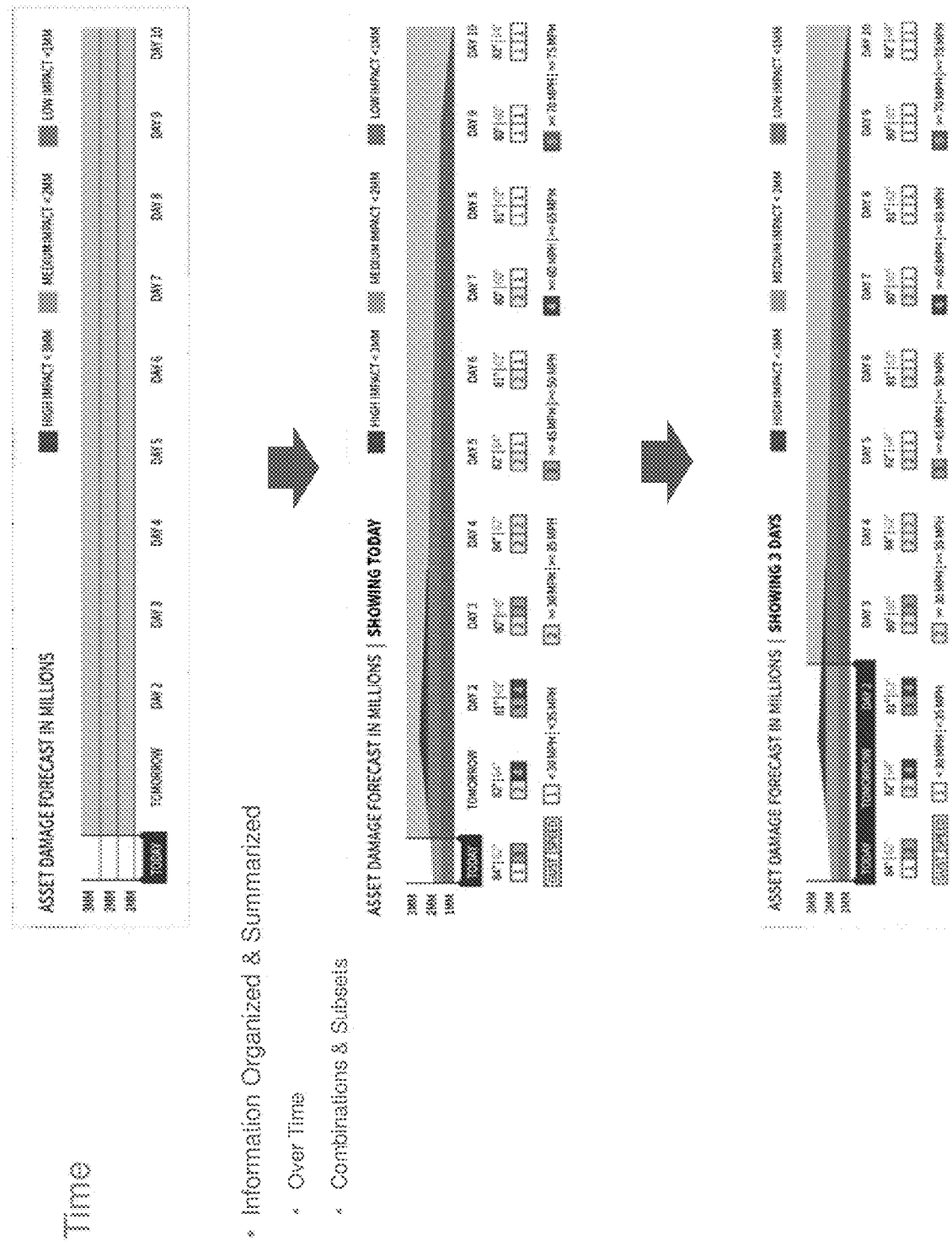

URAMS can provide prediction result navigation over space (e.g., as shown in FIG. 16G) and time (e.g., as shown in FIG. 16H) aggregations, providing views and tools to quickly navigate from understanding damage at the entire service territory level over many days and with multiple clicks and drill down to view predictions at a more granular (e.g., ZIP code) area or for an user-defined aggregation of regions in their service territory for any given current day or a future date. The combination of historical and real/near-real time date and highly efficient impact modelling provides, with elegant user navigation, weather forecasts and damage predictions visualized together. Viewing damage prediction data combined with weather forecasts (damage threats) in this way can facilitate improved response time and efficiencies, allowing utilities to quickly determine and understand likely damage impact for an entire territory over many days and/or a very specific focused region like a town for a specific day or time period. The URAMS can also facilitate mutual assistance decisions and allocation, crew pre-positioning to optimize response and restoration efforts, crew scheduling decisions around shifts (hold over, on call, etc.), and ultimately improve restoration times and minimizing costs to do so.

In some embodiments of the URAMS, the views are based on prediction analysis/prediction algorithm output being binned geographically and/or over time (i.e., time-series), with each prediction being associated with a specific element of space and time (e.g., via a 4D grid). Aggregations over space and time can be indexed to know what individual bins fit into what higher level aggregations of space and time. This space time index can map the granular details to higher level summaries, and facilitates quick and efficient mechanisms to sum, average, median and other statistical functions to quickly identify the resulting metric of total damage (e.g., sum) for an aggregate over space and time. The model granular bins can cross into multiple aggregations and can be broken up into percentage or fully assigned to a single aggregate as part of the index process. In some embodiments, once the index is built, it is not changed, but it can be updated if the index is regenerated again. The URAMS can use the index to react to user UI commands to visualize summaries over space and time and perform the needed statistical function (e.g., sum) to determine the correct number for the given space aggregation and time aggregation.

Damage analytics visualization with a confidence level indicator is a feature of some embodiments of the URAMS, as discussed above. The confidence level indicator or metric can be rendered next to the individual damage prediction numbers and/or interwoven with an overall damage display or overlay. In some embodiments, the confidence level indicator/metric is generated independent of the lower level model algorithm. The confidence level enhances the damage predictions by providing insight to the likelihood of any prediction to actually occur. Combined, the power of the prediction number and confidence level take on new form as a pair—a combination of information effectiveness. The application of tolerances to predictive damage modeling and enhanced summaries with assigned confidence level indices is unique. The result of this confidence level enhanced damage prediction information is that the actions and decisions will be improved based on the information pair, and not the damage prediction numbers alone. Based on the level of confidence in the prediction, a system or decision-maker using the enhanced data can make better decisions. Actions from a low-confidence prediction might be very different from a medium or high confidence prediction. Thus providing confidence levels provides additional detail and confidence to the context of decision-making. The added confidence level also helps a system or decision maker know when to make a decision and act on the information with improved confidence.

In some embodiments, the confidence level or metric is independent of the underlying statistical model or models used to generate the prediction. The confidence level can be generated from a variety of independent factors that are brought together in a weighted average fashion into a single number and that final confidence number is then mapped to an uncertainty index. Some exemplary key variables are listed below in order of higher weight to lower weight in the weighted average. The weights can be adjusted and/or change over time for a particular situation and/or customer based on analyses and modeling of prior predictions, and/or if a customer finds more subjective trust in one variable over another based on their experience with past storms and running predictions: (1) Hardening index pulled from recent infrastructure hardening that would cause known skews to the model that would make historical damage not as strong of a correlation factor for prediction; (2) Subjective assessment of input data quality (codifying the concept of "garbage in garbage out" into the confidence level), capturing accuracy and timeliness in field team reporting workflows, known issues with other systems of record using this source input data, completeness of the data and historical duration (# years) of data; (3) Input weather forecast accuracy; (4) Time to event—the length of time between now and when the forecast is actually for; (5) Aggregation level accuracy of a model—some models can be more accurate in aggregate combining many individual bins while others are more accurate at smaller spatial or time horizons—the resulting confidence factor can be strengthened depending on the aggregations being done with the individual bins based on this aspect; (6) Correlation numbers of historical hits in the past to forecasted conditions from tested data, the more direct correlation of historical events, the more accurate the resulting prediction; (7) Variation of results across different statistical models—different models can have different strengths and weaknesses and these variation of results can be captured and weighted accordingly; (8) Variation of results crossing statistical bins. FIG. 16D provides a visual example of such an output.

Figure 16I:
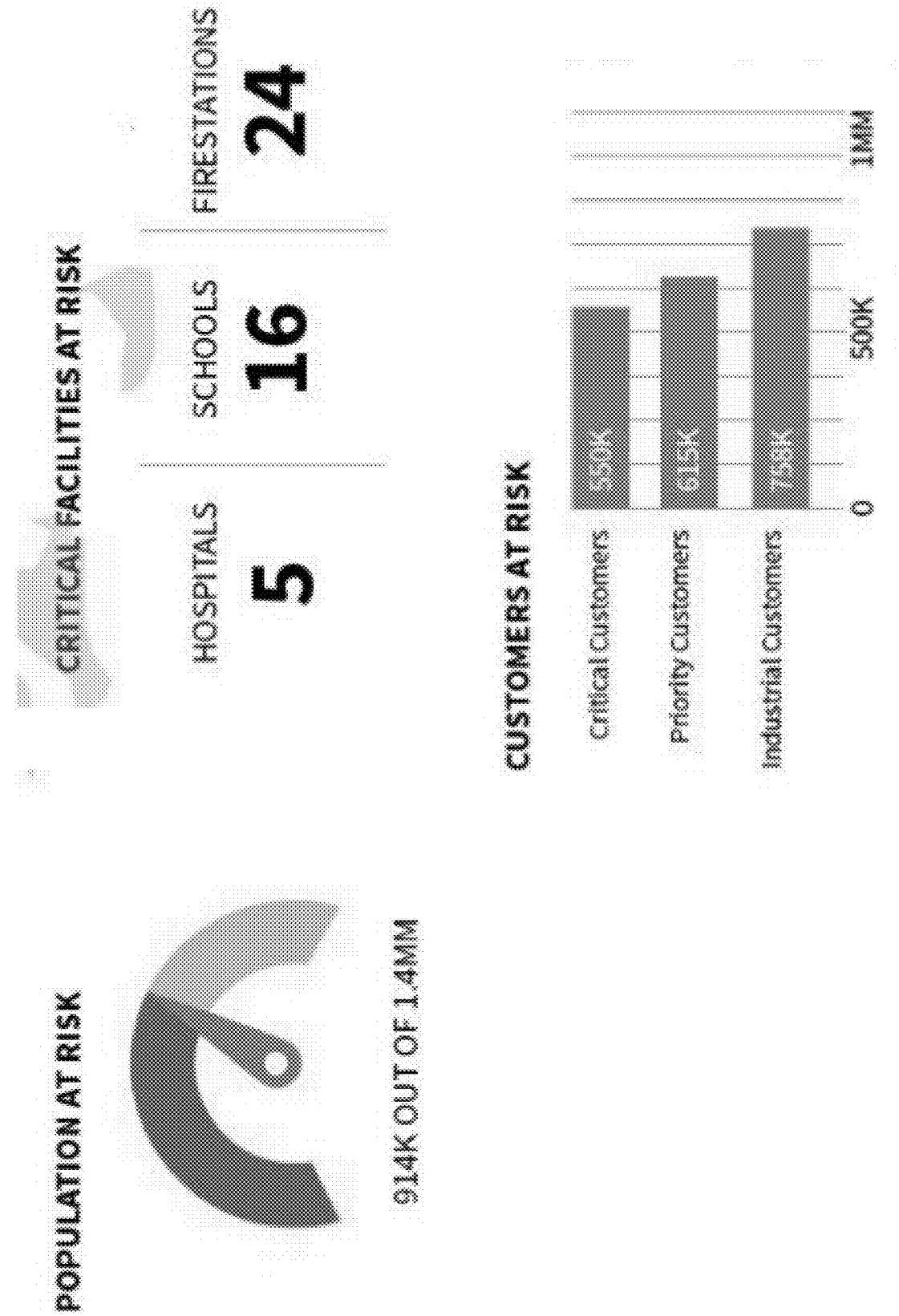

In some embodiments, the URAMS can provide an interface/visualization of community impact over space and time aggregations, dynamically illustrating impact to communities and how events can and do impact at varying degrees of spatial and temporal granularity with confidence levels, as illustrated by the example interfaces in FIG. 16I, which illustrates a visual example of the output once a spatial aggregation is chosen (e.g., Service Territory) and time window selected (e.g., today). Combined with damage predictions, such features provide significant situational awareness that improves communications with community first responders at the city, county, state and national levels (depending on the scale of the event and implementation). The URAMS provides the ability to summarize the community impact at the entire service territory level or detail the community impact to a very specific community to focus on more localized community response and coordination. This gives more credibility to the utility-provided information and facilitates advising communities on forecasts.

In some embodiments, the URAMS provides for scenario management and testing, e.g., based on the relationship between damage, crews and ETR. This can be configured to allow for quicker identification of crew needs to reach a specific targeted ETR. Similar to the models for crews and ETR, the equations can be aggregated together to allow visualizations and testing (i.e., allow a user to play "what if" scenarios with the different components of the determination). For example, one can fix damage and alter crews to see the changes to ETR for a given region and time. Similarly, one can fix damage and alter ETR to see the resulting changes needed in crews to meet that ETR for a given region and time. A user can fix ETR and alter damage to see how many more or less crews will be needed to respond if damage decreases or increases at a specific region or time. The mechanisms used are based on the determinations mentioned previously and can iteratively alter one or more until the effects match the desired fixed number set. The resulting output of this iterative processing can then be shown to the user. A few examples are as follows: if ETR is needed to be reduced from 3 days to 2 days due to community backlash and pressure then the number of additional crews needed to do that is computed and visualized—describing the added costs and resources to the utility. If damage confidence levels are Low or Medium—altering the damage can give an indication of what swing affects in crews and ETRs can be seen if damage is worse or better than projected at the time. If some crews are riskier to acquire than others then simulating the ETR impacts for having less crews available will be valuable to understand how to react to this unfortunate situation in resourcing.

Figure 16J:
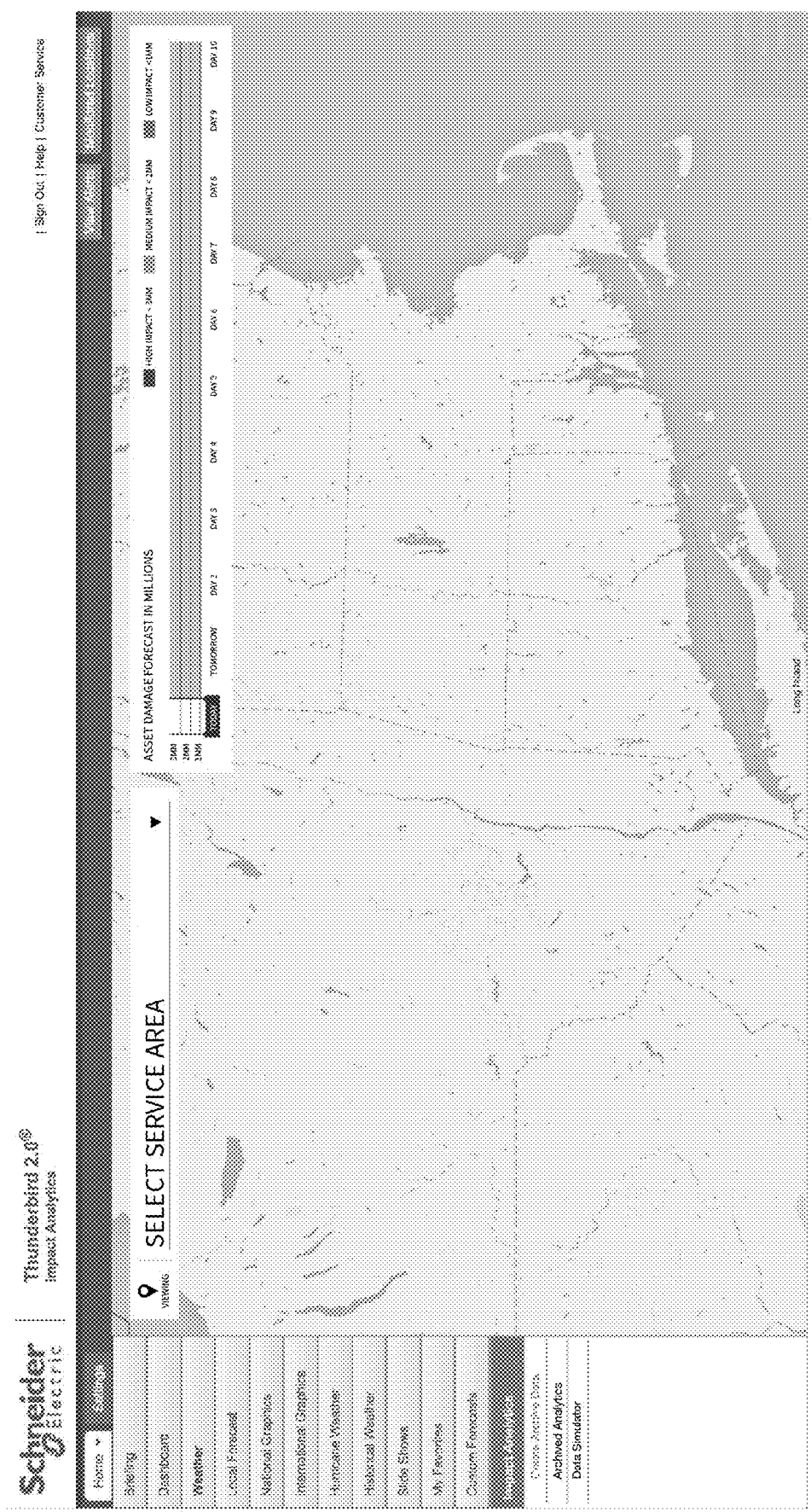
Figure 16K:
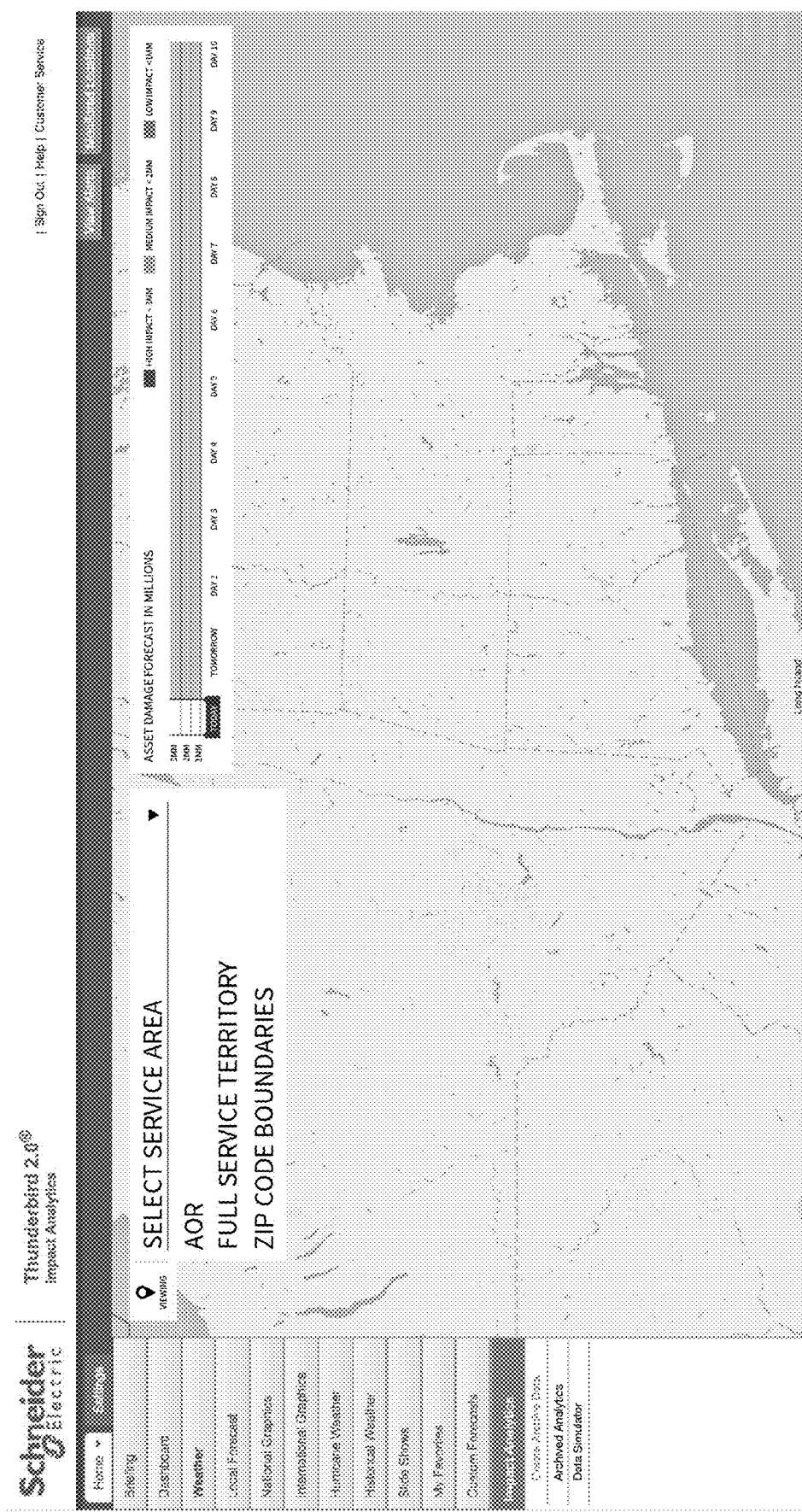
Figure 16L:
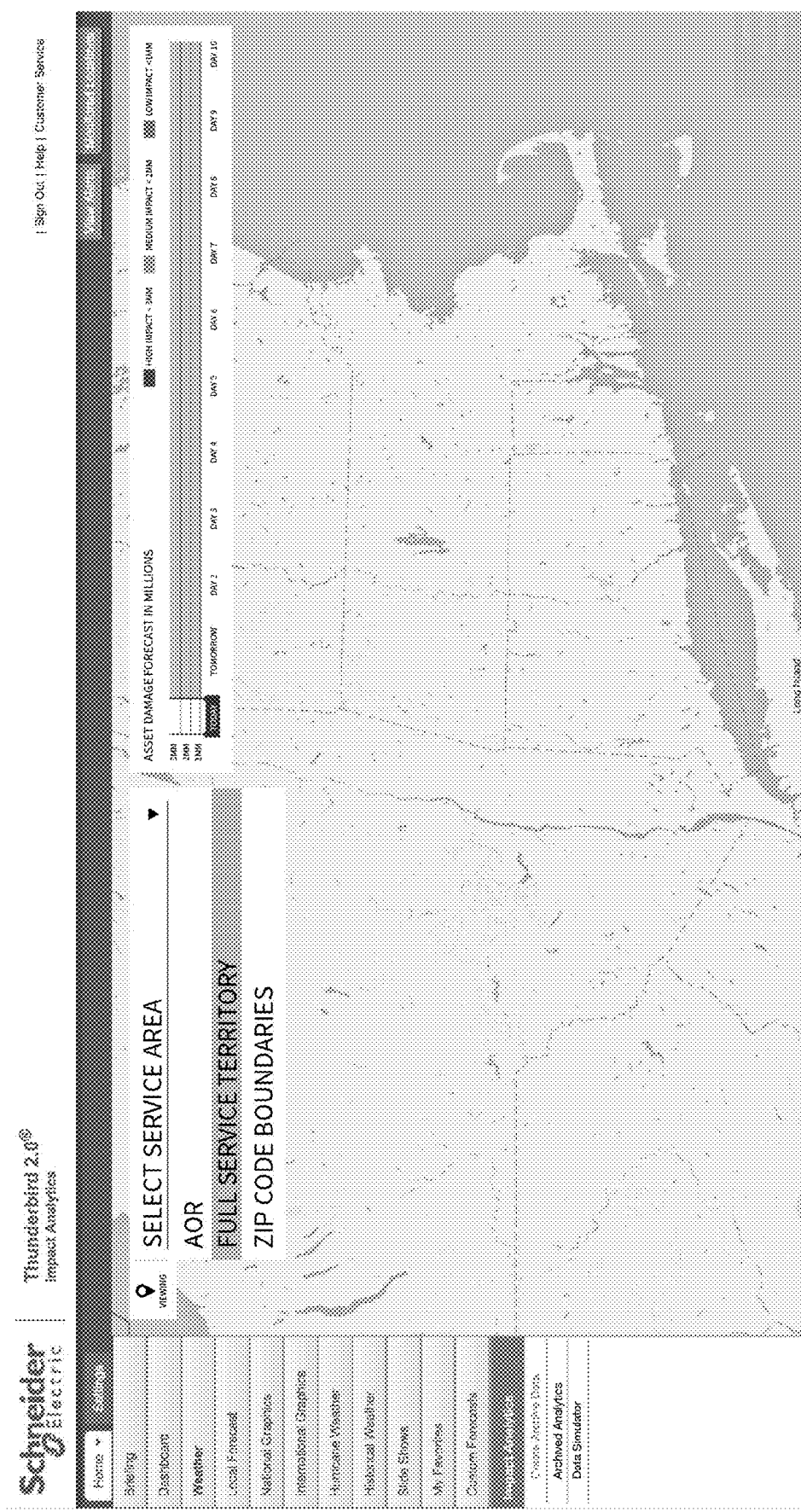
Figure 16M:
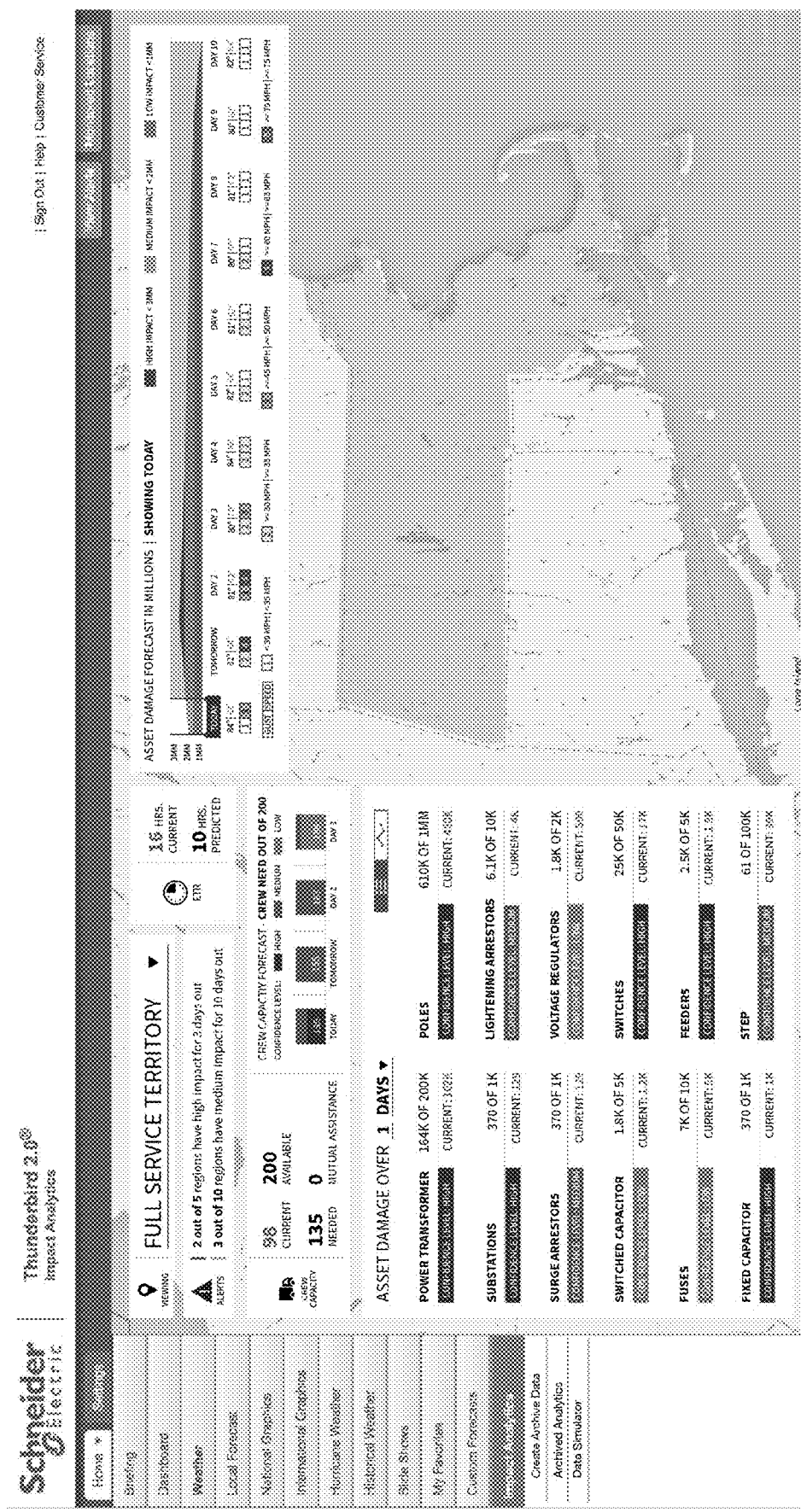
Figure 16N:
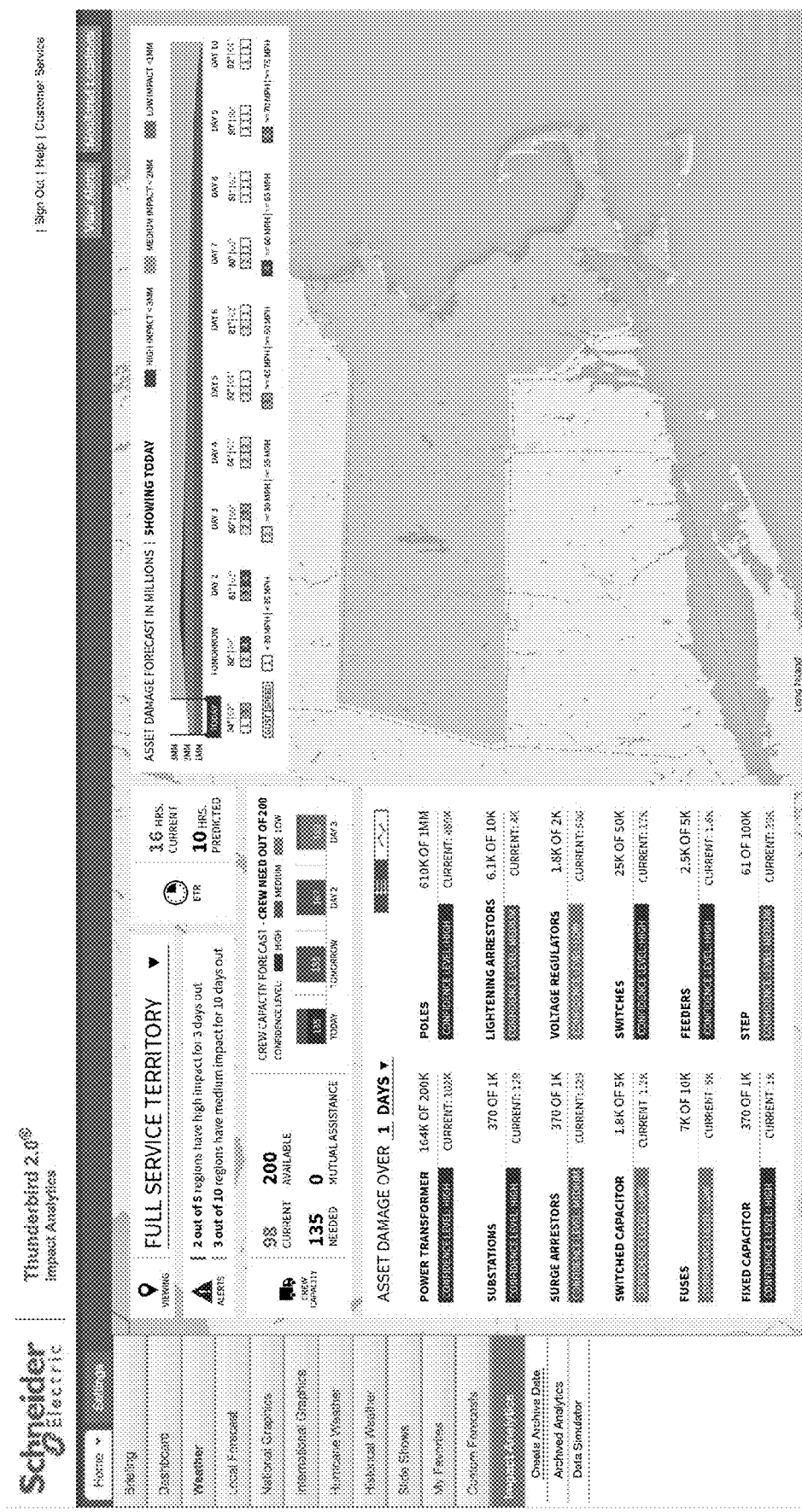
Figure 16O:
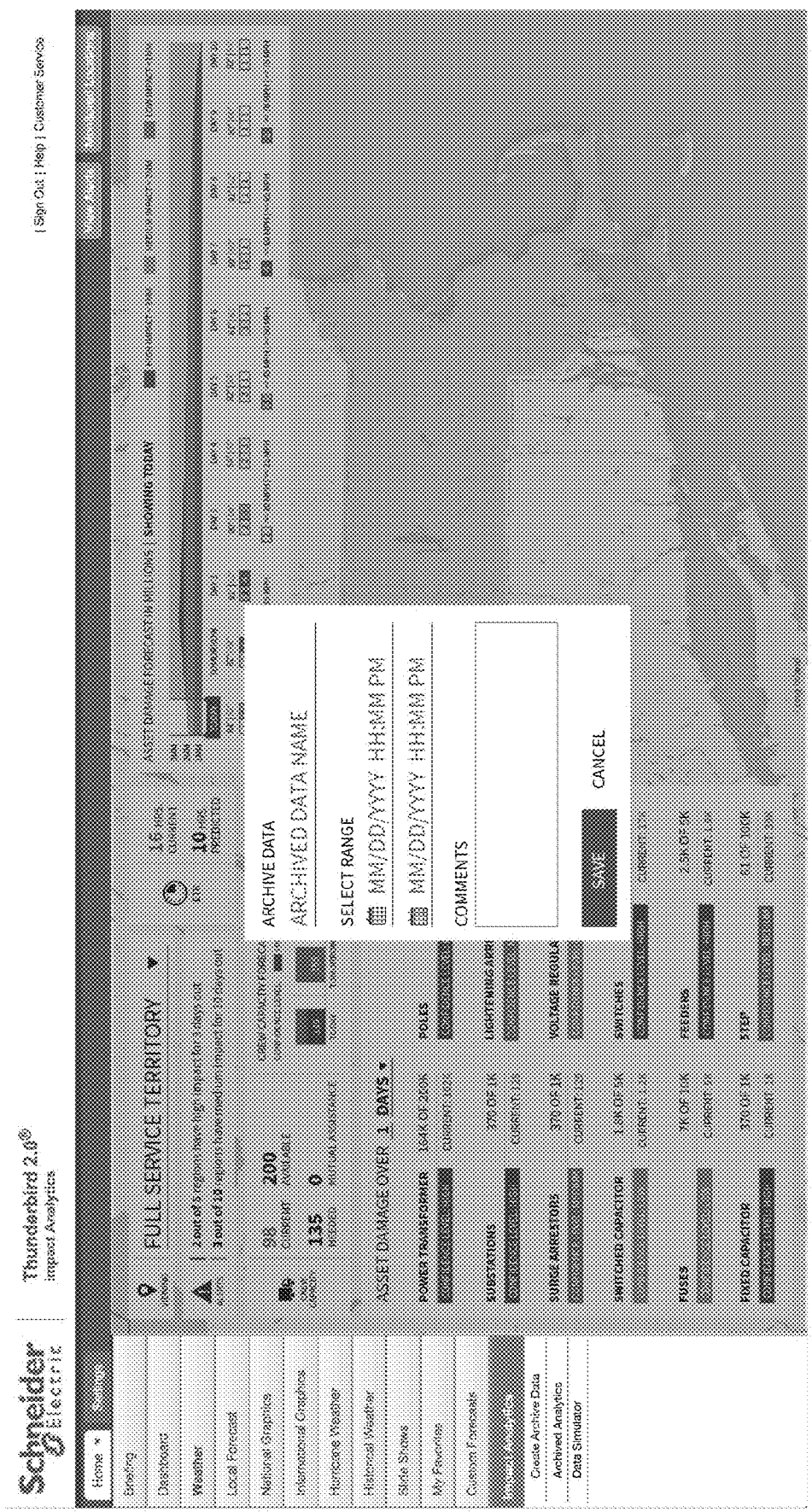
Figure 16P:
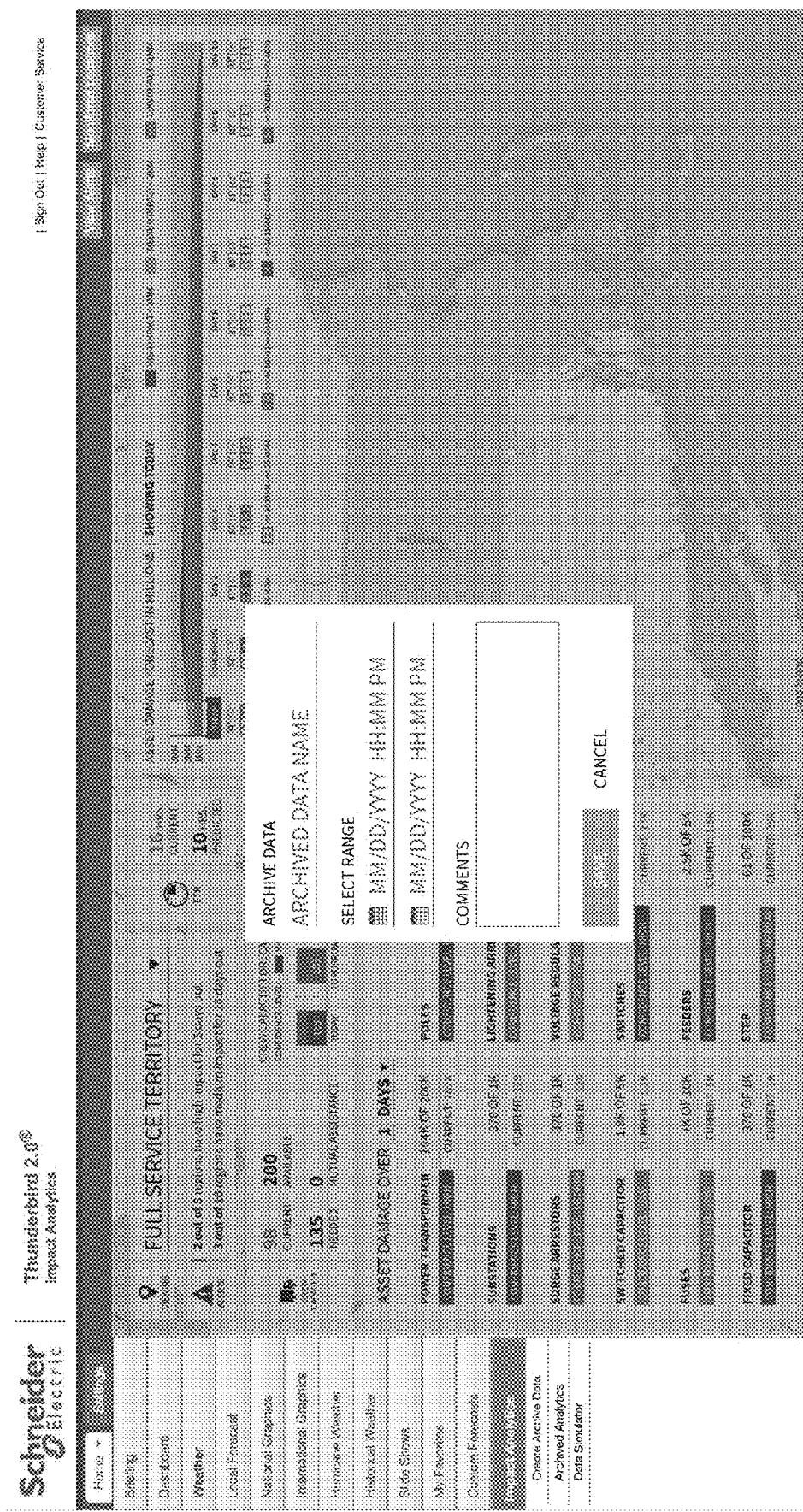
Figure 16Q:
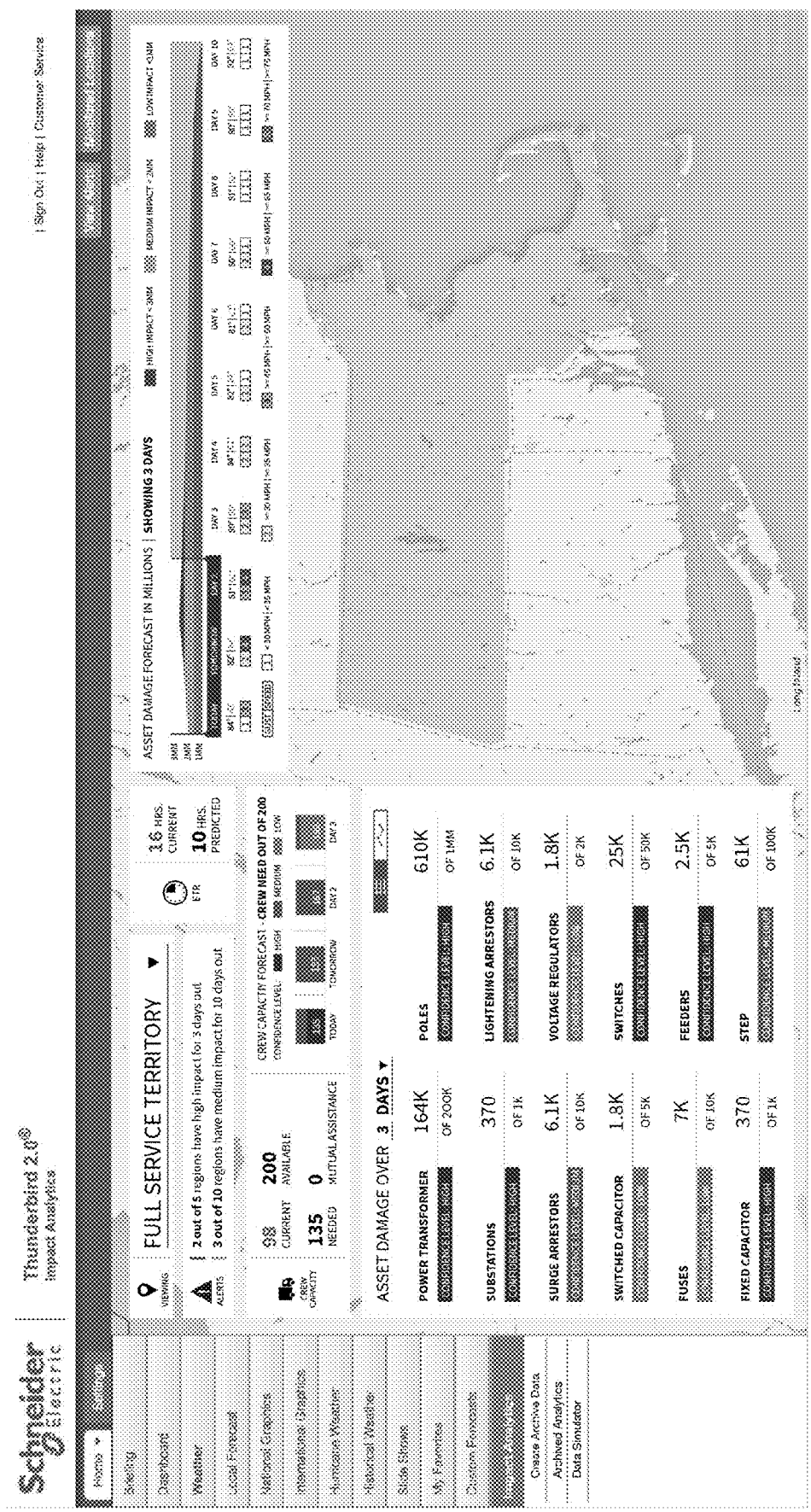
Figure 16R:
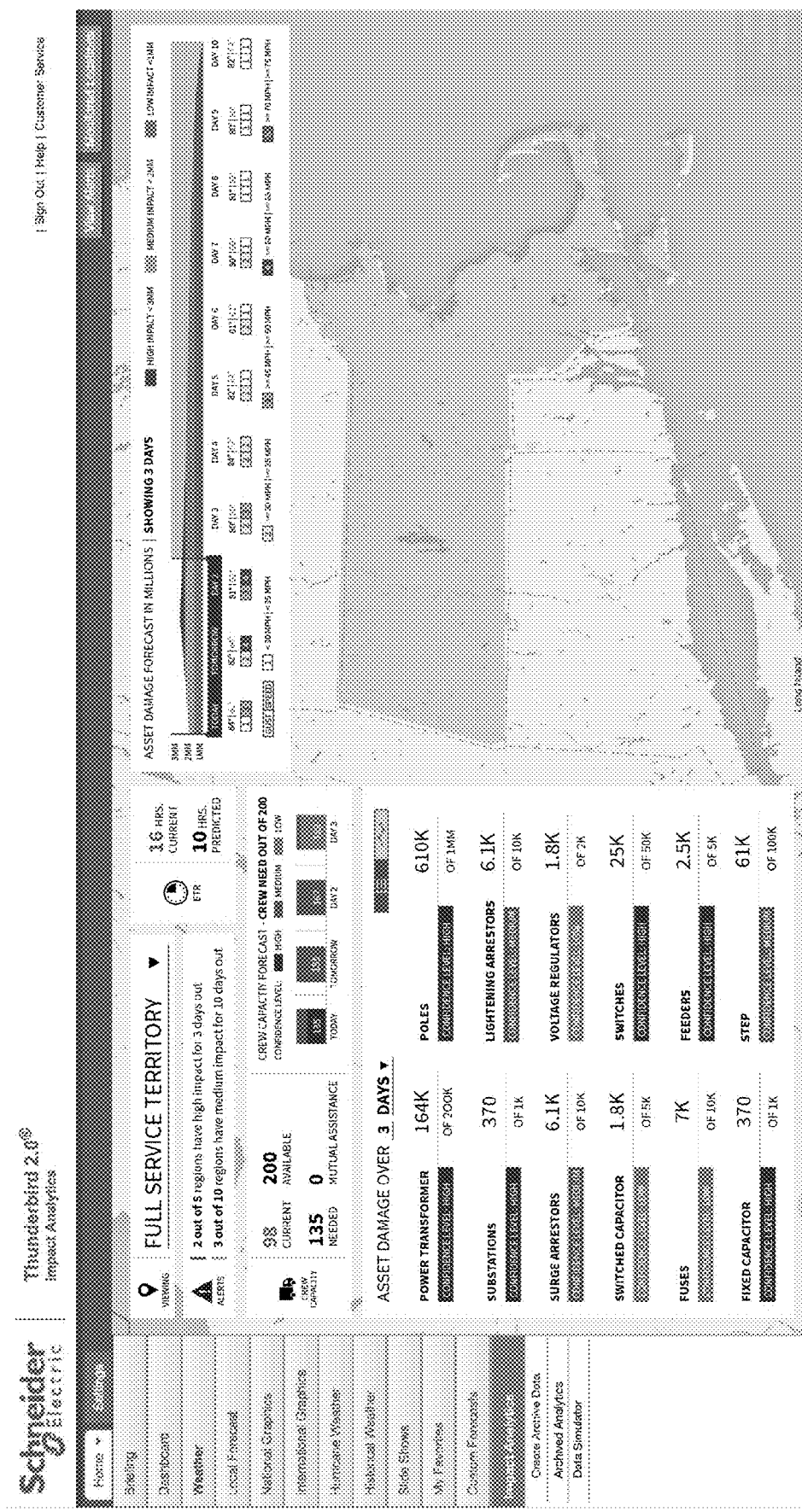
Figure 16S:
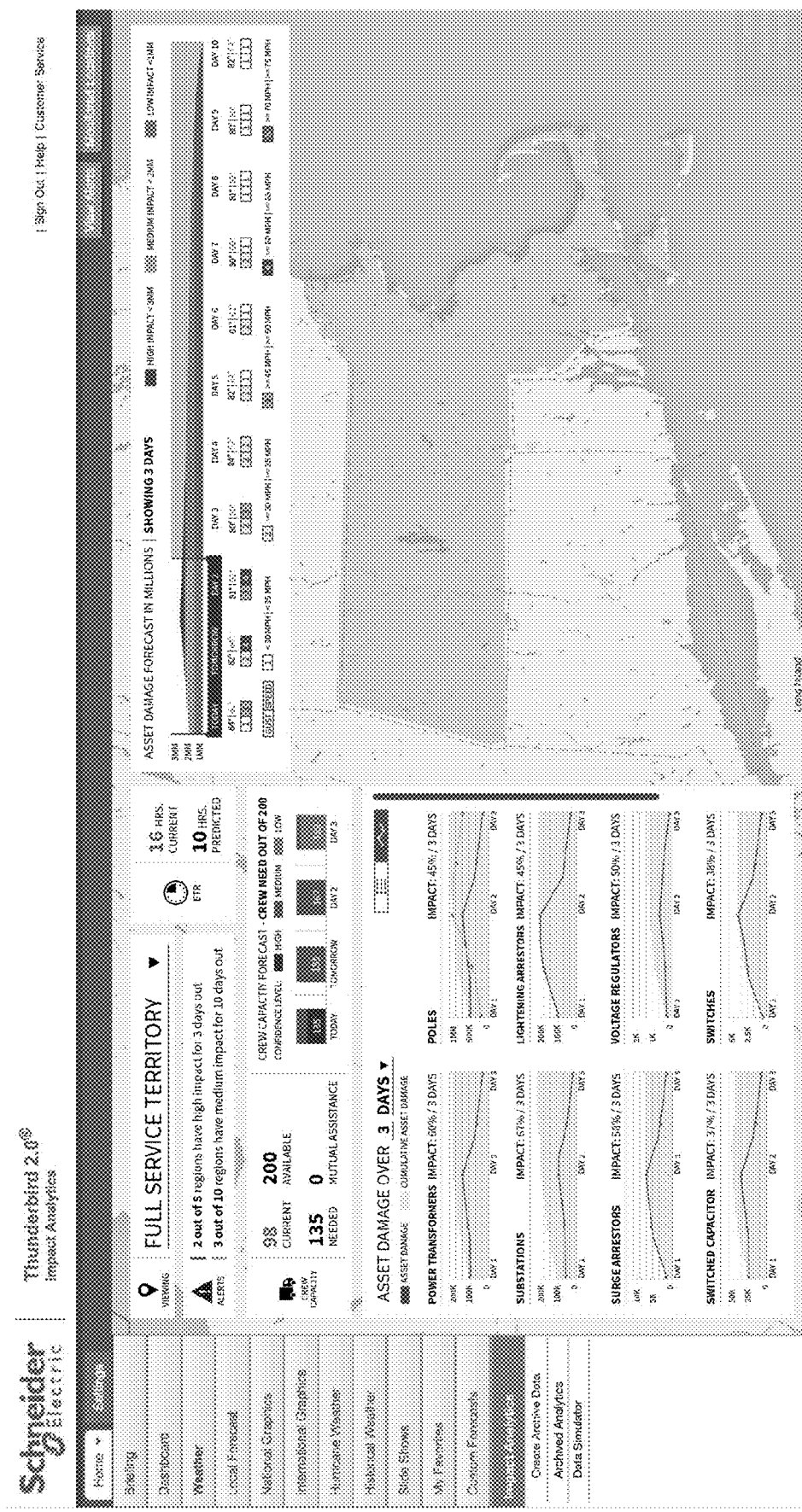
Figure 16T:
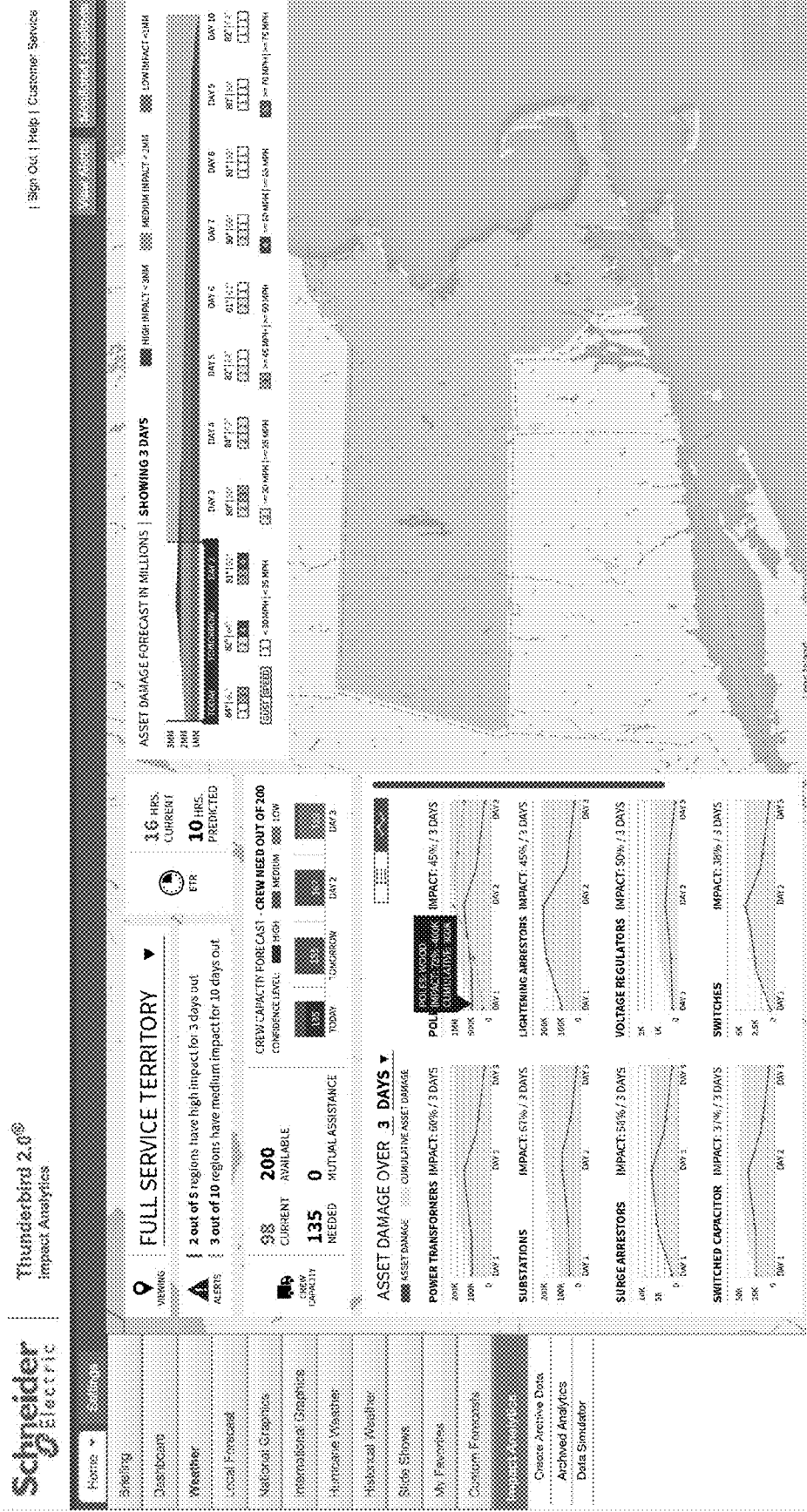
Figure 16U:
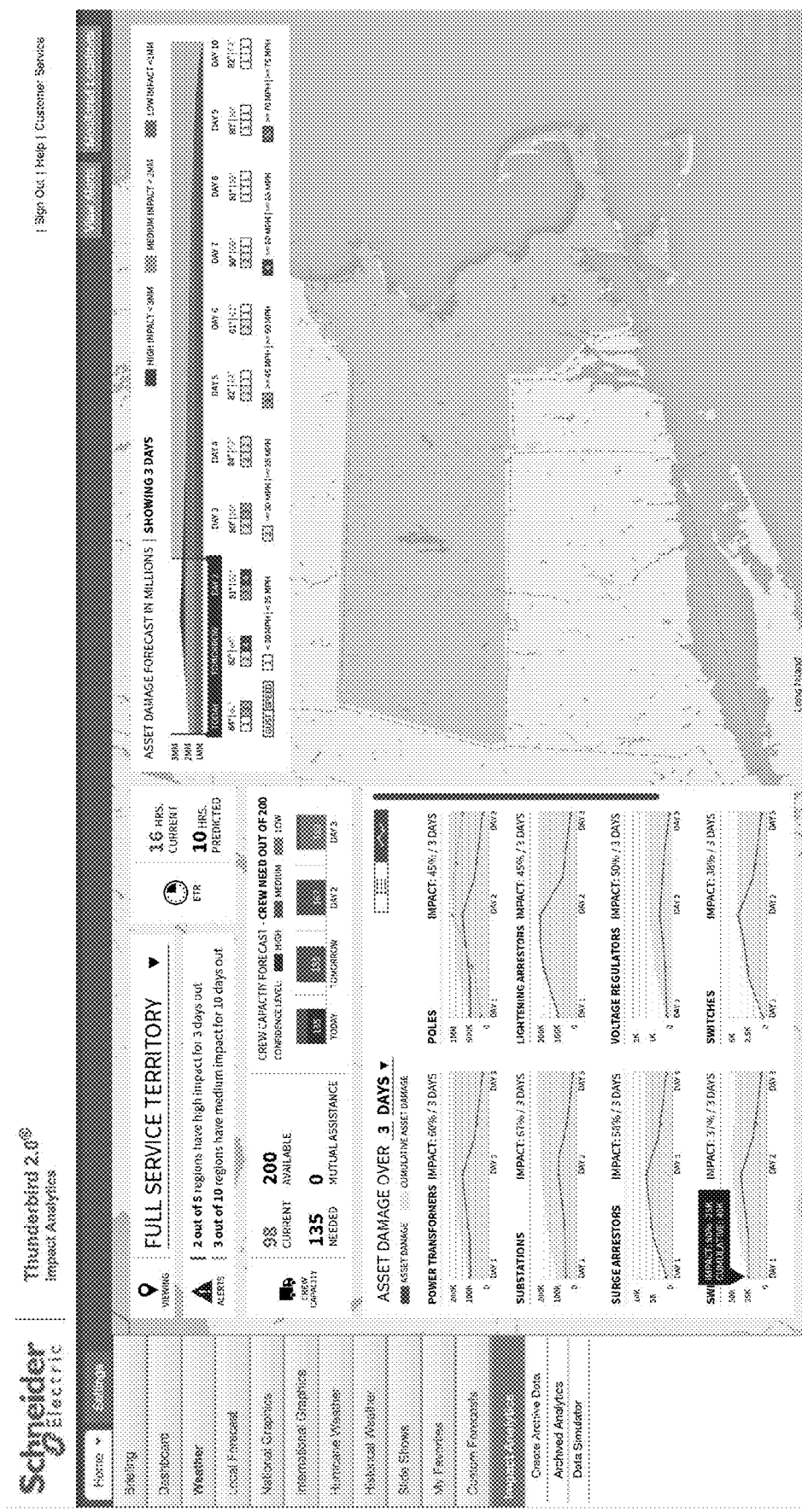
Figure 16V:
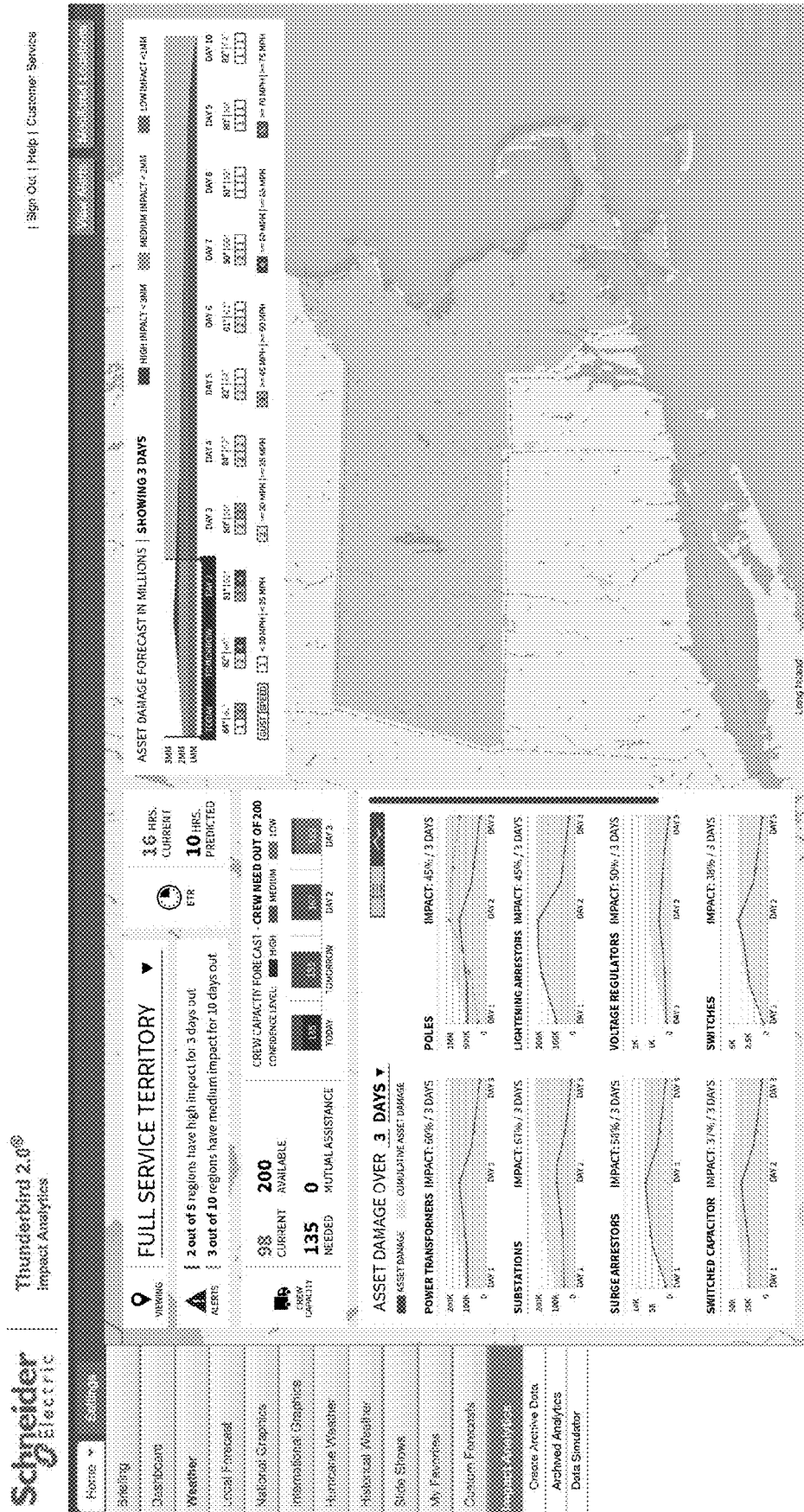
Figure 16W:
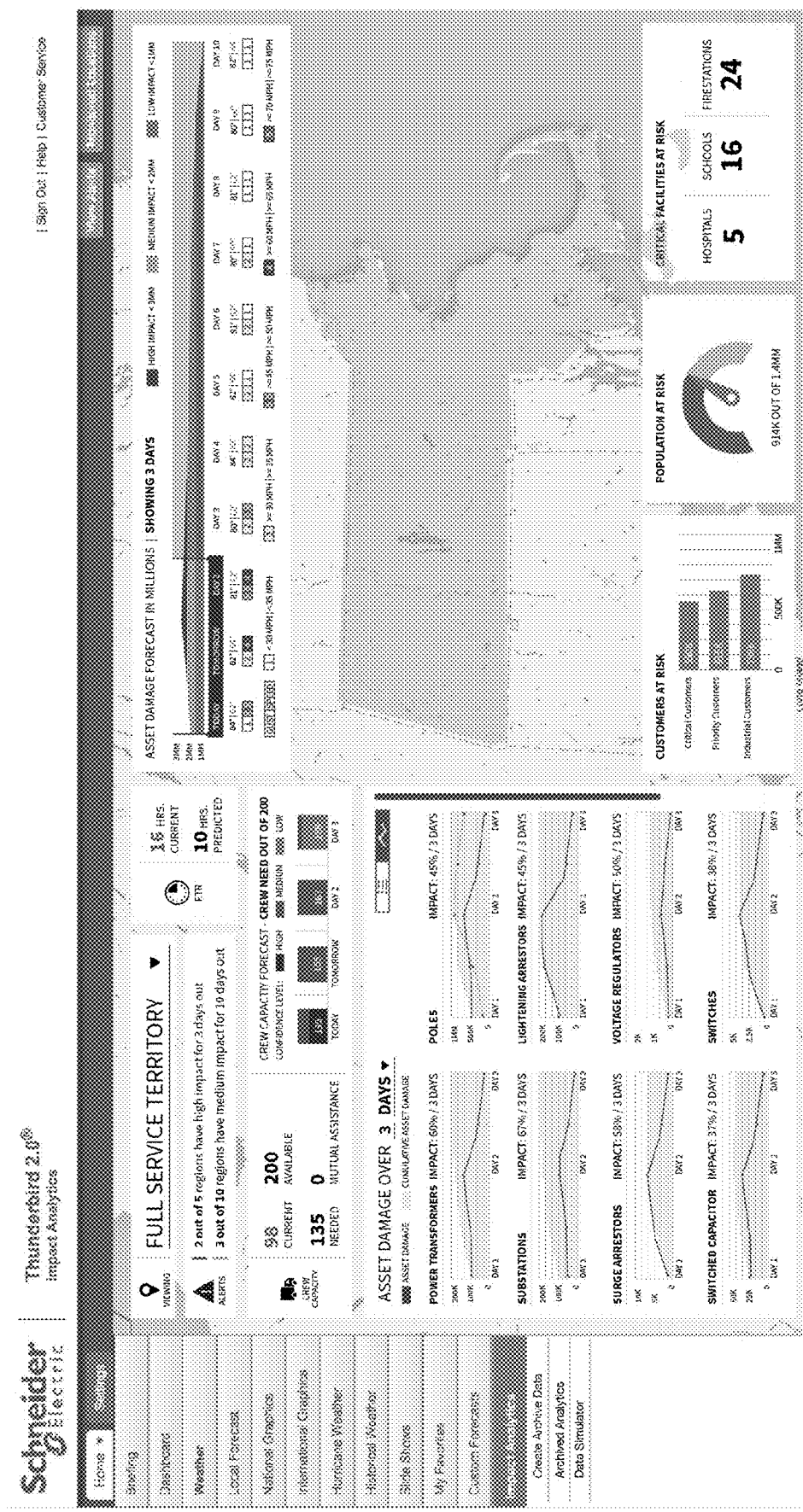

FIGS. 16J-16W provide example interfaces illustrating URAMS aspects, features, tools, and functionality, including those described above, in more detail and in example context.

In some embodiments, a URAMS server may issue PHP/SQL commands to query a database table (such as FIG. 17, Profile 1719c) for profile data. An example profile data query, substantially in the form of PHP/SQL commands, is provided below:

```
<?PHP
header('Content-Type: text/plain');
mysql_connect("254.93.179.112",$DBserver,$password); //access database server
mysql_select_db("URAMS_DB.SQL"); //select database table to search
//create query
$query="SELECT field1 field2 field3 FROM ProfileTable WHERE user LIKE '%'
   $prof";
$result=mysql_query($query); //perform the search query
mysql_close("URAMSDB.SQL");   //close database access
?>
```

The URAMS server may store the profile data in a URAMS database. For example, the URAMS server may issue PHP/SQL commands to store the data to a database table (such as FIG. 17, Profile 1719c). An example profile data store command, substantially in the form of PHP/SQL commands, is provided below:

```
<?PHP
header('Content-Type: text/plain');
mysql_connect("254.92.185.103",$DBserver,$password); //access database server
mysql_select("URAMS_DB.SQL"); //select database to append
mysql_query("INSERT INTO ProfileTable (fieldname1, fieldname2, fieldname3)
   VALUES ($fieldvar1, $fieldvar2, $fieldvar3)"); //add data to table in database mysq_lclose("URAMS_DB.SQL"); //close connection to database
?>
```

Various embodiments of the URAMS may be used to provide real-time, utility asset management, alert report, predicting, planning and response. The integrated, unified alerting, planning and predicting system provided by the URAMS may be used in fixed location and/or mobile equipment. The URAMS may provide weather/alert/emergency decision support (e.g., via graphical displays) and/or provide alerts/triggers. Although it is discussed in terms of routing and asset allocation distribution in times of natural weather emergencies and disasters, in some embodiments, the URAMS may identify more asset storage and mobile asset travel paths based on real-time updates to address anticipated or predicted asset needs, and may update a reports and plans accordingly. The URAMS may identify 4D areas for alerts/hazards, and a user may choose or set their profile based on particular hazards and/or utility assets. Various cost calculations and risk calculations may also be used in determining alerts, allocations, and/or response plans. In some embodiments, real-time feedback may come from vehicle-mounted instrument sensors and provide updates accordingly. Such information may be used to refine models/algorithms/components for alert determination, asset allocation/distribution, and/or planning/prediction. Although examples were discussed in the context of utilities, it is to be understood that the URAMS may be utilized for private, public and/or governmental services, such as emergency response, power generation and natural resource distribution (e.g., coal/gas mining), telecommunications, freight distribution networks and services, national defense, and/or the like.

URAMS Controller

Figure 17:
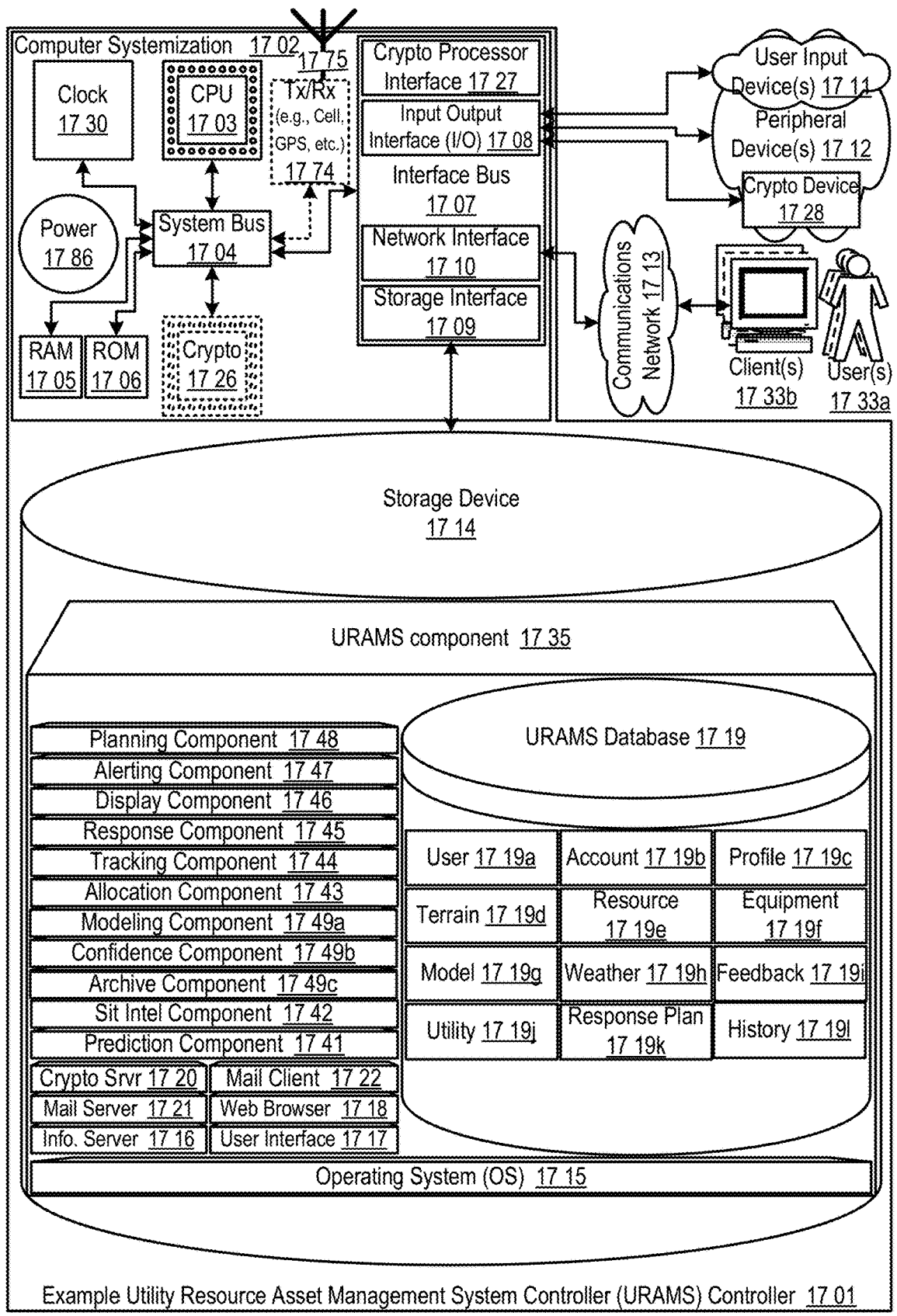
FIG. 17 shows a block diagram illustrating embodiments of a URAMS controller. The leading number of each reference number within the drawings indicates the figure in which that reference number is introduced and/or detailed. As such, a detailed discussion of reference number 601 would be found and/or introduced in FIG. 6A, and reference number 801 is introduced in FIG. 8A, an so forth.

FIG. 17 shows a block diagram illustrating embodiments of a URAMS controller 1701. In this embodiment, the URAMS controller 1701 may serve to aggregate, process, store, search, serve, identify, instruct, generate, match, and/or facilitate interactions with a computer through various technologies, and/or other related data.

Typically, users, e.g., 1733a, which may be people and/or other systems, may engage information technology systems (e.g., computers) to facilitate information processing. In turn, computers employ processors to process information; such processors 1703 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1729 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the URAMS controller 1701 may be connected to and/or communicate with entities such as, but not limited to: one or more users from user input devices 1711; peripheral devices 1712; an optional cryptographic processor device 1728; and/or a communications network 1713. For example, the URAMS controller 1701 may be connected to and/or communicate with users, e.g., 1733a, operating client device(s), e.g., 1733b, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The URAMS controller 1701 may be based on computer systems that may comprise, but are not limited to, components such as: a computer systemization 1702 connected to memory 1729.

Computer Systemization

A computer systemization 1702 may comprise a clock 1730, central processing unit ("CPU(s)" and/or "processor(s)" (these terms are used interchangeable throughout the disclosure unless noted to the contrary)) 1703, a memory 1729 (e.g., a read only memory (ROM) 1706, a random access memory (RAM) 1705, etc.), and/or an interface bus 1707, and most frequently, although not necessarily, are all interconnected and/or communicating through a system bus 1704 on one or more (mother)board(s) having conductive and/or otherwise transportive circuit pathways through which instructions (e.g., binary encoded signals) may travel to effectuate communications, operations, storage, etc. The computer systemization may be connected to a power source 1786; e.g., optionally the power source may be internal. Optionally, a cryptographic processor 1726 and/or transceivers (e.g., ICs) 1774 may be connected to the system bus. In another embodiment, the cryptographic processor and/or transceivers may be connected as either internal and/or external peripheral devices 1712 via the interface bus I/O. In turn, the transceivers may be connected to antenna(s) 1775, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing URAMS controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1729 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the URAMS controller and beyond through various interfaces. Should processing requirements dictate a greater amount speed and/or capacity, distributed processors (e.g., Distributed URAMS), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the URAMS may be achieved by implementing a microcontroller such as CAST's R8051XC2 microcontroller; Intel's MCS 51 (i.e., 8051 microcontroller); and/or the like. Also, to implement certain features of the URAMS, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the URAMS component collection (distributed or otherwise) and/or features may be implemented via the microprocessor and/or via embedded components; e.g., via ASIC, coprocessor, DSP, FPGA, and/or the like. Alternately, some implementations of the URAMS may be implemented with embedded components that are configured and used to achieve a variety of features or signal processing.

Depending on the particular implementation, the embedded components may include software solutions, hardware solutions, and/or some combination of both hardware/software solutions. For example, URAMS features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the URAMS features. A hierarchy of programmable interconnects allow logic blocks to be interconnected as needed by the URAMS system designer/administrator, somewhat like a one-chip programmable breadboard. An FPGA's logic blocks can be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the URAMS may be developed on regular FPGAs and then migrated into a fixed version that more resembles ASIC implementations. Alternate or coordinating implementations may migrate URAMS controller features to a final ASIC instead of or in addition to FPGAs. Depending on the implementation all of the aforementioned embedded components and microprocessors may be considered the "CPU" and/or "processor" for the URAMS.

Power Source

The power source 1786 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1786 is connected to at least one of the interconnected subsequent components of the URAMS thereby providing an electric current to all subsequent components. In one example, the power source 1786 is connected to the system bus component 1704. In an alternative embodiment, an outside power source 1786 is provided through a connection across the I/O 1708 interface. For example, a USB and/or IEEE 1394 connection carries both data and power across the connection and is therefore a suitable source of power.

Interface Adapters

Interface bus(ses) 1707 may accept, connect, and/or communicate to a number of interface adapters, conventionally although not necessarily in the form of adapter cards, such as but not limited to: input output interfaces (I/O) 1708, storage interfaces 1709, network interfaces 171o, and/or the like. Optionally, cryptographic processor interfaces 1727 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1709 may accept, communicate, and/or connect to a number of storage devices such as, but not limited to: storage devices 1714, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1710 may accept, communicate, and/or connect to a communications network 1713. Through a communications network 1713, the URAMS controller is accessible through remote clients 1733b (e.g., computers with web browsers) by users 1733a. Network interfaces may employ connection protocols such as, but not limited to: direct connect, Ethernet (thick, thin, twisted pair 1000000 Base T, and/or the like), Token Ring, wireless connection such as IEEE 802.11a-x, and/or the like. Should processing requirements dictate a greater amount speed and/or capacity, distributed network controllers (e.g., Distributed URAMS), architectures may similarly be employed to pool, load balance, and/or otherwise increase the communicative bandwidth required by the URAMS controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1710 may be used to engage with various communications network types 1713. For example, multiple network interfaces may be employed to allow for the communication over broadcast, multicast, and/or unicast networks.

Input Output interfaces (I/O) 1708 may accept, communicate, and/or connect to user input devices 1711, peripheral devices 1712, cryptographic processor devices 1728, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/big/nix; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1711 often are a type of peripheral device 1712 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1712 may be connected and/or communicate to I/O and/or other facilities of the like such as network interfaces, storage interfaces, directly to the interface bus, system bus, the CPU, and/or the like. Peripheral devices may be external, internal and/or part of the URAMS controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 1728), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the URAMS controller may be embodied as an embedded, dedicated, and/or monitor-less (i.e., headless) device, wherein access would be provided over a network interface connection.

Cryptographic units such as, but not limited to, microcontrollers, processors 1726, interfaces 1727, and/or devices 1728 may be attached, and/or communicate with the URAMS controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 1729. However, memory is a fungible technology and resource, thus, any number of memory embodiments may be employed in lieu of or in concert with one another. It is to be understood that the URAMS controller and/or a computer systemization may employ various forms of memory 1729. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1729 will include ROM 1706, RAM 1705, and a storage device 1714. A storage device 1714 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1729 may contain a collection of program and/or database components and/or data such as, but not limited to: operating system component(s) 1715 (operating system); information server component(s) 1716 (information server); user interface component(s) 1717 (user interface); Web browser component(s) 1718 (Web browser); database(s) 1719; mail server component(s) 1721; mail client component(s) 1722; cryptographic server component(s) 1720 (cryptographic server); the URAMS component(s) 1735; and/or the like (i.e., collectively a component collection). These components may be stored and accessed from the storage devices and/or from storage devices accessible through an interface bus. Although non-conventional program components such as those in the component collection, typically, are stored in a local storage device 1714, they may also be loaded and/or stored in memory such as: peripheral devices, RAM, remote storage facilities through a communications network, ROM, various forms of memory, and/or the like.

Operating System

The operating system component 1715 is an executable program component facilitating the operation of the URAMS controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the URAMS controller to communicate with other entities through a communications network 1713. Various communication protocols may be used by the URAMS controller as a subcarrier transport mechanism for interaction, such as, but not limited to: multicast, TCP/IP, UDP, unicast, and/or the like.

Information Server

An information server component 1716 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the URAMS controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the URAMS database 1719, operating systems, other program components, user interfaces, Web browsers, and/or the like.

Access to the URAMS database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the URAMS. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the URAMS as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1717 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1718 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the URAMS enabled nodes. The combined application may be nugatory on systems employing standard Web browsers.

Mail Server

A mail server component 1721 is a stored program component that is executed by a CPU 1703. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the URAMS.

Access to the URAMS mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1722 is a stored program component that is executed by a CPU 1703. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1720 is a stored program component that is executed by a CPU 1703, cryptographic processor 1726, cryptographic processor interface 1727, cryptographic processor device 1728, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the URAMS may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the URAMS component to engage in secure transactions if so desired. The cryptographic component facilitates the secure accessing of resources on the URAMS and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The URAMS Database

The URAMS database component 1719 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the URAMS database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the URAMS database is implemented as a data-structure, the use of the URAMS database 1719 may be integrated into another component such as the URAMS component 1735. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1719 includes several tables 1719a-l. A User table 1719a may include fields such as, but not limited to: user_id, ssn, dob, first_name, last_name, age, state, address_firstline, address_secondline, zipcode, devices_list, contact_info, contact_type, alt_contact_info, alt_contact_type, user_equipment, user_asset, user_profile, and/or the like. An Account table 1719b may include fields such as, but not limited to: acct_id, acct_user, acct_history, acct_access, acct_status, acct_subscription, acct_profile, and/or the like.

A Profile table 1719c may include fields such as, but not limited to: prof_id, prof_assets, prof_history, prof_details, profile_assets, and/or the like. A Terrain table 1719d may include fields such as, but not limited to: terrain_id, terrain_details, terrain_parameters, terrain_var, and/or the like. A Resource table 1719e may include fields such as, but not limited to: resource_id, resource_location, resource_acct, and/or the like. An Equiptment table 1719f may include fields such as, but not limited to: equip_id, equip_location, equip_acct, equip_contact, equip_type, and/or the like. A Model table 1719g may include fields such as, but not limited to: model_id, model_type, model_assc, model_feedback, model_parameters, model_variables, model_metrics, model_details, model_confidence, and/or the like. A Weather data table 1719h may include fields such as, but not limited to: weather_data_id, weather_source, weather_location, weather_data_type, weather_acct, weather_var, and/or the like. In one embodiment, the weather_data table is populated through one or more weather data feeds. A Feedback table 1719i may include fields such as, but not limited to: feedback_id, feedback_source, source_location, feedback_time, feedback_acct, and/or the like.

A Utility table 1719j may include fields such as, but not limited to: utility_id, utility_type, utility_profile, utility_assets, utility_location, utility_route, utility_owner, utility_acct, utility_plans, utility_parameters, utility_historicals, utility_alerts, and/or the like. A Response Plan table 1719k may include fields such as, but not limited to: responseplan_id, responseplan_source, responseplan_asset_start_location, responseplan_asset_start_time, responseplan_asset_end_location, responseplan_asset_end_time, responseplan_acct, responseplan_assets, responseplan_profile, responseplan_type, responsetplan_alerts, responseplan_parameters, and/or the like. A History table 1719l may include fields such as, but not limited to: History_id, History_source, History_assets, histoyr_asset_profile, history_alert_determination, history_profile, historyplan_type, history_alerts, historyalert_parameters, and/or the like.

In one embodiment, the URAMS database may interact with other database systems. For example, employing a distributed database system, queries and data access by search URAMS component may treat the combination of the URAMS database, an integrated data security layer database as a single database entity.

In one embodiment, user programs may contain various user interface primitives, which may serve to update the URAMS. Also, various accounts may require custom database tables depending upon the environments and the types of clients the URAMS may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1719a-l. The URAMS may be configured to keep track of various settings, inputs, and parameters via database controllers.

The URAMS database may communicate to and/or with other components in a component collection, including itself, and/or facilities of the like. Most frequently, the URAMS database communicates with the URAMS component, other program components, and/or the like. The database may contain, retain, and provide information regarding other nodes and data.

The URAMSs

The URAMS component 1735 is a stored program component that is executed by a CPU. In one embodiment, the URAMS component incorporates any and/or all combinations of the aspects of the URAMS discussed in the previous figures. As such, the URAMS affects accessing, obtaining and the provision of information, services, transactions, and/or the like across various communications networks.

The URAMS component may transform historical, asset allocation and weather data input via URAMS components into real-time and/or predictive alert and response feeds and displays, and/or the like and use of the URAMS. In one embodiment, the URAMS component 1735 takes inputs (e.g., weather forecast data, models, terrain, sensor data, asset data, historical data, and/or the like) etc., and transforms the inputs via various components (e.g., prediction component 1741; situational intelligence component 1742; allocation component 1743; a Tracking component 1744; a Response component 1745; a Display component 1746; an Alerting component 1747; a Planning component 1748; a Modeling component 1749a; a Confidence component 1749b; an Archive component 1749c; and/or the like), into outputs (e.g., predictive alerts, asset allocation, distribution, planning, real-time response data feed, allocation and plan modifications/optimizations, real-time alerts, and/or the like).

The URAMS component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the URAMS server employs a cryptographic server to encrypt and decrypt communications. The URAMS component may communicate to and/or with other components in a component collection, including itself, and/or facilities of the like. Most frequently, the URAMS component communicates with the URAMS database, operating systems, other program components, and/or the like. The URAMS may contain, communicate, generate, obtain, and/or provide program component, system, user, and/or data communications, requests, and/or responses.

Distributed URAMSs

The structure and/or operation of any of the URAMS node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the URAMS controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Values is discerned as being a parameter because "http://" is part of the grammar syntax, and what follows is considered part of the post value. Similarly, with such a grammar, a variable "Values1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the URAMS controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

<?PHP header('Content-Type: text/plain');

//set ip address and port to listen to for incoming data $address='192.168.0.100';

```
$port=255;
//create a server-side SSL socket, listen for/accept incom-
    ing communication
$sock=socket create(AF_INET, SOCK_STREAM, 0);
socket_bind($sock, $address, $port) or die('Could not
    bind to address');
socket_listen($sock);
$client=socket_accept($sock);
//read input data from client device in 1024 byte blocks
    until end of message
do {
    $input=" ";
    $input=socket_read($client, 1024);
    $data.=$input;
} while($input !=" ");
//parse data to extract variables
$obj=json_decode($data, true);
//store input data in a database
mysql_connect("201.408.185.132",$DBserver,$pass-
    word); //access database server
mysql_select("CLIENT_DB.SQL"); //select database to
    append
mysql_guery("INSERT INTO UserTable (transmission)
    VALUES ($data)"); //add data to UserTable table in a
    CLIENT database
mysql_close("CLIENT_DB.SQL"); //close connection to
    database
?>
```

28 Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/
    index.jsp?topic=/com.ibm.IBMDI.doc/
    referenceguide295.htm
and other parser implementations:
http://publib.boulder.ibm.com/infocenter/tivihelp/v2r1/
    index.jsp?topic=/com.ibm.IBMDI.doc/
    referenceguide259.htm all of which are hereby expressly incorporated by reference herein.

In order to address various issues and advance the art, the entirety of this application for UTILITY RESOURCE ASSET MANAGEMENT SYSTEM APPARATUSES, METHODS AND SYSTEMS (including the Cover Page, Title, Headings, Field, Background, Summary, Brief Description of the Drawings, Detailed Description, Claims, Abstract, Figures, Appendices and/or otherwise) shows by way of illustration various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a URAMS individual and/or enterprise user, database configuration and/or relational model, data type, data transmission and/or network framework, syntax structure, and/or the like, various embodiments of the URAMS may be implemented that enable a great deal of flexibility and customization. For example, aspects of the URAMS may be adapted for integration with planning, resource/asset allocation and optimization. While various embodiments and discussions of the URAMS have been directed to predictive turbulence, however, it is to be understood that the embodiments described herein may be readily configured and/or customized for a wide variety of other applications and/or implementations While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed.

Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software, or a combination thereof. When implemented in software, the software code can be executed on any suitable processor or collection of processors, whether provided in a single computer or distributed among multiple computers.

Further, it should be appreciated that the present prediction interfaces and utility management methods may be used in conjunction with a computer, which may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices, including one or more displays as disclosed herein. These devices can be used, among other things, to present a user interface, such as those discussed herein. Examples of output devices that can be used to provide a user interface include printers or display screens or projectors for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

A flow diagram is used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired zafunctionality is achieved, irrespective of architectures or *intermedia* components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A processor-implemented method for providing a predictive utility asset damage and response interface, comprising:
    receiving fixed-location utility asset data for a given area;
    receiving historical fixed-location utility asset damage data associated with the fixed-location utility asset data;
    receiving geographic data and ecological data for the given area;
    receiving historical weather data for the given area;
    accessing at least one damage model;
    defining a utility asset map based on the fixed-location utility asset data, the geographic data, and the ecological data;
    receiving current weather data for the area;
    generating via a processor a predictive utility asset damage forecast using the at least one damage model and based on the utility asset map, the historical fixed-location utility asset damage data, the historical weather data, and the current weather data;
    determining confidence metric data for the predictive utility asset damage forecast;
    integrating the confidence metric data with the predictive utility asset damage forecast to define a predictive utility asset damage forecast with integrated confidence metric data;
    outputting the predictive utility asset damage forecast with integrated confidence metric data as a dynamically scalable utility asset map overlay for presentation to at least one user via an electronic interface, the dynamically scalable utility asset map overlay including a plurality of gridpoints, each gridpoint corresponding to an area within the dynamically scalable utility asset map overlay, wherein the predictive utility asset damage forecast and the confidence metric data are determined on an individual gridpoint basis;
    comparing the predictive utility asset damage forecast, or the confidence metric data for the predictive utility asset damage forecast, to a previous predictive utility asset damage forecast, or to a confidence metric data for the previous predictive utility asset damage forecast, respectively; and
    alerting the at least one user, by providing a visual indication at the electronic interface in a specified manner, that the predictive utility asset damage forecast, or the confidence metric data for the predictive utility asset damage forecast, has changed by a specified amount from the previous predictive utility asset damage forecast, or from the confidence metric data for the previous predictive utility asset damage forecast, respectively.

2. The method of claim 1, wherein determining confidence metric data for the predictive utility asset damage forecast is based on iterative processing of the at least one damage model.

3. The method of claim 1, further comprising:
    receiving real-time fixed-location utility asset damage data for the area;

updating the predictive utility asset damage forecast with integrated confidence metric data based on the real-time fixed-location utility asset damage data; and outputting an updated dynamically scalable utility asset map overlay.

4. The method of claim 1, wherein defining a utility asset map includes:

generating aggregate utility asset polygon data, the generation of the aggregate utility asset polygon data comprising: identifying unique feeders, and for each feeder, selecting specified conductors in a specified feeder segment, determining an aggregate polygon buffer around conductor features, selecting network connected assets, selecting non-network connected assets based on the polygon buffer, updating polygon attributes with related asset information from the network connected assets and non-network connected assets to generate utility asset polygon data, and reducing the number of vertices and polygon complexity to provide aggregate utility asset polygon data.

5. The processor-implemented method of claim 1, further comprising:

receiving simulation scenario data, the simulation scenario data including a plurality of scenario parameter values; and updating the predictive utility asset damage forecast with integrated confidence metric data based on the plurality of scenario parameter values.

6. The processor-implemented method of claim 5, further comprising outputting an updated dynamically scalable utility asset map overlay based on the plurality of scenario parameter values, wherein the updated dynamically scalable utility asset map overlay illustrates differences in the predictive utility asset damage forecast and confidence metric data as variables changes over time.

7. The processor-implemented method of claim 5, further comprising outputting an updated dynamically scalable utility asset map overlay based on the plurality of scenario parameter values, wherein the updated dynamically scalable utility asset map overlay illustrates differences between the predictive utility asset damage forecast with integrated confidence metric data and the updated dynamically scalable utility asset map overlay based on the plurality of scenario parameter values.

8. The processor-implemented method of claim 7, further comprising:

generating a proposed utility crew deployment plan based on man-hour estimates for storm response effort based on differences between the predictive utility asset damage forecast with integrated confidence metric data and the updated dynamically scalable utility asset map overlay.

9. The processor-implemented method of claim 7, further comprising:

accessing a current utility crew deployment plan;
determining an updated proposed utility crew deployment plan based on the plurality of scenario parameter values the current utility crew deployment plan.

10. The processor-implemented method of claim 8, further comprising:

accessing key archival comparison metrics associated with data used to generate the dynamically scalable utility asset map overlay;

using the key archival comparison metrics to identify at least one historically similar damage event crew deployment, and return to service characteristics from a historical performance database; and determining a performance score for the current event as compared to the historical event.

11. A processor-implemented method for providing a predictive utility asset damage and response interface, comprising:

receiving fixed-location utility asset data for a given area;
receiving historical fixed-location utility asset damage data associated with the fixed-location utility asset data;
receiving geographic data and ecological data for the given area;
receiving historical weather data for the given area;
accessing at least one damage model;
defining a utility asset map based on the fixed-location utility asset data, the geographic data, and the ecological data;
receiving current weather data for the area;
generating via a processor a predictive utility asset damage forecast using the at least one damage model and based on the utility asset map, the historical fixed-location utility asset damage data, the historical weather data, and the current weather data;
determining confidence metric data for the predictive utility asset damage forecast;
integrating the confidence metric data with the predictive utility asset damage forecast to define a predictive utility asset damage forecast with integrated confidence metric data;
receiving simulation scenario data, the simulation scenario data including a plurality of scenario parameter values;
updating the predictive utility asset damage forecast with integrated confidence metric data based on the plurality of scenario parameter values; and
outputting the predictive utility asset damage forecast with integrated confidence metric data as a dynamically scalable utility asset map overlay for presentation to at least one user via an electronic interface.

12. The processor-implemented method of claim 11, further comprising outputting an updated dynamically scalable utility asset map overlay based on the plurality of scenario parameter values, wherein the updated dynamically scalable utility asset map overlay illustrates differences in the predictive utility asset damage forecast and confidence metric data as variables changes over time.

13. The processor-implemented method of claim 11, further comprising outputting an updated dynamically scalable utility asset map overlay based on the plurality of scenario parameter values, wherein the updated dynamically scalable utility asset map overlay illustrates differences between the predictive utility asset damage forecast with integrated confidence metric data and the updated dynamically scalable utility asset map overlay based on the plurality of scenario parameter values.

14. The processor-implemented method of claim 13, further comprising:

generating a proposed utility crew deployment plan based on man-hour estimates for storm response effort based on differences between the predictive utility asset damage forecast with integrated confidence metric data and the updated dynamically scalable utility asset map overlay.

15. The processor-implemented method of claim 13, further comprising:

accessing a current utility crew deployment plan;
determining an updated proposed utility crew deployment plan based on the plurality of scenario parameter values the current utility crew deployment plan.

16. The processor-implemented method of claim 14, further comprising:
accessing key archival comparison metrics associated with data used to generate the dynamically scalable utility asset map overlay;
using the key archival comparison metrics to identify at least one historically similar damage event crew deployment, and return to service characteristics from a historical performance database; and
determining a performance score for the current event as compared to the historical event.

17. The processor-implemented method of claim 1, wherein the confidence metric data is interwoven in the dynamically scalable utility asset map overlay.

* * * * *